US011299180B2

(12) United States Patent
Oguro et al.

(10) Patent No.: US 11,299,180 B2
(45) Date of Patent: Apr. 12, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Chihiro Oguro, Wako (JP); Junya Yoda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 93 days.

(21) Appl. No.: 16/823,424

(22) Filed: Mar. 19, 2020

(65) Prior Publication Data

US 2020/0307637 A1    Oct. 1, 2020

(30) Foreign Application Priority Data

Mar. 28, 2019  (JP) .............................. JP2019-062677

(51) Int. Cl.
*B60W 60/00* (2020.01)
*B60W 30/09* (2012.01)
*B60W 40/04* (2006.01)
*B60W 30/095* (2012.01)

(52) U.S. Cl.
CPC ........ *B60W 60/0027* (2020.02); *B60W 30/09* (2013.01); *B60W 40/04* (2013.01); *B60W 30/0956* (2013.01); *B60W 2554/4045* (2020.02)

(58) Field of Classification Search
CPC .. B60W 60/0027; B60W 30/09; B60W 40/04; B60W 2554/4045; B60W 30/0956
See application file for complete search history.

(56) References Cited

U.S. PATENT DOCUMENTS

| 11,004,000 | B1* | 5/2021 | Gutmann | G06N 5/04 |
| 2012/0271539 | A1* | 10/2012 | Bald | G06F 17/00 701/30 |
| 2015/0100228 | A1* | 4/2015 | Sudou | B60W 30/16 |
| 2018/0134284 | A1* | 5/2018 | Newman | B60W 30/09 |
| 2019/0184987 | A1* | 6/2019 | Lee | B60W 30/0956 |
| 2019/0251845 | A1* | 8/2019 | Kosaka | G08G 1/167 |
| 2019/0367026 | A1* | 12/2019 | Hattori | B60W 30/16 |
| 2020/0101968 | A1* | 4/2020 | Kim | B60W 30/09 |
| 2020/0238982 | A1* | 7/2020 | Kang | B60W 30/09 |
| 2021/0094577 | A1* | 4/2021 | Shalev-Shwartz | B60W 60/0016 |

FOREIGN PATENT DOCUMENTS

JP           07-230600        8/1995

* cited by examiner

*Primary Examiner* — Peter D Nolan
*Assistant Examiner* — Brittany Renee Peko
(74) *Attorney, Agent, or Firm* — Amin, Turocy & Watson, LLP

(57) ABSTRACT

A vehicle control device includes: a recognizer configured to recognize a surrounding situation of a vehicle based on an output of an on-board sensor; an interruption vehicle specifier configured to specify an interruption vehicle attempting to interrupt a travel lane from a lateral side of the travel lane in which there is the vehicle based on a recognition result of the recognizer; and a driving controller configured to control at least one of an acceleration or deceleration speed or steering of the vehicle based on a position of the specified interruption vehicle.

8 Claims, 37 Drawing Sheets

FIG. 13

| | | MAP PRESENCE | MAP ABSENCE (INCLUDING CASE OF NON-USE OF FIRST STANDARD RANGE) |
|---|---|---|---|
| FIRST INITIAL SEARCHING RANGE AR1-1 | LENGTH | X1 [m] | |
| | WIDTH | LANE WIDTH ON MAP | |
| FIRST TRACKING RANGE AR1-2 | LENGTH | X1 [m] | |
| | WIDTH | LANE WIDTH ON MAP+$TM_Y$ | |
| SECOND INITIAL SEARCHING RANGE AR2-1 | LENGTH | | X2 [m] |
| | WIDTH | | LANE WIDTH CONVERTED FROM CAMERA IMAGE |
| SECOND TRACKING RANGE AR2-2 | LENGTH | | X2 [m] |
| | WIDTH | | LANE WIDTH CONVERTED FROM CAMERA IMAGE+$TM_Y$ |
| THIRD INITIAL SEARCHING RANGE AR3-1 | LENGTH | FUNCTION OF X3 [m] R AND SPEED V (SHORT) | FUNCTION OF X4 [m] R AND SPEED V (LONG) |
| | WIDTH | Y1 [m] | Y2 [m] |
| THIRD TRACKING RANGE AR3-2 | LENGTH | X3+$TM_X$ [m] | X4+$TM_X$ [m] |
| | WIDTH | Y3 [m] | Y4 [m] |

AR3-1m   AR3-2m

AR3-1c
AR3-2c

X1>X2, X3+$TM_X$, X4+$TM_X$
Y1<Y2,
Y3<Y4
Y1<Y3
Y2<Y4
Y4>LANE WIDTH

FIG. 23

| | | MAP PRESENCE | MAP ABSENCE (INCLUDING CASE OF NON-USE OF FIRST STANDARD RANGE) |
|---|---|---|---|
| SETTING RULE OF LATERAL SIDE REFERENCE RANGE | LENGTH | FIXED | LENGTH OF ROAD DEMARCATION LINE RECOGNIZED BY CAMERA |
| | WIDTH | FIXED | FIXED |

| | | PRESENCE OR ABSENCE OF LANE IN RANGE OF INTERRUPTION SOURCE | | PRESENCE OR ABSENCE OF LANE IN RANGE OF INTERRUPTION SOURCE | |
|---|---|---|---|---|---|
| | | YES | NO | YES | NO |
| EXTRACTION RULE OF INTERRUPTION VEHICLE CANDIDATE | OBJECT RELIABILITY HIGH | EXTRACTED | NOT EXTRACTED | EXTRACTED | EXTRACTED |
| | INTERMEDIATE | EXTRACTED | NOT EXTRACTED | EXTRACTED | EXTRACTED |
| | LOW | EXTRACTED | NOT EXTRACTED | EXTRACTED | NOT EXTRACTED |

FIG. 28
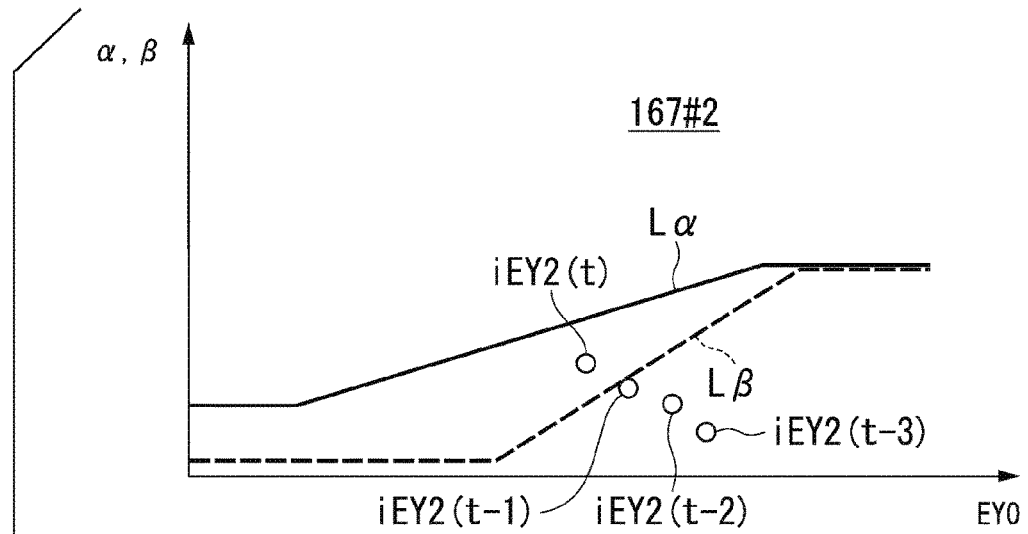
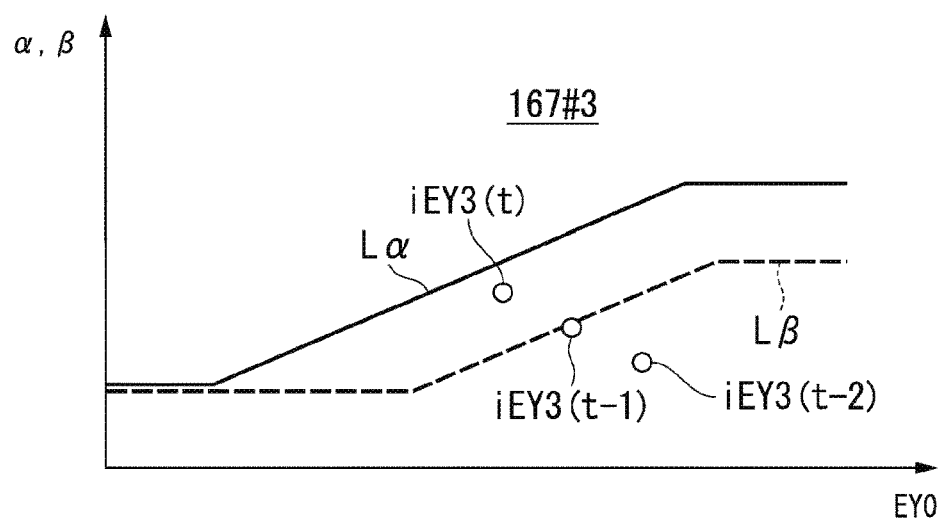
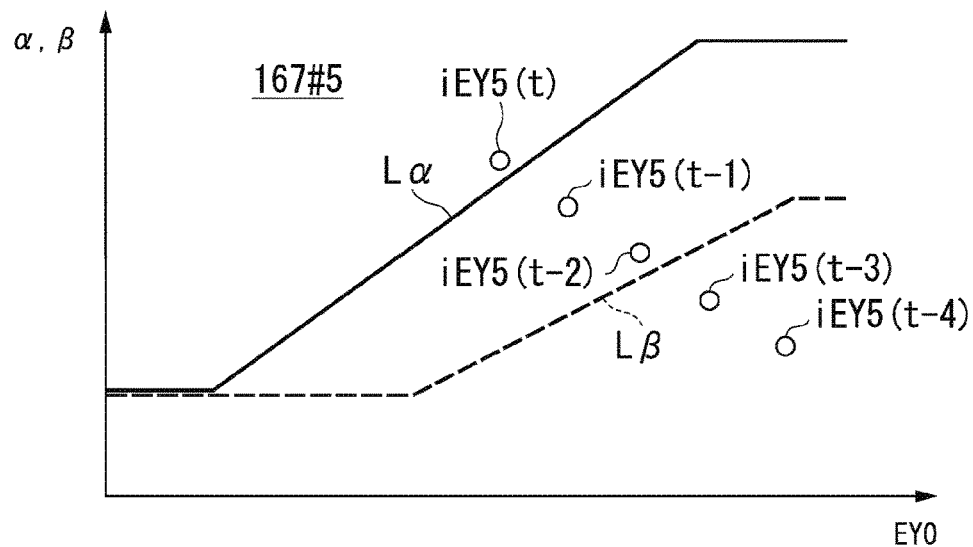

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-062677, filed Mar. 28, 2019, the content of which is incorporated herein by reference.

BACKGROUND

Field of the Invention

The present invention relates to a vehicle control device, a vehicle control method, and a storage medium.

Description of Related Art

In recent years, studies of automated vehicle control have been conducted. In relation to this technology, the invention of a front vehicle detection device including a lane detector that detects a travel lane of an own vehicle, a front vehicle detector that detects a position of a front vehicle in the horizontal direction in front of the own vehicle, and a degree-of-interruption calculator that calculates the degree of interruption of the front vehicle detected by the front vehicle detection into an own lane detected by the lane detector (see Japanese Unexamined Patent Application, First Publication No. H7-230600).

SUMMARY

In the technology of the related art, an aspect of side movement of another vehicle is not sufficiently considered, adequacy of specifying of an interruption vehicle is not sufficient in some cases.

The present invention is devised in view of such circumstances and an objective of the present invention is to provide a vehicle control device, a vehicle control method, and a storage medium capable of specifying an interruption vehicle more appropriately.

A vehicle control device, a vehicle control method, and a storage medium according to the present invention adopt the following configurations.

(1) According to an aspect of the present invention, a vehicle control device includes: a recognizer configured to recognize a surrounding situation of a vehicle based on an output of an on-board sensor; an interruption vehicle specifier configured to specify an interruption vehicle attempting to interrupt a travel lane from a lateral side of the travel lane in which there is the vehicle based on a recognition result of the recognizer; and a driving controller configured to control at least one of an acceleration or deceleration speed or steering of the vehicle based on a position of the specified interruption vehicle. The recognizer recognizes an angle formed between a standard direction and a direction which is a direction of a vehicle body derived based on the output of the on-board sensor and is a direction of a vehicle body of another vehicle on a lateral side of the vehicle. The interruption vehicle specifier specifies the other vehicle as the interruption vehicle based on the angle recognized by the recognizer.

(2) In the vehicle control device according to the aspect (1), the interruption vehicle specifier may specify the other vehicle as the interruption vehicle when a change amount of the angle recognized by the recognizer is equal to or greater than a threshold.

(3) In the vehicle control device according to the aspect (1), the interruption vehicle specifier may specify the other vehicle as the interruption vehicle when a state in which a change amount of the angle recognized by the recognizer is equal to or greater than a threshold continues during a predetermined period.

(4) In the vehicle control device according to the aspect (1), the recognizer may recognize the angle based on a direction binding a first point which is inside the other vehicle and a second point which is in front of the first point of the vehicle and is in an outer edge of the vehicle.

(5) In the vehicle control device according to the aspect (1), the standard direction may be an extension direction of a travel lane in which there is the vehicle.

(6) In the vehicle control device according to the aspect (1), the interruption vehicle specifier may perform specifying the other vehicle as the interruption vehicle as a specifying process of a first stage based on the angle recognized by the recognizer and perform specifying the other vehicle as the interruption vehicle as a specifying process of a second stage when the other vehicle enters a prohibition range in front of the vehicle. The driving controller may cause a degree of control corresponding to the interruption vehicle to be larger with regard to the specified other vehicle when the other vehicle is specified as the interruption vehicle through the specifying process of the second stage than when the other vehicle is specified as the interruption vehicle through the specifying process of the first stage.

(7) In the vehicle control device according to the aspect (6), the driving controller may not launch the vehicle when the other vehicle is specified as the interruption vehicle through the specifying process of the second stage and the vehicle is stopping.

(8) In the vehicle control device according to the aspect (6), the interruption vehicle specifier may set the prohibition range based on a travel environment of the vehicle.

(9) In the vehicle control device according to the aspect (6), the interruption vehicle specifier may set the prohibition range using an area occupied by a lane as a standard.

(10) In the vehicle control device according to the aspect (6), the interruption vehicle specifier may lengthen a length of the prohibition range as a vehicle length of the interruption vehicle is longer.

(11) In the vehicle control device according to the aspect (1), the interruption vehicle specifier may operate when a speed of the vehicle is less than a predetermined speed.

(12) According to another aspect of the present invention, a vehicle control device includes: a recognizer configured to recognize a surrounding situation of a vehicle based on an output of an on-board sensor; an interruption vehicle specifier configured to specify an interruption vehicle attempting to interrupt a travel lane from a lateral side of the travel lane in which there is the vehicle based on a recognition result of the recognizer; and a driving controller configured to control at least one of an acceleration or deceleration speed or steering of the vehicle based on a position of the specified interruption vehicle. The recognizer recognizes a difference which is a difference of a side position derived based on the output of the on-board sensor and is a difference of a side position obtained as a distance between first and second standard portions of a vehicle body of the other vehicle which is on a lateral side of the vehicle in a road width direction. The interruption vehicle specifier specifies the other vehicle as the interruption vehicle based on the difference of a side position recognized by the recognizer.

(13) According to still another aspect of the present invention, a vehicle control device includes: a recognizer configured to recognize a surrounding situation of a vehicle; an interruption vehicle specifier configured to specify an interruption vehicle attempting to interrupt a travel lane from a lateral side of the travel lane in which there is the vehicle based on a recognition result of the recognizer; and a driving controller configured to control at least one of an acceleration or deceleration speed or steering of the vehicle based on a position of the specified interruption vehicle. The interruption vehicle specifier includes a first interruption vehicle specifier that specifies the interruption vehicle based on a side movement amount of another vehicle and a second interruption vehicle specifier that specifies the interruption vehicle based on a direction of a vehicle body of the other vehicle. The first interruption vehicle specifier operates when a speed of the vehicle is equal to or greater than a predetermined speed. Both the first interruption vehicle specifier and the second interruption vehicle specifier operate when the speed of the vehicle is less than the predetermined speed.

(14) According to still another aspect of the present invention, there is provided a vehicle control method causing a computer: to recognize a surrounding situation of a vehicle based on an output of an on-board sensor; to specify an interruption vehicle attempting to interrupt a travel lane from a lateral side of the travel lane in which there is the vehicle based on a recognition result; to control at least one of an acceleration or deceleration speed or steering of the vehicle based on a position of the specified interruption vehicle; to recognize an angle formed between a standard direction and a direction which is a direction of a vehicle body derived based on the output of the on-board sensor and is a direction of a vehicle body of another vehicle on a lateral side of the vehicle when the surrounding situation of the vehicle is recognized; and to specify the other vehicle as the interruption vehicle based on the recognized angle when the interruption vehicle is specified.

(15) According to still another aspect of the present invention, a storage medium that stores a program causing a computer: to recognize a surrounding situation of a vehicle based on an output of an on-board sensor; to specify an interruption vehicle attempting to interrupt a travel lane from a lateral side of the travel lane in which there is the vehicle based on a recognition result; to control at least one of an acceleration or deceleration speed or steering of the vehicle based on a position of the specified interruption vehicle; to recognize an angle formed between a standard direction and a direction which is a direction of a vehicle body derived based on the output of the on-board sensor and is a direction of a vehicle body of another vehicle on a lateral side of the vehicle when the surrounding situation of the vehicle is recognized; and to specify the other vehicle as the interruption vehicle based on the recognized angle when the interruption vehicle is specified.

According to the aspects (1) to (15), it is possible to specify an interruption vehicle more appropriately. By specifying the interruption vehicle based on a direction of the vehicle body, it is possible to specify the interruption vehicle in more travel scenarios.

According to the aspects (2) and (3), it is possible to specify an interruption vehicle with high precision while suppression erroneous detection.

According to the aspect (6), it is possible to perform stepwise control in accordance with emergency of the control.

BRIEF DESCRIPTION OF THE DRAWINGS

FIG. 13 is a diagram illustrating a summary of a setting rule of various control parameters.

FIG. 23 is a diagram illustrating a setting rule of the lateral side reference range and a rule at the time of extraction as an interruption vehicle candidate.

FIG. 28 is a diagram illustrating transition of iEYn of another vehicle approaching the lane L1 continuously from a position distant from the lane L1 in a lane L2, for example.

DESCRIPTION OF EMBODIMENTS

Hereinafter, embodiments of a vehicle control device, a vehicle control method, and a storage medium according to the present invention will be described with reference to the drawings.

First Embodiment

[Overall Configuration]

Figure 1:
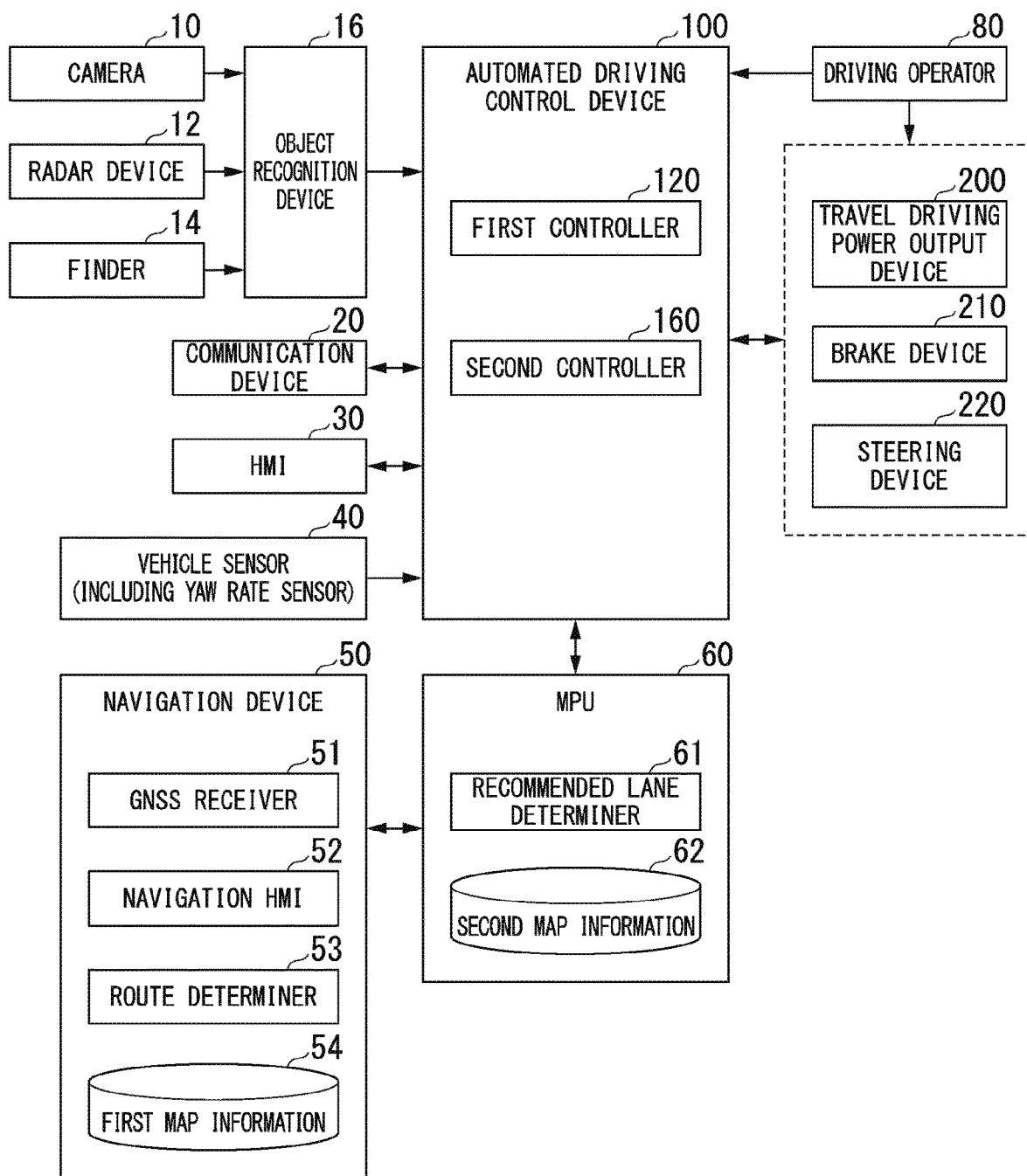
FIG. 1 is a diagram illustrating a configuration of a vehicle system in which a vehicle control device according to an embodiment is used.

FIG. 1 is a diagram illustrating a configuration of a vehicle system 1 in which a vehicle control device according to an embodiment is used. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, and a combination thereof. The electric motor operates using power generated by a power generator connected to the internal combustion engine or power discharged from a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. The devices and units are connected to one another via a multiplex communication line such as a controller area network (CAN) communication line, a serial communication line, or a wireless communication network. The configuration shown in FIG. 1 is merely exemplary, a part of the configuration may be omitted, and another configuration may be further added.

The camera 10 is, for example, a digital camera that uses a solid-state image sensor such as a charged coupled device (CCD) or a complementary metal oxide semiconductor (CMOS). The camera 10 is mounted on any portion of a vehicle in which the vehicle system 1 is mounted (hereinafter referred to as an own vehicle M). When the camera 10 images a front side, the camera 10 is mounted on an upper portion of a front windshield, a rear surface of a rearview mirror, and the like. For example, the camera 10 repeatedly images the surroundings of the own vehicle M periodically. The camera 10 may be a stereo camera.

The radar device 12 radiates radio waves such as millimeter waves to the surroundings of the own vehicle M and detects radio waves (reflected waves) reflected from an object to detect at least a position (a distance and an azimuth) of the object. The radar device 12 is mounted on any portion of the own vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. The finder 14 is mounted on any portions of the own vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving control device 100. The object recognition device 16 may output detection results of the camera 10, the radar device 12, and the finder 14 to the automated driving control device 100 without any change. The object recognition device 16 may be excluded from the vehicle system 1.

The communication device 20 communicates with other vehicles around the own vehicle M using, for example, a cellular network, a Wi-Fi network, Bluetooth (registered trademark), dedicated short range communication (DSRC) or the like or communicates with various server devices via a wireless base station.

The HMI 30 presents various types of information to occupants of the own vehicle M and receives input operations by the occupants. For example, the HMI 30 includes various display devices, speakers, buzzers, touch panels, switches, and keys.

The vehicle sensor 40 includes a vehicle speed sensor that detects a speed of the own vehicle M, an acceleration sensor that detects acceleration, a yaw rate sensor that detects angular velocity around a vertical axis, and an azimuth sensor that detects a direction of the own vehicle M.

The navigation device 50 includes, for example, a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 specifies a position of the own vehicle M based on signals received from GNSS satellites. The position of the own vehicle M may be specified or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The route on the map is output to the MPU 60. The navigation device 50 may perform route guidance using the navigation HMI 52 based on the route on the map. The navigation device 50 may be realized by, for example, a function of a terminal device such as a smartphone or a tablet terminal possessed by an occupant. The navigation device 50 may transmit a present position and a destination to a navigation server via the communication device 20 to acquire the same route as the route on the map from the navigation server.

The MPU 60 includes, for example, a recommended lane determiner 61 and retains second map information 62 in a storage device such as an HDD or a flash memory. The recommended lane determiner 61 divides the route on the map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location in the route on the map, the recommended lane determiner 61 determines a recommended lane so that the own vehicle M can travel in a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently by communicating with another device using the communication device 20.

The driving operator 80 includes, for example, an accelerator pedal, a brake pedal, a shift lever, a steering wheel, a heteromorphic steering wheel, a joystick, and other operators. A sensor that detects whether there is an operation or an operation amount is mounted in the driving operator 80 and a detection result is output to the automated driving control device 100 or some or all of the travel driving power output device 200, the brake device 210, and the steering device 220.

The automated driving control device 100 includes, for example, a first controller 120 and a second controller 190. Each of the first controller 120 and the second controller 190 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as an HDD or a flash memory of the automated driving control device 100 or may be stored in a detachably mounted storage medium (a non-transitory storage medium) such as a DVD, a CD-ROM, or the like so that the storage medium (a non-transitory storage medium) is mounted on a drive device to be installed on the HDD or the flash memory of the automated driving control device 100.

Figure 2:
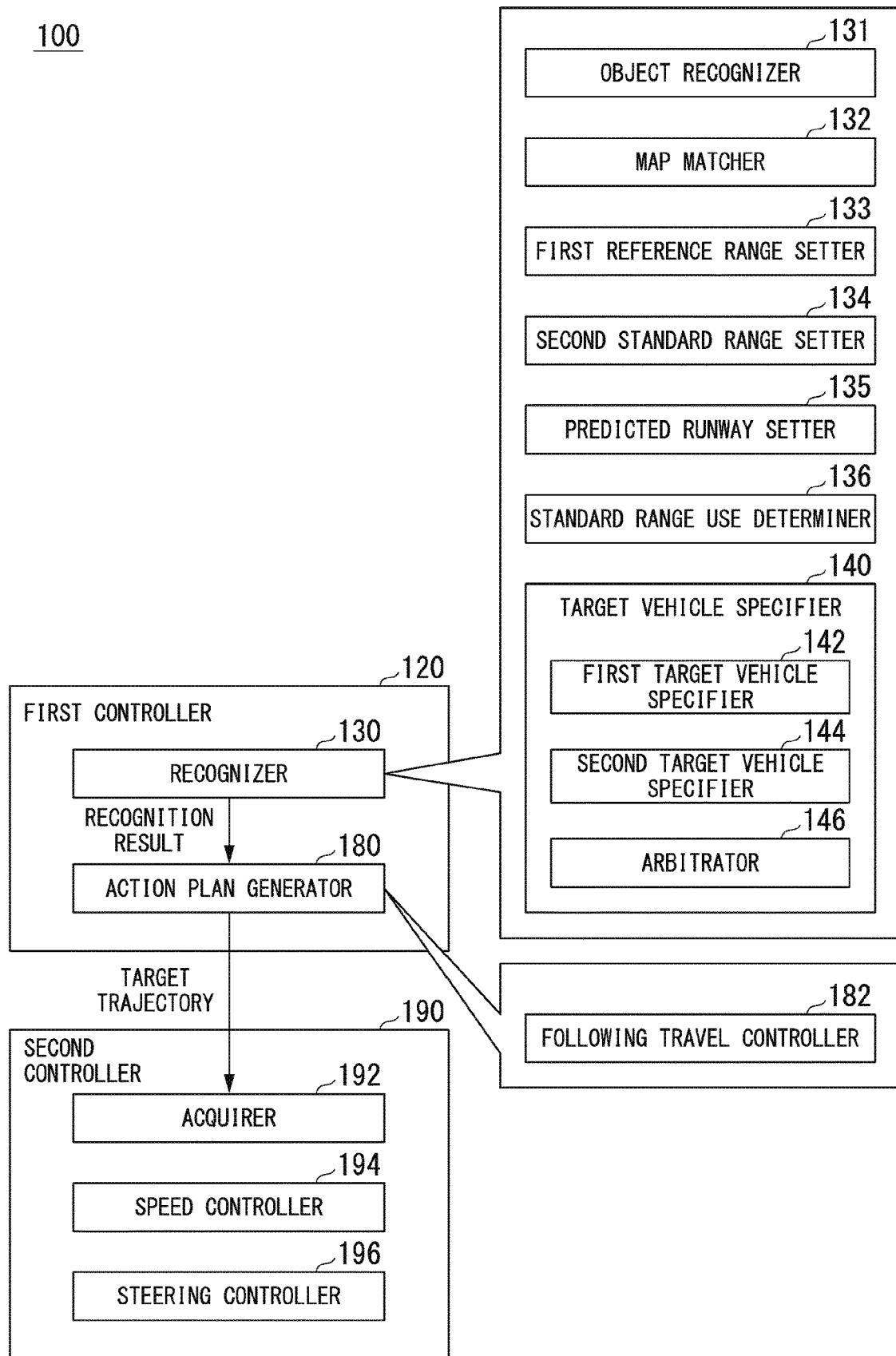
FIG. 2 is a diagram illustrating a functional configuration of a first controller and a second controller.

FIG. 2 is a diagram illustrating a functional configuration of the first controller 120 and the second controller 190 of the automated driving control device 100 according to the first embodiment. The first controller 120 includes, for example, a recognizer 130 and an action plan generator 180. The first controller 120 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 130 includes, for example, an object recognizer 131, a map matcher 132, a first standard range setter 133, a second standard range setter 134, and a target vehicle specifier 140.

The object recognizer 131 recognizes states of a position, a speed, acceleration, and the like of an object near the own vehicle M based on information input from the camera 10, the radar device 12, and the finder 14 via the object recognition device 16. The recognizer 130 recognizes an inter-vehicle distance or the like for each vehicle when a plurality of vehicles are in front of the own vehicle M. For example, the position of the object is recognized as a position of an absolute coordinate system (for example, a vehicle coordinate system) in which is a representative point (a center of gravity, a driving axis center, or the like) of the own vehicle M is the origin and is used for control. The position of the object may be represented as a representative point such as a center of gravity of the object, a middle portion of the front end of the object in the vehicle with direction, or a middle portion, a corner, a side end portion, or the like of the rear end of the object in the vehicle width direction or may be represented as an area. Positions of a plurality of points may be recognized as necessary. The object recognizer 131 may output reliability of the recognition of the object in association with each of the recognized objects. The object recognizer 131 calculates the reliability of the recognition of the object based on a dispersion of distribution of an edge obtained from an image of the camera 10, intensity of a reflected wave detected by the radar device 12, a dispersion of distribution of the intensity of light detected by the finder 14, continuity of recognition of the object, or the like. In the following description, the reliability associated with the object is referred to as object reliability in some cases. The object reliability is output as, for example, quantized information (rank information) such as High, Intermediate, and Low.

The map matcher 132 compares the position of the own vehicle M specified by the navigation device 50, an image captured by the camera 10, an output of an azimuth sensor included in the vehicle sensor 40, or the like with the second map information 62 and recognizes on which road and in which lane the own vehicle M is traveling in the map. Further, based on the foregoing various kinds of information, the map matcher 132 recognizes at which position the representative point of the own vehicle M is in the width direction of the lane (hereinafter referred to as a side position). The side position may be derived as an offset amount from a road demarcation line on one of the right and the left of the lane or may be derived as an offset amount from the middle of the lane. The map matcher 132 recognizes an angle at which a travel direction of the own vehicle M at that time is inclined with respect to the extension direction of the lane (hereinafter referred to as a yaw angle) based on the foregoing various kinds of information. When there is no sufficient matching reliability as a result of the comparison of the position of the own vehicle M specified by the navigation device 50, the image captured by the camera 10, the output of the azimuth sensor included in the vehicle sensor 40, or the like with the map information 62, the map matcher 132 outputs information indicating a matching failure to the first standard range setter 133. A case in which "the comparison cannot be made" also includes a case in which there is no map corresponding to the position of the own vehicle M specified by the navigation device 50.

The first standard range setter 133, the second standard range setter 134, and a predicted runway setter 135 set standard information for setting a range in which the own vehicle M travels from now, that is, a range in which another vehicle has to be particularly monitored after control, in accordance with each different technique. For example, the standard information is used to specify a target vehicle traveling in front of the own vehicle M and is used for control by the own vehicle M. The target vehicle is, for example, a vehicle which is a target following and traveling at intervals of a given inter-vehicle distance. The present invention is not limited thereto and the target vehicle may be a vehicle or the like of which the degree of monitoring is the highest in the front monitoring. The standard information includes, for example, three pieces of information, a first standard range AR1ref, a second standard range AR2ref, and a predicted runway ETJ. For example, each piece of standard information is virtually set to a range on the vehicle coordinate system.

Figure 3:
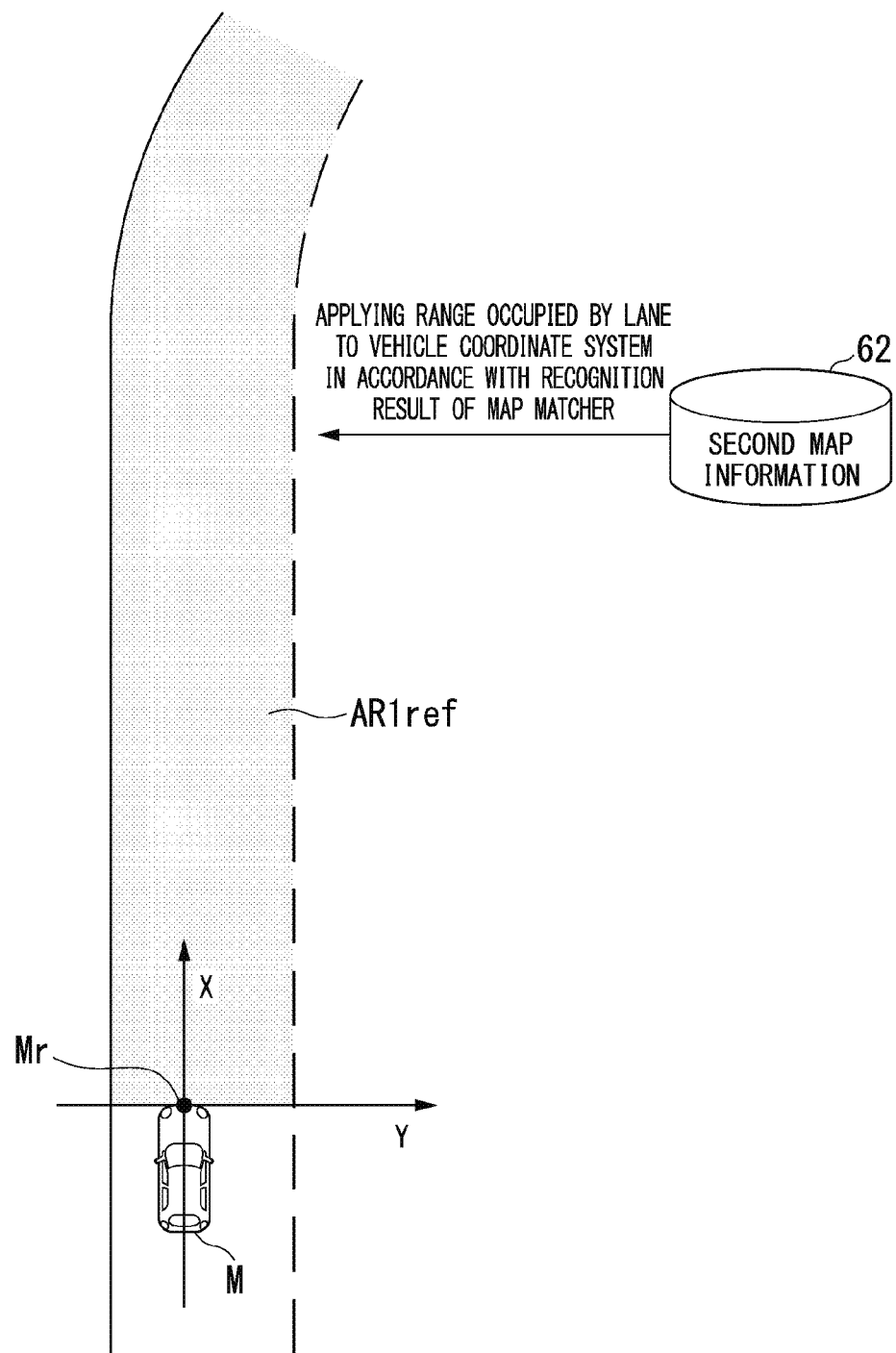
FIG. 3 is a diagram illustrating a technique for setting a first standard range.

The first standard range setter 133 sets the first standard range AR1ref based on a recognition result of the map matcher 132. FIG. 3 is a diagram illustrating a technique for setting the first standard range AR1ref. The first standard range setter 133 sets the first standard range AR1ref by applying a range obtained from the recognition result of the map matcher 132 and occupied by a lane in which the position of the own vehicle M is a standard to the vehicle coordinate system. In the vehicle coordinate system, a representative point Mr of the own vehicle M is the origin, a direction of a central axis in the width direction of the vehicle is the X axis, the width direction is the Y axis. The first standard range setter 133 does not set the first standard range AR1ref when information indicating a matching failure is acquired from the map matcher 132. Thus, the automated driving control device 100 can suppress a mistake of a relative position to a lane of the target vehicle.

Figure 4:
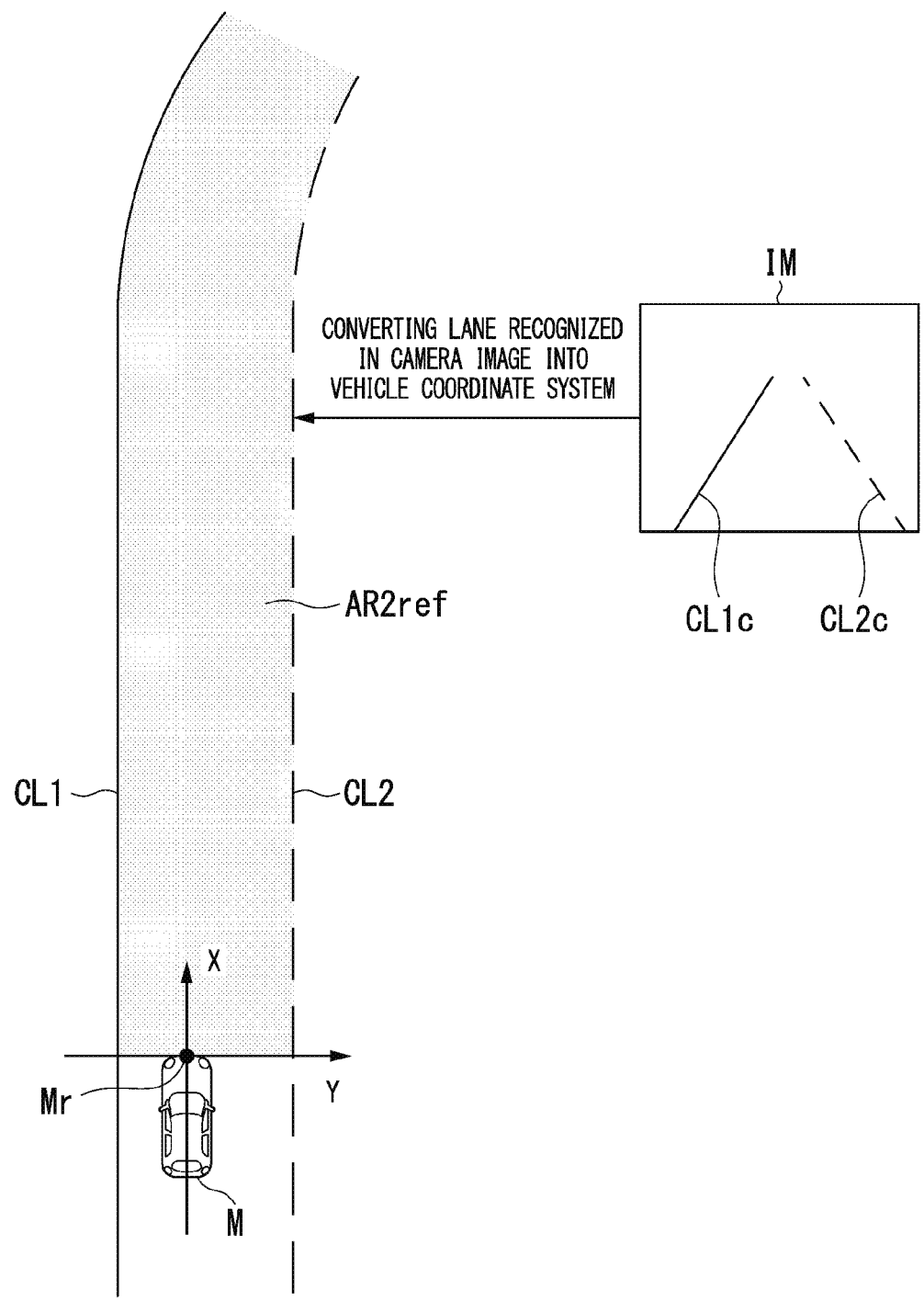
FIG. 4 is a diagram illustrating a technique for setting a second standard range.

The second standard range setter 134 sets a second standard range AR2ref by analyzing an image IM captured by the camera 10. FIG. 4 is a diagram illustrating a technique for setting the second standard range AR2ref. The second standard range setter 134 extracts edge points with a large luminance difference from adjacent pixels in the image IM and recognizes road demarcation lines CL1c and CL2c on an image plane in which the edge points are lined. Then, the second standard range setter 134 virtually sets road demarcation lines CL1 and CL2 by converting the positions of points of the road demarcation lines CL1c and CL2c into the vehicle coordinate system and sets a range demarcated by the road demarcation lines CL1 and CL2 as the second standard range AR2ref. The second standard range setter 134 may sets the second standard range Ar2ref by further adding a detection result of the finder 14. The second standard range setter 134 may output reliability of the set second standard range AR2ref. The second standard range setter 134 calculates the reliability of the second standard range AR2ref, for example, based on the degree of dispersion of the edge points, the number of linear arrays, or the like, and outputs the reliability of the second standard range AR2ref to the action plan generator 180.

Figure 5:
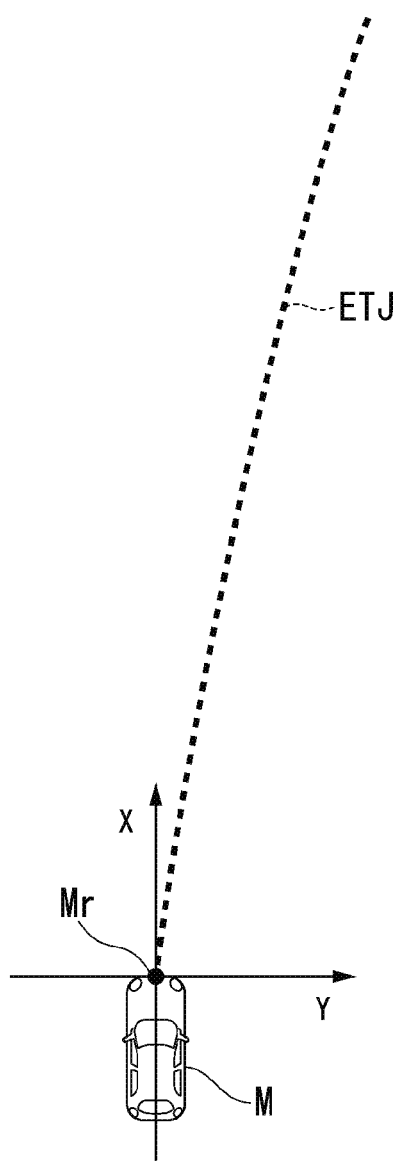
FIG. 5 is a diagram illustrating a technique for setting a predicted runway.

The predicted runway setter 135 sets the predicted runway ETJ based on a speed V output by the vehicle speed sensor and a yaw rate Yr output by the yaw rate sensor included in the vehicle sensor 40. FIG. 5 is a diagram illustrating a technique for setting the predicted runway ETJ. For example, the predicted runway setter 135 calculates a predicted radius of curvature R by dividing the speed V by the yaw rate Yr and sets a circular arc track in which the own vehicle M is assumed to travel in a circular track with the predicted radius of curvature R as a predicted runway.

Figure 6:
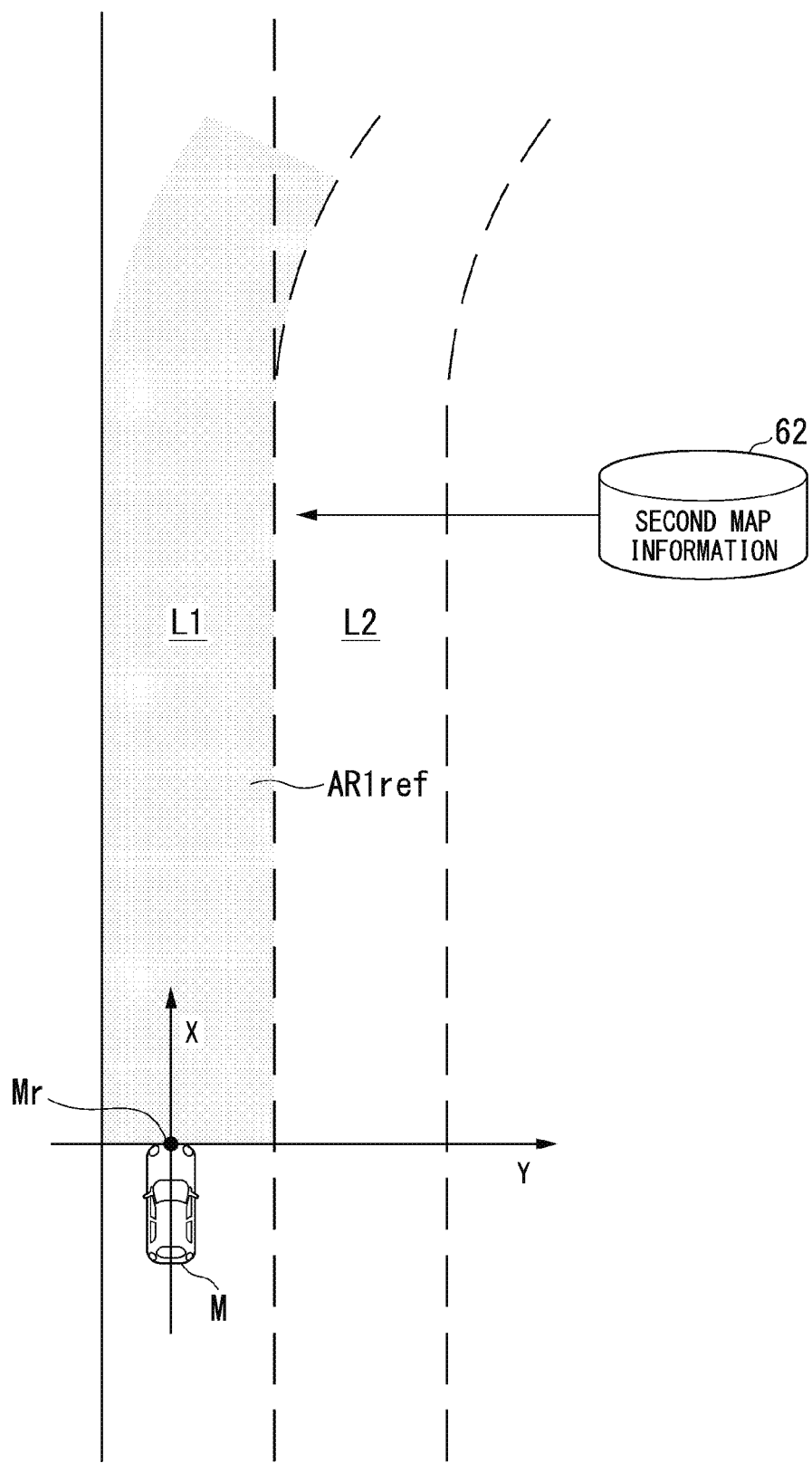
FIG. 6 is a diagram exemplifying a scenario in which the first standard range is inappropriate.

In each of the first standard range AR1ref, the second standard range AR2ref, and the predicted runway ETJ, there are advantages and disadvantages in the standard of the searching range. The first standard range AR1ref can be set precisely up to a distant location. However, since it is assumed that there is a map, measures for a new road cannot be taken. When a recognition result of the map matcher 132 is erroneous despite presence of a map, the range may be erroneous in some cases. FIG. 6 is a diagram exemplifying a scenario in which the first standard range AR1ref is inappropriate. In an illustrated scenario, the own vehicle M is traveling in a lane L1 which is actually straight, but the map matcher 132 mistakes that the own vehicle M is traveling in a lane L2 branched to the right side. In this case, the first standard range AR1ref is generated in a shape curved to the right. Therefore, a location more distant than a branching spot has to be originally monitored in a straight direction, but a location to the right may be monitored.

Since the second standard range AR2ref is based on a result obtained by analyzing the image IM of the camera 10, the second standard range AR2ref can be set even in a place where there is no map, but an error occurs in image analysis in some cases. Since the predicted runway ETJ is set based on the yaw rate Yr at the time of setting, the predicted runway ETJ can be set with the degree of precision that there is no map and precision of image analysis degrades due to severe weather in some cases. However, when a start spot or an end spot of a curve is in front of the own vehicle M, it is difficult to set the predicted runway ETJ appropriately on the side more away than that spot.

In view of such circumstances, in the automated driving control device 100 according to the embodiment, the recognizer 130 and the action plan generator 180 can set a searching range within an appropriate range, monitor surroundings, and appropriately specify a target vehicle in cooperation. The details will be described later.

Figure 7:
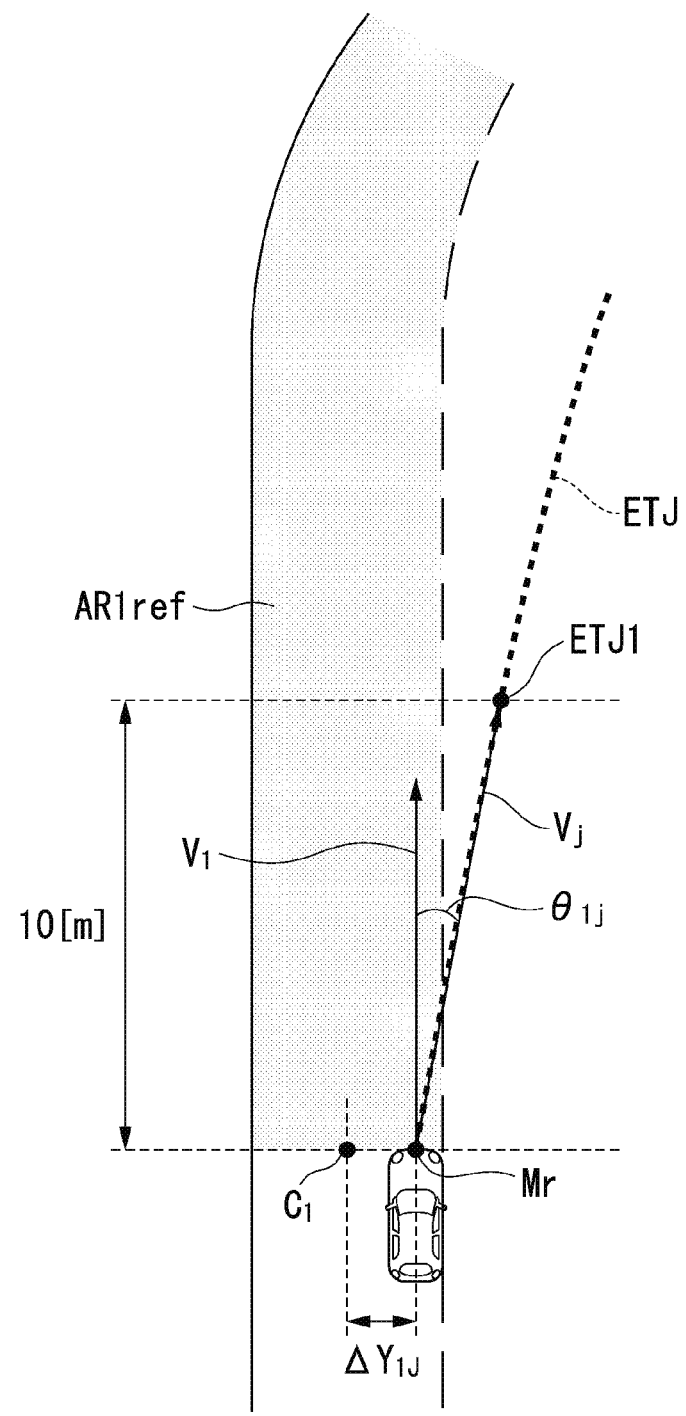
FIG. 7 is a diagram illustrating a process of a first standard range use determiner.

A standard range use determiner 136 determines whether to use the first standard range AR1ref and determine whether to use the second standard range AR2ref. FIG. 7 is a diagram illustrating a process of the standard range use determiner 136. The standard range use determiner 136 outputs a non-use flag indicating that the first standard range AR1ref is not usable to the target vehicle specifier 140 when at least one of (1) the fact that an angle $\theta_{1j}$ formed by a vector $V_1$ extending along a central axis in the width direction of the first standard rang AR1ref and a vector $V_j$ from the position of the own vehicle M to an arrival point ETJ1 in front by a predetermined distance (for example, 10 [m]) in the predicted runway ETJ is equal to or greater than a threshold (for example, about 3 degrees) and (2) the fact that a separation $\Delta Y_{1j}$ between a central point $C_1$ at a start position of the first standard range AR1ref in the width direction and a start point (that is, a position of a representative point Mr of the own vehicle M) of the predicted runway ETJ is equal to or greater than a threshold (for example, about 0.5 [m]) is satisfied. Similarly, although not illustrated, the standard range use determiner 136 outputs a non-use flag indicating that the second standard range AR2ref is not usable to the target vehicle specifier 140 when at least one of (1) the fact that an angle $\theta_{2j}$ formed by a vector $V_2$ extending along a central axis in the width direction of the second standard rang AR2ref and the vector $V_j$ from the position of the own vehicle M to the arrival point ETJ1 in front by a predetermined distance (for example, 10 [m]) in the predicted runway ETJ is equal to or greater than the threshold (for example, about 3 degrees) and (2) the fact that a separation $\Delta Y_{2j}$ between a central point $C_2$ at a start position of the second standard range AR2ref in the width direction and the start point (that is, the position of a representative point Mr of the own vehicle M) of the predicted runway ETJ is equal to or greater than a threshold (for example, about 0.5 [m]) is satisfied. The standard range use determiner 136 performs one of the foregoing processes depending on whether the first standard range AR1ref is set or the second standard range AR2ref is set.

The target vehicle specifier 140 includes a first target vehicle specifier 142, a second target vehicle specifier 144, and an arbitrator 146. The target vehicle specifier 140 specifies a target vehicle which is a standard of control by the action plan generator 180. For example, a following travel controller 182 of the action plan generator 180 maintains a set distance as a principle of an inter-vehicle distance from the target vehicle and performs so-called following travel in which the own vehicle M travels at a side position with the target vehicle. The set distance may be variable in congestion or the like. The present invention is not limited thereto. The target vehicle may be treated as a main monitoring target which is in front of the own vehicle M. The details of the target vehicle specifier 140 will be described later.

The action plan generator 180 generates a target trajectory along which the own vehicle M travels in future automatedly so that the own vehicle M is traveling along a recommended lane determined by the recommended lane determiner 61 and can handle a surrounding situation of the own vehicle M in principle. The target trajectory includes, for example, a speed component. For example, the target trajectory is expressed by arranging spots (trajectory points) at which the own vehicle M will arrive in sequence. The trajectory point is a spot at which the own vehicle M will arrive for each predetermined travel distance (for example, about several [m]) in a distance along a road. Apart from the trajectory points, target acceleration and a target speed are generated as parts of the target trajectory for each of predetermined sampling times (for example, about a decimal point of a second). The trajectory point may be a position at which the own vehicle M will arrive at the sampling time for each predetermined sampling time. In this case, information regarding the target acceleration or the target speed is expressed according to an interval between the trajectory points.

The action plan generator 180 may set an automated driving event when the target trajectory is generated. As the automated driving event, there are a constant speed traveling event, a following travel event performed by the following travel controller 182, a lane changing event, a branching event, a joining event, a takeover event, and the like. The action plan generator 180 generates the target trajectory in accordance with an activated event.

The second controller 190 controls the travel driving power output device 200, the brake device 210, and the steering device 220 so that the own vehicle M passes along the target trajectory generated by the action plan generator 180 at a scheduled time.

The second controller 190 includes, for example, an acquirer 192, a speed controller 194, and a steering controller 196. The acquirer 192 acquires information regarding the target trajectory (trajectory points) generated by the action plan generator 180 and stores the information in a memory (not illustrated). The speed controller 194 controls the travel driving power output device 200 or the brake device 210 based on a speed element incidental to the target trajectory stored in the memory. The steering controller 196 controls the steering device 220 in accordance with a curve state of the target trajectory stored in the memory. Processes of the speed controller 194 and the steering controller 196 are realized, for example, by combining feed-forward control and feedback control. For example, the steering controller 196 performs the feed-forward control in accordance with a curvature of a road in front of the own vehicle M and the feedback control based on separation from the target trajectory in combination.

The travel driving power output device 200 outputs a travel driving force (torque) for traveling the vehicle to a driving wheel. The travel driving power output device 200 includes, for example, a combination of an internal combustion engine, an electric motor and a transmission, and an electronic control unit (ECU) controlling these units. The ECU controls the foregoing configuration in accordance with information input from the second controller 190 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 190 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 190 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second controller 190 or information input from the driving operator 80.

[Specifying Target Vehicle]

Figure 8:
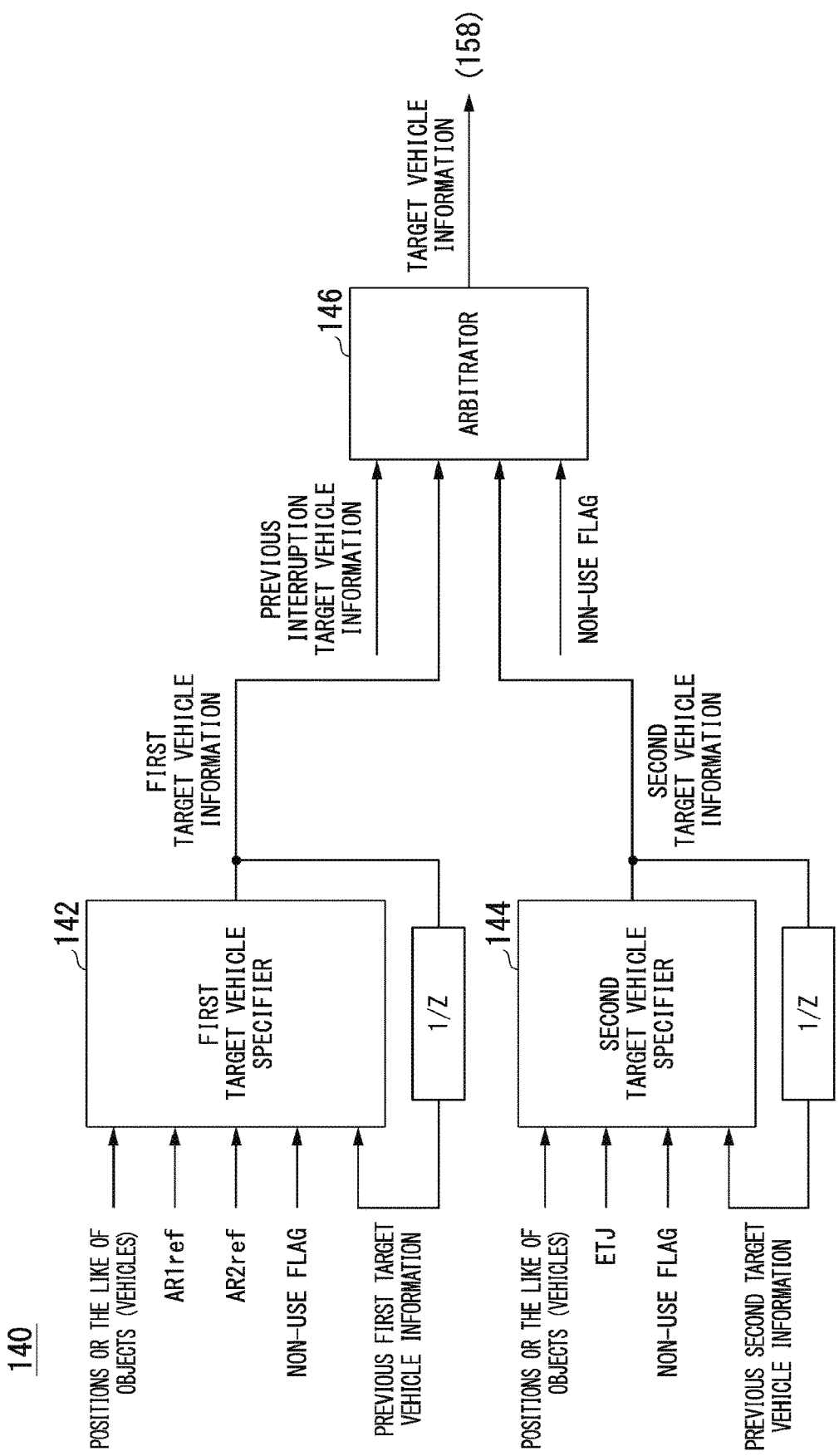
FIG. 8 is a diagram illustrating a function of a target vehicle specifier.

Hereinafter, specifying of a target vehicle will be described. FIG. 8 is a diagram illustrating a function of the target vehicle specifier 140. The first target vehicle specifier 142 and the second target vehicle specifier 144 operate in parallel, for example, while a traveling event based on a target vehicle is activated.

Information regarding positions or the like of objects (hereinafter referred to as other vehicles), the first standard range AR1ref, the second standard range AR2ref, a non-use flag, and feedback of first target vehicle information output by the first target vehicle specifier 142 at a previous process cycle are input to the first target vehicle specifier 142. The first target vehicle specifier 142 outputs the first target vehicle information based on the information. The first target vehicle information is information for specifying one of the other vehicles of which the positions or the like are input to the target vehicle specifier 140.

Information regarding positions or the like of the other vehicles, the predicted runway ETJ, the non-use flag, and feedback of second target vehicle information output by the second target vehicle specifier 144 at a previous process cycle are input to the second target vehicle specifier 144. The second target vehicle specifier 144 outputs the second target vehicle information based on the information. The second target vehicle information is information for specifying one of the other vehicles of which the positions or the like are input to the target vehicle specifier 140.

The first target vehicle information, the second target vehicle information, previous interruption target vehicle information, and a use or non-use flag are input to the arbitrator 146. The arbitrator 146 selects one of the first target vehicle information and the second target vehicle information and outputs the selected information to the following travel controller 158.

(Setting Reference Range)

Each of the first target vehicle specifier 142 and the second target vehicle specifier 144 uniquely sets a reference range and specifies a target vehicle within the reference range. As the reference range, there are an initial searching range and a tracking range. The initial searching range is a range that is applied to other vehicles (target vehicle candidates) recognized initially at a current process cycle among processes of specifying the target vehicle repeatedly. The tracking range is a range that is applied to vehicles recognized at a previous process cycle. As the initial searching range, there are a first initial searching range, a second initial searching range, and a third initial searching range. As the tracking range, there are a first tracking range, a second tracking range, and a third tracking range. The first initial searching range or the first tracking range is an example of a "first reference range, the second initial searching range or the second tracking range is an example of a "second reference range, and the third initial searching range or the third tracking range is an example of a "third reference range."

The first target vehicle specifier 142 performs one of setting the first initial searching range AR1-1 and the first tracking range AR1-2 based on the first standard range AR1ref and setting of a second initial searching range AR2-1 and a second tracking range AR2-2 based on the second standard range AR2ref. When the first standard range AR1ref is input and the non-use flag is not input (hereinafter this case is referred to as a case of "map presence"), the first target vehicle specifier 142 sets the first initial searching range AR1-1 and the first tracking range AR1-2. On the other hand, when the first standard range AR1ref is not input or when the first standard range AR1ref is input and the non-use flag is input (hereinafter this case is referred to as a case of "map absence"), the first target vehicle specifier 142 sets the second initial searching range AR2-1 and the second tracking range AR2-2 based on the second standard range AR2ref. Hereinafter, a case in which the first standard range AR1ref is input and the non-use flag is input is referred to as a "case of non-use of the first standard range" in some cases.

Figure 9:
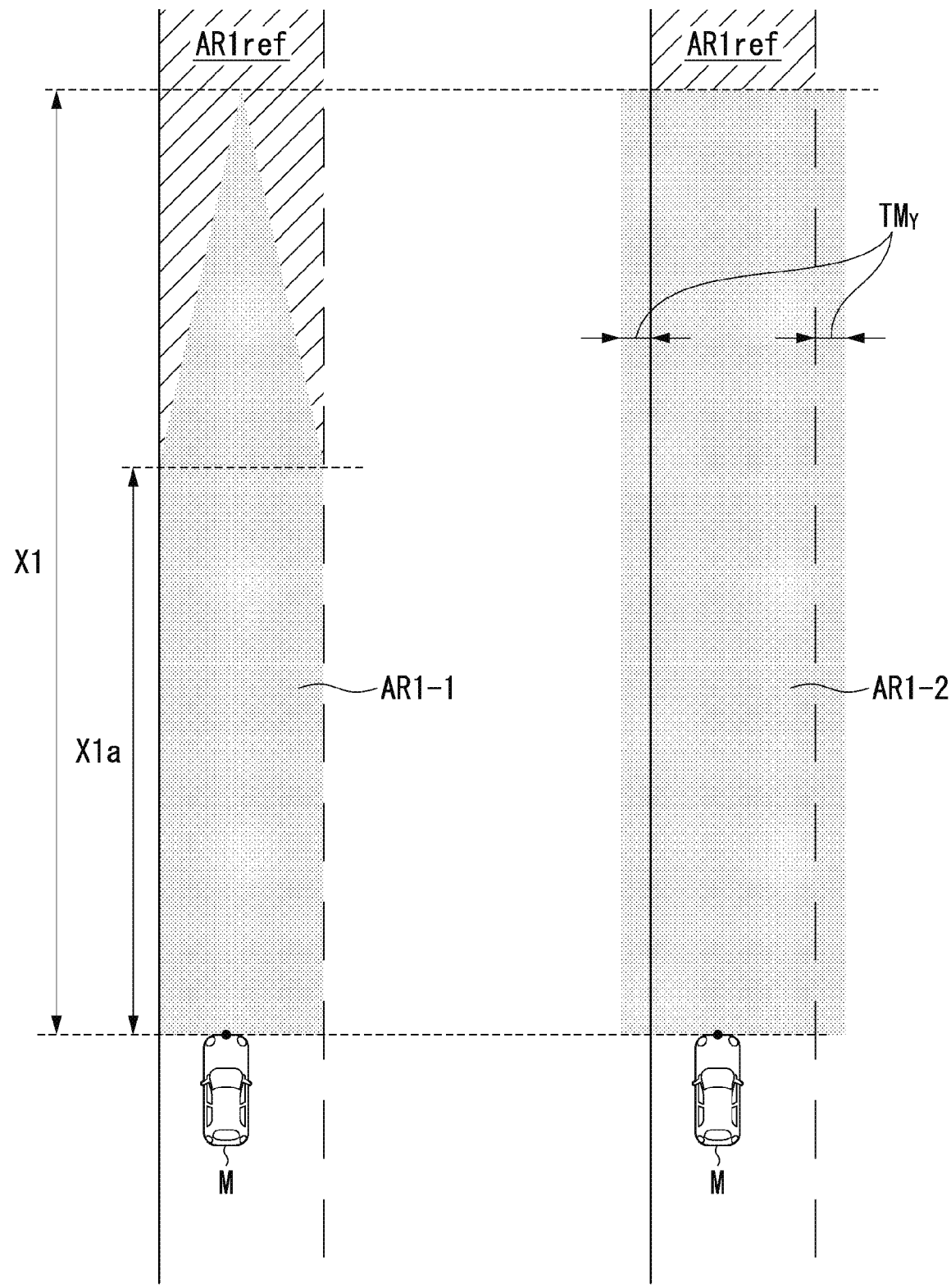
FIG. 9 is a diagram exemplifying a first initial searching range and a first tracking range set by a first target vehicle specifier.

FIG. 9 is a diagram exemplifying the first initial searching range AR1-1 and the first tracking range AR1-2 set by the first target vehicle specifier 142. Hereinafter, a number after "-" indicates an initial searching range or a tracking range. The first target vehicle specifier 142 sets the first initial searching range AR1-1 so that a width of a space from the own vehicle M to a distance X1$a$ is the same range as the first standard range AR1ref and a width of a space from the distance X1$a$ to a distance X1 narrows away from the own vehicle M. The first target vehicle specifier 142 sets the first tracking range AR1-2 to a range in which the first standard range AR1ref is expanded to both the right and left sides by a tracking margin $TM_Y$ in the width direction from the own vehicle M over the distance X1. In the drawing, the first standard range AR1ref is represented as being present up to a place more distant than X1, but X1 may be equal to a distance up to the termination end of the first standard range AR1ref.

Figure 10:
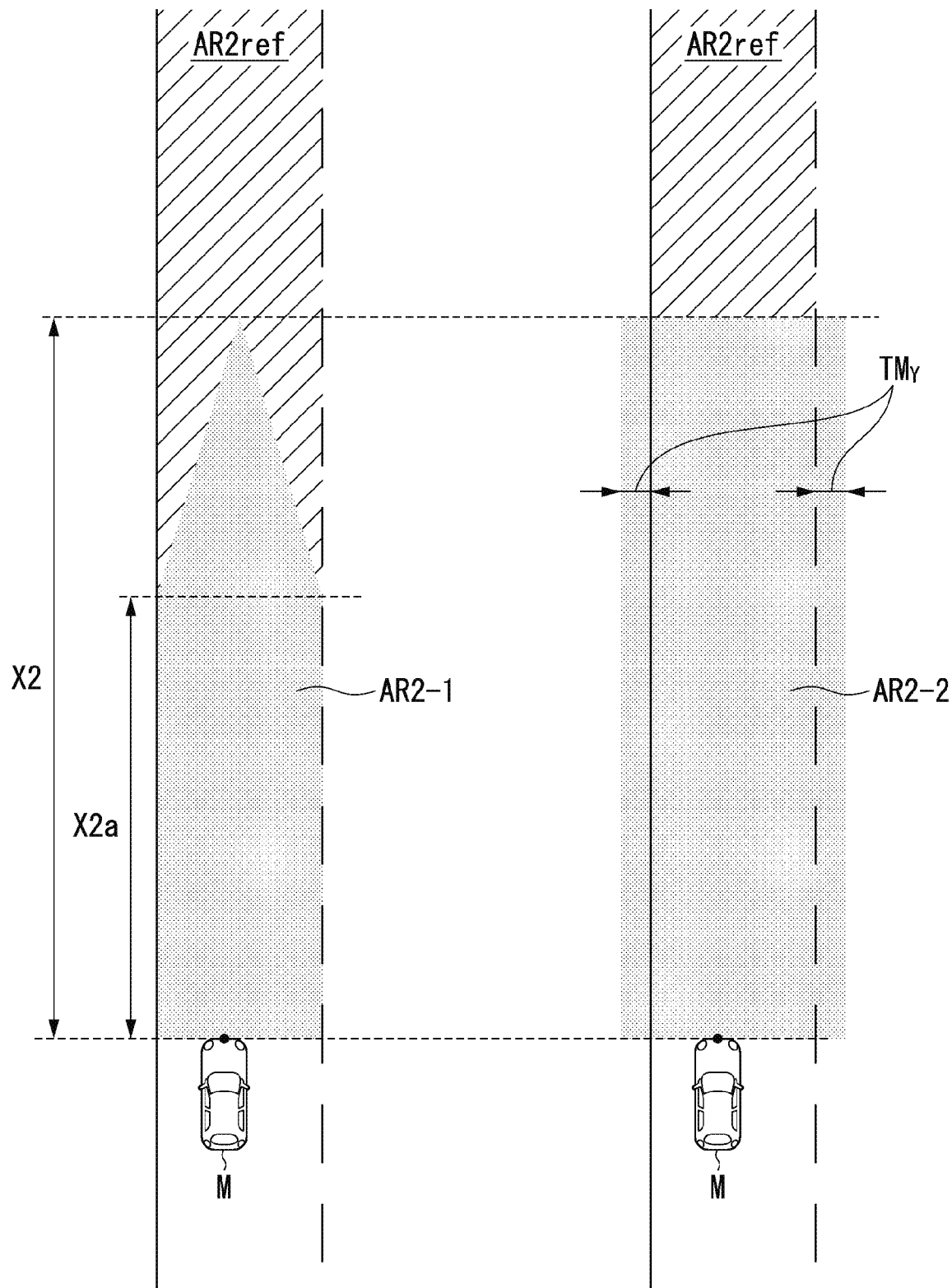
FIG. 10 is a diagram exemplifying a second initial searching range and a second tracking range set by the first target vehicle specifier.

FIG. 10 is a diagram exemplifying the second initial searching range AR2-1 and the second tracking range AR2-2 set by the first target vehicle specifier 142. The first target vehicle specifier 142 sets the second initial searching range AR2-1 so that a width of a space from the own vehicle M to a distance X2$a$ is the same range as the second standard range AR2ref and a width of a space from the distance X2$a$ to a distance X2 is narrowed away from the own vehicle M. The first target vehicle specifier 142 sets the second tracking range AR2-2 to a range in which the second standard range AR2ref is expanded to both the right and left sides by the tracking margin $TM_Y$ in the width direction from the own vehicle M to the distance X2.

Figure 11:
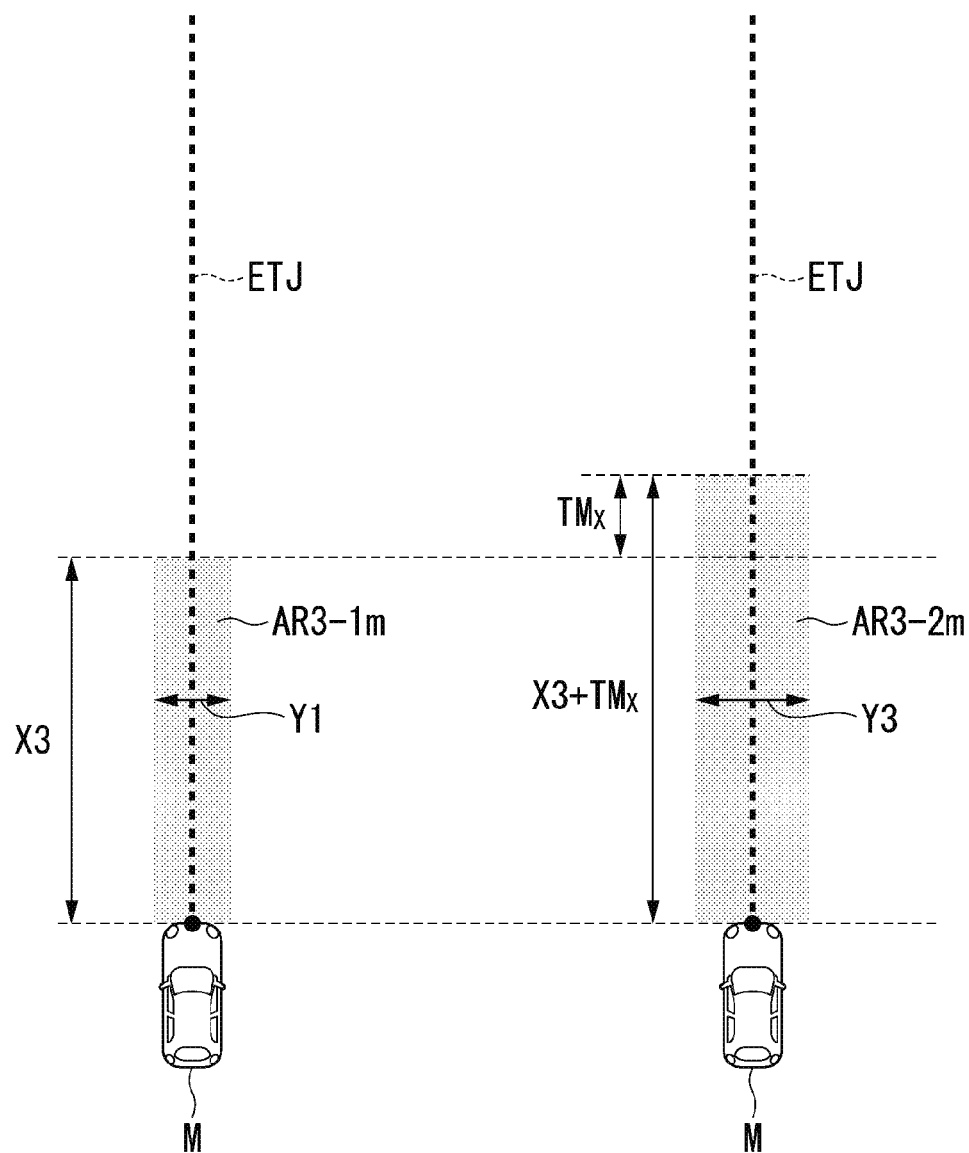
FIG. 11 is a diagram exemplifying a third initial searching range and a third tracking range set by a second target vehicle specifier in the case of "map presence."

FIG. 11 is a diagram exemplifying a third initial searching range AR3-1m and a third tracking range AR3-2m set by the second target vehicle specifier 144 in the case of "map presence." A suffix "m" of a reference numeral indicates the "map presence." The second target vehicle specifier 144 sets a range that has a width Y1 centering on the predicted runway ETJ and extends from the own vehicle M up to a distance X3 as the third initial searching range AR3-1m. X3 is a function of a predicted radius of curvature R and a speed V, and a value less than X1 is set as an upper limit (there is an exception which will be described below). The second target vehicle specifier 144 sets a range that has a width Y3 centering on the predicted runway ETJ and extends from the own vehicle M up to a distance obtained by adding a tracking margin $TM_X$ to X3 as the third tracking range AR3-2m. Y1<Y3 is satisfied. Y1 is set to a value close to the vehicle width of the own vehicle M. As a result, the third initial searching range AR3-1m is set to a range corresponding to a scheduled travel track of the own vehicle M.

Figure 12:
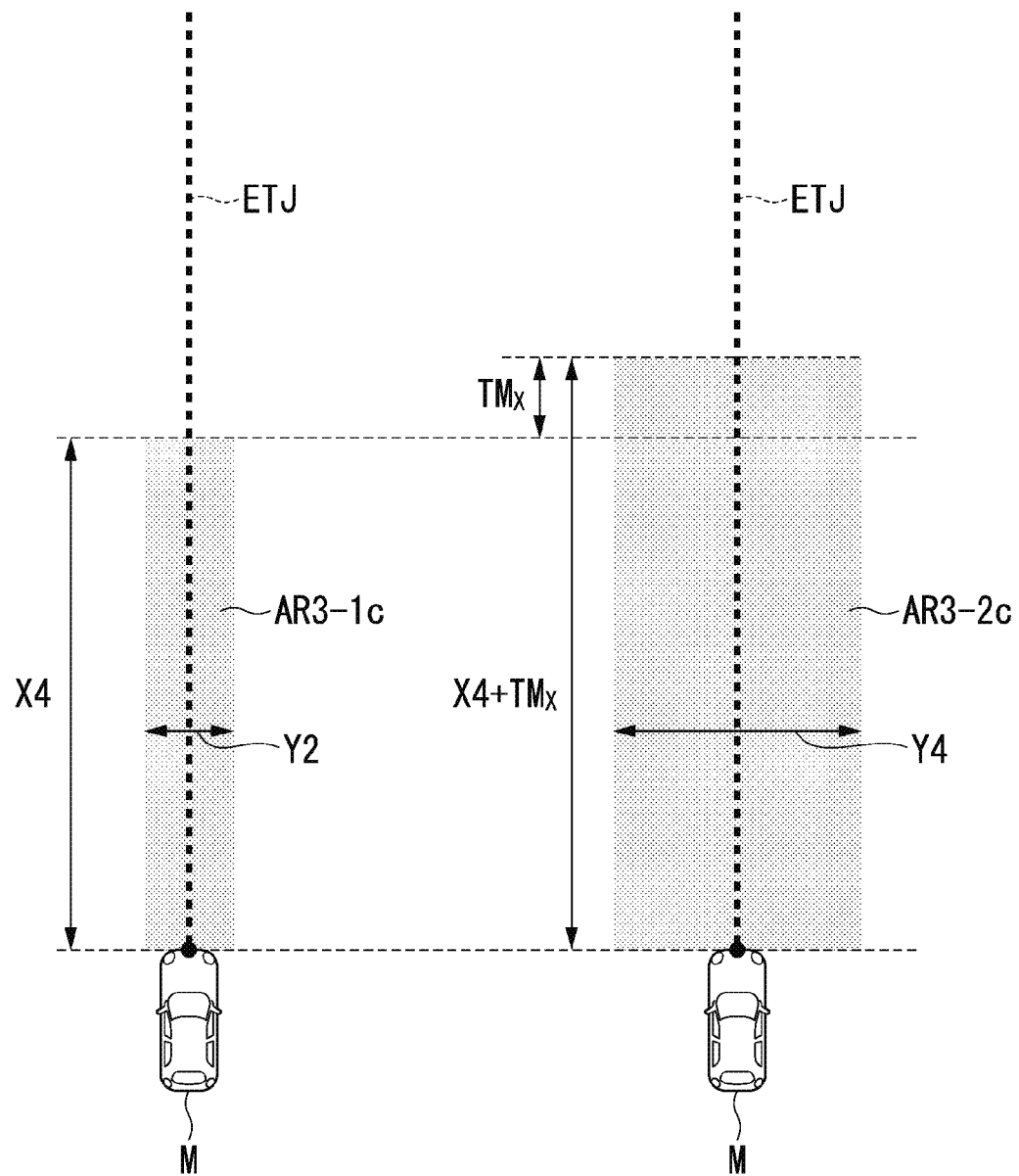
FIG. 12 is a diagram exemplifying the third initial searching range and the third tracking range set by a second target vehicle specifier in the case of "map absence."

FIG. 12 is a diagram exemplifying the third initial searching range AR3-1c and the third tracking range AR3-2c set by the second target vehicle specifier 144 in the case of "map absence." A suffix "c" of a reference numeral indicates a "camera." The second target vehicle specifier 144 sets a range that has the width $Y_2$ centering on the predicted runway ETJ and extends from the own vehicle M up to a distance X4 as a third initial searching range AR3-1c. X4 is a function of the predicted radius of curvature R and the speed V, and a value less than X1 is set as an upper limit (there is an exception which will be described below). A function of obtaining X4 is a function of deriving a value larger than a function of obtaining X3 when an input value is the same. The second target vehicle specifier 144 sets a range that has a width Y4 centering on the predicted runway ETJ and extends from the own vehicle M up to a distance obtained by adding the tracking margin $TM_X$ to X4 as a third tracking range AR3-2c. Y2<Y4 is satisfied. Y4 is a value set to be larger than a lane width (for example, the lane width is substantially equal to a width expanded to the right and left by the tracking margin $TM_Y$). The second target vehicle specifier 144 determines "map presence" or "map absence" based on the non-use flag and switches the length or width of the reference range (to be described below), but the predicted runway setter 135 may have some or all of the functions. For example, the predicted runway setter 135 may switch the length of the predicted runway ETJ with reference to the non-use flag.

FIG. 13 is a diagram illustrating a summary of a setting rule of various control parameters. First, a length of each reference range will be described. The reference ranges are concepts including at least a first initial searching range AR1-1, the first tracking range AR1-2, the second initial searching range AR2-1, the second tracking range AR2-2, the third initial searching range AR3-1m, the third tracking range AR3-2m, the third initial searching range AR3-1c, and the third tracking range AR3-2c.

As described above, the lengths of the first initial searching range AR1-1 and the first tracking range AR1-2 is set to X1 [m] and the lengths of the second initial searching range AR2-1 and the second tracking range AR2-2 are set to X2 [m]. Both X1 and X2 are values set in accordance with a speed of the own vehicle M and are values that are larger when the speed is larger. X1 and X2 are set so that X1>X2 are satisfied. In X1 and X2, lower limits may be provided.

The length of the third initial searching range AR3-1m in the case of "map presence" is X3 and the length of the third tracking range AR3-2m is a range obtained by adding the tracking margin $TM_X$ to X3. X3 is a function of the predicted radius of curvature R and the speed V, is longer as the predicted radius of curvature R is larger, and is longer as the speed V is faster. Here, X3 is set so that X1>(X3+$TM_X$) is satisfied. In X3, a lower limit may be provided.

The length of the third initial searching range AR3-1c in the case of "map absence" is X4 and the length of the third tracking range AR3-2c is a range obtained by adding the tracking margin $TM_X$ to X4. X4 is a function of the predicted radius of curvature R and the speed V, is longer as the predicted radius of curvature R is larger, and is longer as the speed V is faster. When the input predicted radius of curvature R and the speed V are the same, X4 is greater than X3. Here, X4 is set so that X1>(X4+$TM_X$) is satisfied. In X4, a lower limit may be provided.

Figure 14:
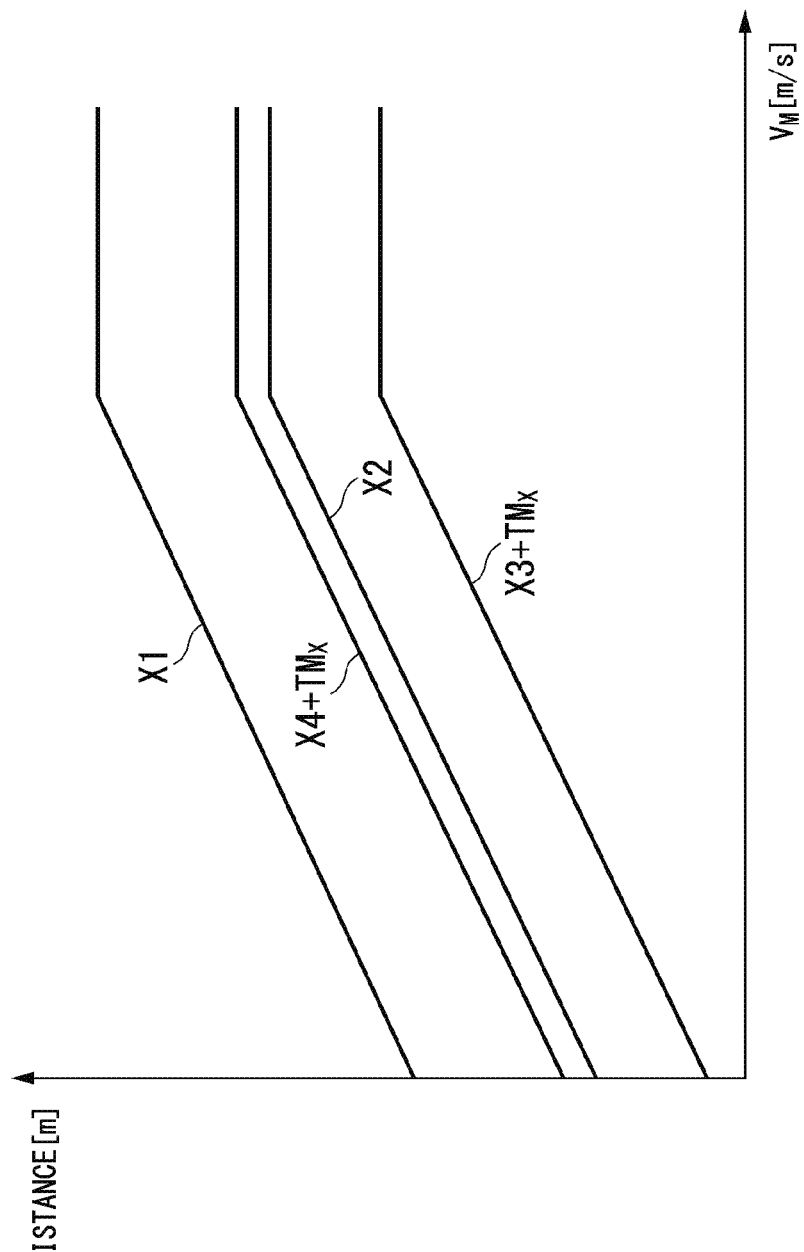
FIG. 14 is a graph illustrating examples of X1, X2, X3, and X4 set in accordance with as a speed of an own vehicle.

FIG. 14 is a graph illustrating examples of X1, X2, X3, and X4 set in accordance with as a speed $V_M$ of the own vehicle M. In addition to the speed $V_M$, X3 and X4 are set to be larger as the predicted radius of curvature R is larger. In the drawing, for example, the predicted radius of curvature R=∝ is set, that is, the own vehicle M is assumed to travel in a straight road. X3 and X4 are set to be the greatest in the case of the predicted radius of curvature R=∝. Even in this case, X1 is larger than any of X2, X3+$TM_X$, and X4+$TM_X$. By setting X1, X2, X3, and X4 so that X1, X2, X3, and X4 increase as the speed $V_M$ of the own vehicle M increases, it is possible to narrow down a monitoring range to a nearby side at the time of low speed travel in which recognition of a distant side is unnecessary, and thus reduce an occasion of erroneous detection.

As described above, the target vehicle specifier 140 sets the reference range to a more distant location when the reference range is set based on map information (for example, the second map information 62) than when the reference range is set irrespective of the map information. The fact that "the reference range is set based on the map information" is that, for example, "the reference range is set based on the first standard range AR1ref set based on the map information." Through the process, the target vehicle specifier 140 monitors up to a distant location when the reference range is set using the map information of which an error is relatively small, and limits monitoring of the distant location when the reference range is set using a camera image or a yaw rate of which an error is relatively large. Therefore, it is possible to realize early discovery of a target vehicle and suppression of erroneous detection.

Next, a width of each reference range will be described. The width of the first initial searching range AR1-1 is set to a width obtained by adding a tracking margin to a lane width on a map and a width of the first tracking range AR1-2 is set to a width obtained by adding the tracking margin to the lane width on the map. A width of the second initial searching range AR2-1 is set to a width obtained by adding the tracking margin to a lane width converted from a camera image and a width of the second tracking range AR2-2 is set to a width obtained by adding the tracking margin to a lane width converted from a camera image.

In the case of "map presence," a width of the third initial searching range AR3-1m is set to Y1 and the width of the third tracking range AR3-2m is set to Y3. Y1<Y3 is satisfied. In the case of "map absence," a width of the third initial searching range AR3-1c is set to Y2 and a width of the third tracking range AR3-2c is set to Y4. Y2<Y4 is satisfied. Y3<Y4 is satisfied and Y4 is set to a value greater than a general lane width.

In this way, the second target vehicle specifier 144 sets the width of the third reference range to be larger when the first target vehicle specifier 142 sets the second reference range irrespective of map information (for example, the second map information 62) than when the first target vehicle specifier 142 sets the first reference range based on the map information. Thus, it is possible to specify a target vehicle in accordance with a complementary relation in which an influence of a specifying result in the third reference range on the control is caused to be small when the target vehicle is specified based on a map with high precision and the influence of the specifying result in the third reference range on the control is caused to be large when the target vehicle is specified based on a camera image with low precision.

(Parallel Operation)

Figure 15:
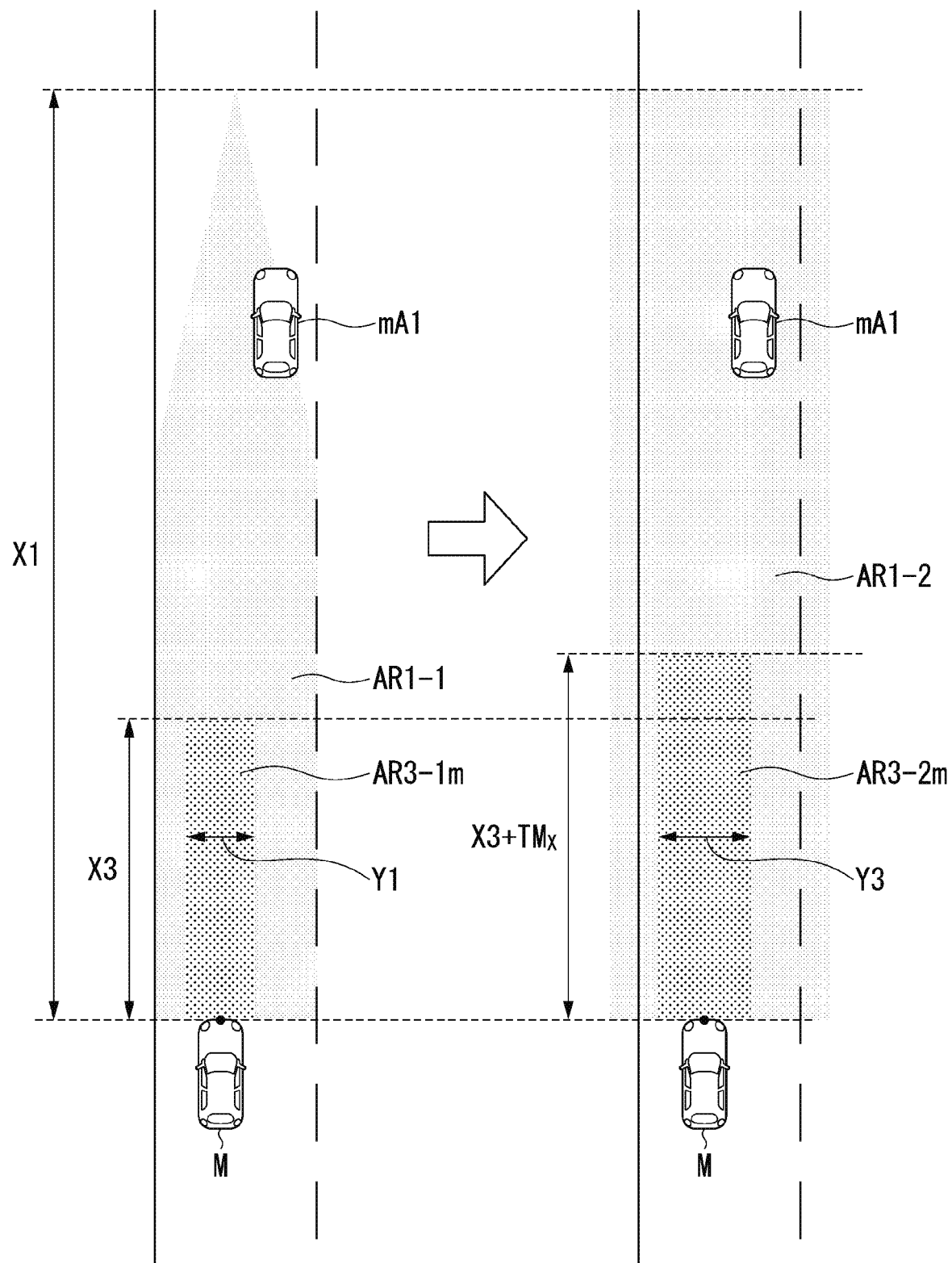
FIG. 15 is a diagram illustrating an operation of the target vehicle specifier in the case of "map presence."

Hereinafter, complementary monitoring control performed under the setting will be described. FIG. 15 is a diagram illustrating an operation of the target vehicle specifier 140 in the case of "map presence." The first target vehicle specifier 142 and the second target vehicle specifier 144 operate in parallel. That is, an operation of specifying a first target vehicle in the first initial searching range AR1-1 or the first tracking range AR1-2 and specifying the first target vehicle in the second initial searching range AR2-1 or the second tracking range AR2-2 by the first target vehicle specifier 142 and an operation of specifying the second target vehicle in the third initial searching range AR3-1m or the third tracking range AR3-2m by the second target vehicle specifier 144 are performed in parallel.

The first target vehicle specifier 142 searches for other vehicles which have not been recognized at a previous process cycle within the first initial searching range AR1-1 and traces other vehicles which have been recognized at the previous process cycle within the first tracking range AR1-2. Then, of another vehicle newly found within the first initial searching range AR1-1 and still another vehicle captured within the first tracking range AR1-2, the other vehicle close to the own vehicle M in a length direction of a road is specified as a first target vehicle. In the drawing, a vehicle mA1 is another vehicle newly found within the first initial searching range AR1-1. At a subsequent process cycle, the vehicle mA1 is traced within the first tracking range AR1-2 broader than the first initial searching range AR1-1. In this way, the target vehicle specifier 140 first performs initial searching for a vehicle in a narrow range and traces a vehicle which has been found once in a broader range, and thus it is possible to suppress inconvenience of control due to erroneous detection and to take flexible measure for wandering or the like of a target vehicle.

In parallel, the second target vehicle specifier 144 searches for another vehicle which has not been recognized at the previous process cycle within the third initial searching range AR3-1m and captures still another vehicle which has been recognized at the previous process cycle within the third tracking range AR3-2m. Then, of another vehicle which has newly been found within the third initial searching range AR3-1m and still another vehicle which has been captured within the third tracking range AR3-2m, the other vehicle close to the own vehicle M in the length direction of the road is specified as a second target vehicle. In the example of FIG. 15, since the vehicle mA is not within the third initial searching range AR3-1m, the second target vehicle specifier 144 does not specify the vehicle mA as the second target vehicle.

Figure 16:
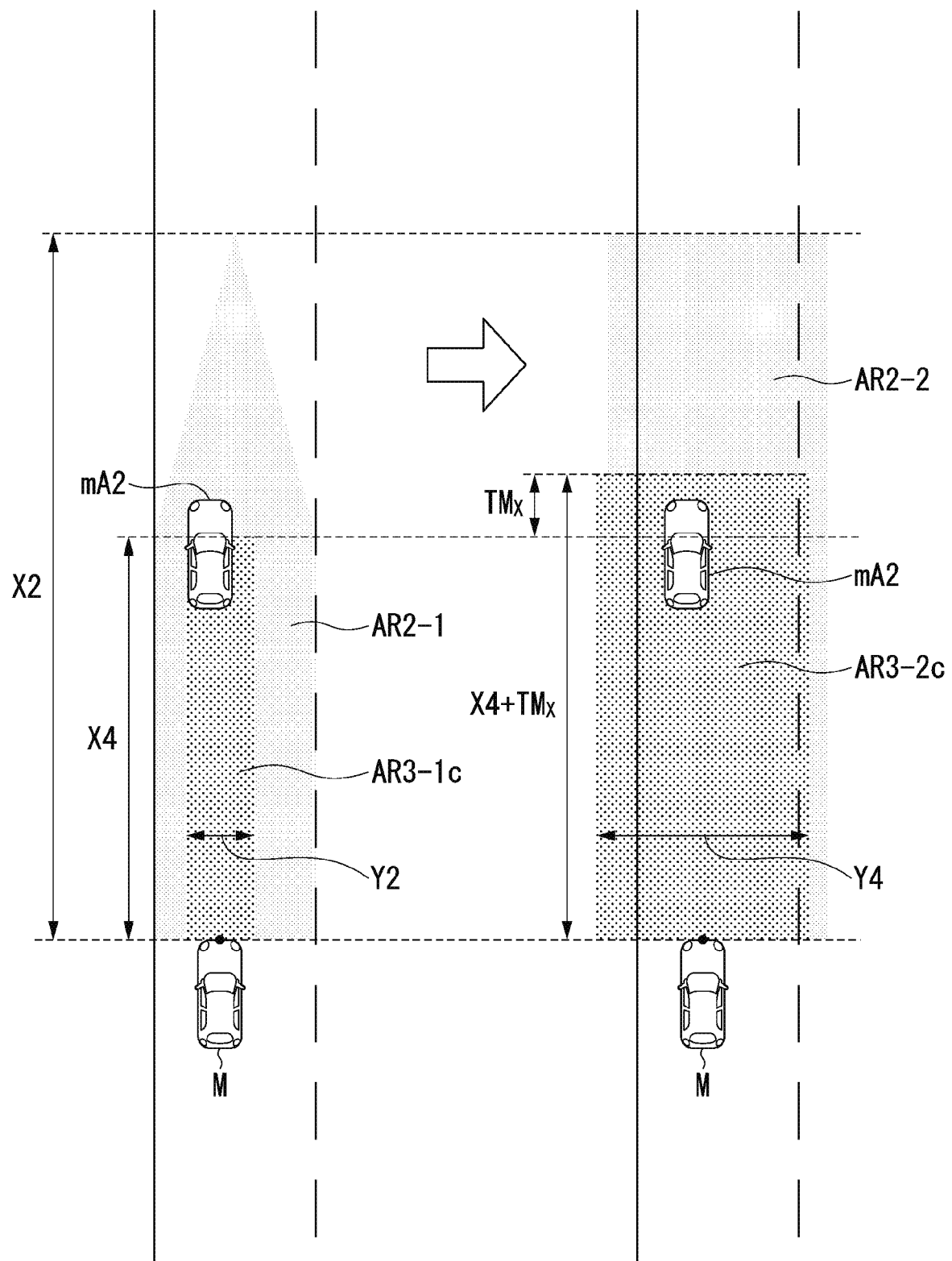
FIG. 16 is a diagram illustrating an operation of the target vehicle specifier in the case of "map absence."

FIG. 16 is a diagram illustrating an operation of the target vehicle specifier 140 in the case of "map absence." The first target vehicle specifier 142 searches for another vehicle which has not been recognized at the previous process cycle within the second initial searching range AR2-1 and traces still another vehicle which has been recognized at the previous process cycle within the second tracking range AR2-2. Then, of another vehicle newly found within the second initial searching range AR2-1 and still another vehicle captured within the second tracking range AR2-2, the other vehicle close to the own vehicle M in the length direction of the road is specified as the first target vehicle. This operation is similar to the operation in the case of "map presence," but X2 is set to be less than X1 because lane information based on the map information has higher reliability than lane information based on a camera image. In the drawing, a vehicle mA2 is another vehicle newly found within the second initial searching range AR2-1. At a subsequent process cycle, the vehicle mA2 is traced within the second tracking range AR2-2 broader than the second initial searching range AR2-1.

In parallel, the second target vehicle specifier 144 searches for another vehicle which has not been recognized at the previous process cycle within the third initial searching range AR3-1c and captures still another vehicle which has been recognized at the previous process cycle within the third tracking range AR3-2c. Then, of another vehicle has newly been found within the third initial searching range AR3-1c and still another vehicle captured within the third tracking range AR3-2c, the other vehicle close to the own vehicle M in the length direction of the road is specified as the second target vehicle. This operation is similar to the operation in the case of "map presence." However, to compensate for the second initial searching range AR2-1 and the second tracking range AR2-2 less than the first initial searching range AR1-1 and the first tracking range AR1-2, respectively, the third initial searching range AR3-1c and the third tracking range AR3-2c in the case of "map absence" are set to be greater than the third initial searching range AR3-1c and the third tracking range AR3-2c in the case of "map presence" when a condition such as the speed $V_M$ or the predicted radius of curvature R is the same. Thus, the first target vehicle specifier 142 and the second target vehicle specifier 144 can improve specifying precision of the target vehicle in the complementary relation. In the example of FIG. 15, since the vehicle mA2 is within the third initial searching range AR3-1c, the second target vehicle specifier 144 specifies the vehicle mA2 as the second target vehicle.

(Arbitration)

As described above, the first target vehicle specifier 142 and the second target vehicle specifier 144 operate in parallel. The first target vehicle specifier 142 outputs the first target vehicle information and the second target vehicle specifier 144 outputs the second target vehicle information. The first target vehicle information and the second target vehicle information include identification information (an object ID), a position, and a speed of the specified target vehicle. The object ID is information serving as a label of information such as the position of the object input to the target vehicle specifier 140. When the first target vehicle information matches the second target vehicle information, the target vehicle specifier 140 outputs the matched information as target vehicle information. When the first target vehicle information does not match the second target vehicle information, the arbitrator 146 performs the following process to select any target vehicle information.

When the first target vehicle information differs from the second target vehicle information in the case of "map presence," the arbitrator 146 performs a first arbitration flow in which the first target vehicle information is preferred under a predetermined condition. When no target vehicle is confirmed in the first arbitration flow, a target vehicle is confirmed in a third arbitration flow. When the first target vehicle information differs from the second target vehicle information in the case of "map absence," the arbitrator 146 performs a second arbitration flow in which a target vehicle is confirmed in a case in which there is only one. When no target vehicle is confirmed in the second arbitration flow, a target vehicle is confirmed in accordance with the third arbitration flow.

Figure 17:
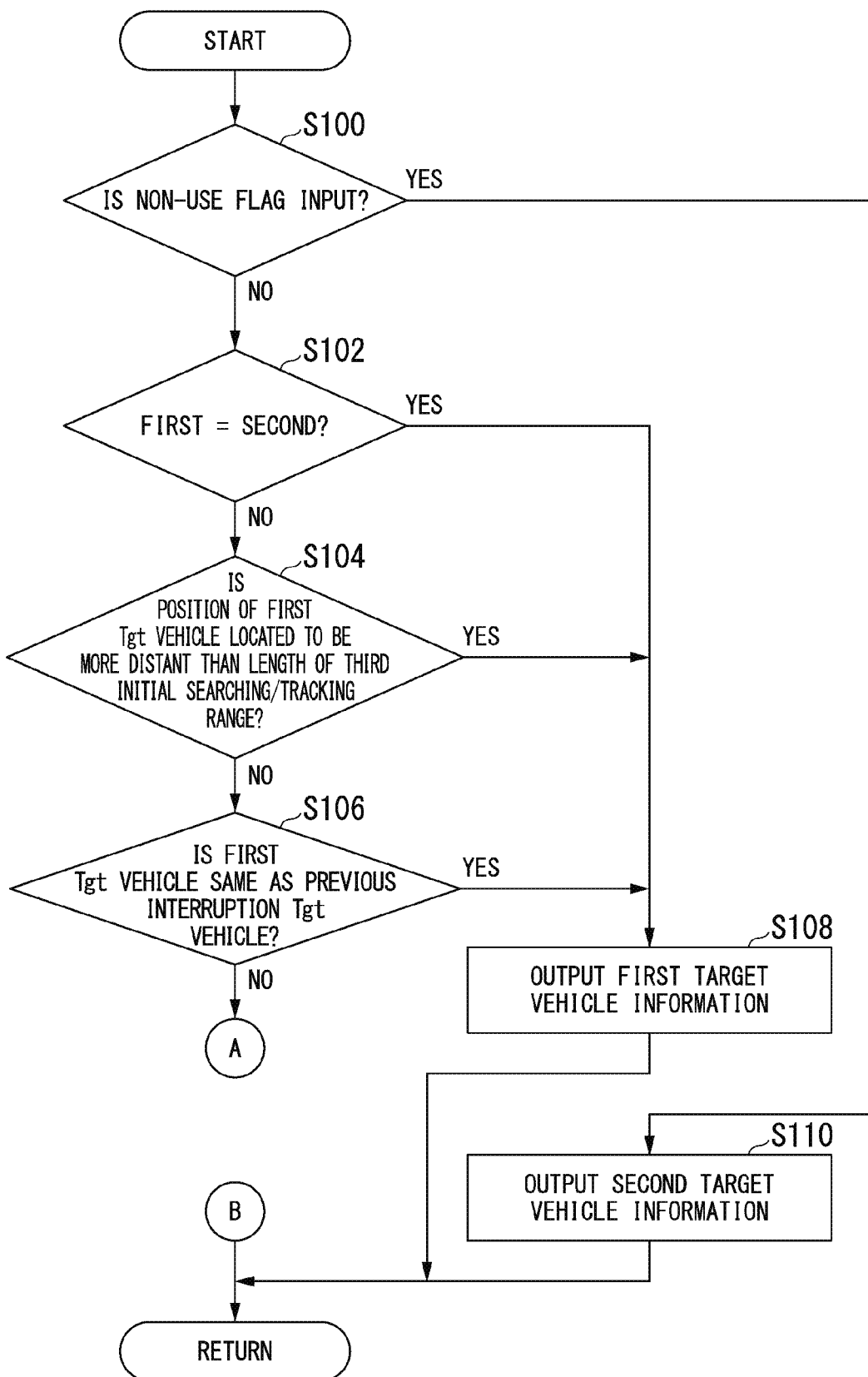
FIG. 17 is a flowchart illustrating an example of a first arbitration flow.
Figure 18:
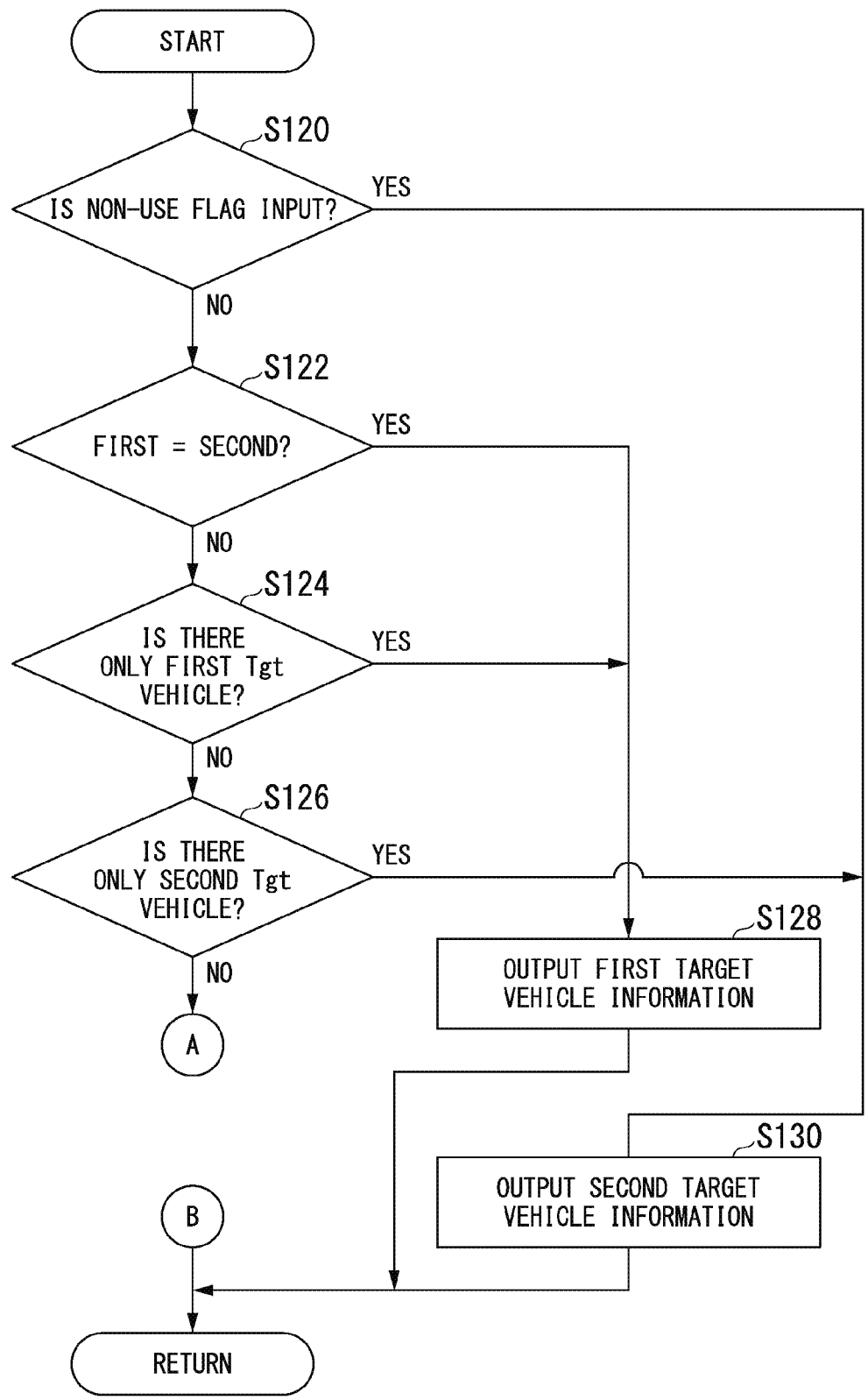
FIG. 18 is a flowchart illustrating an example of a second arbitration flow.
Figure 19:
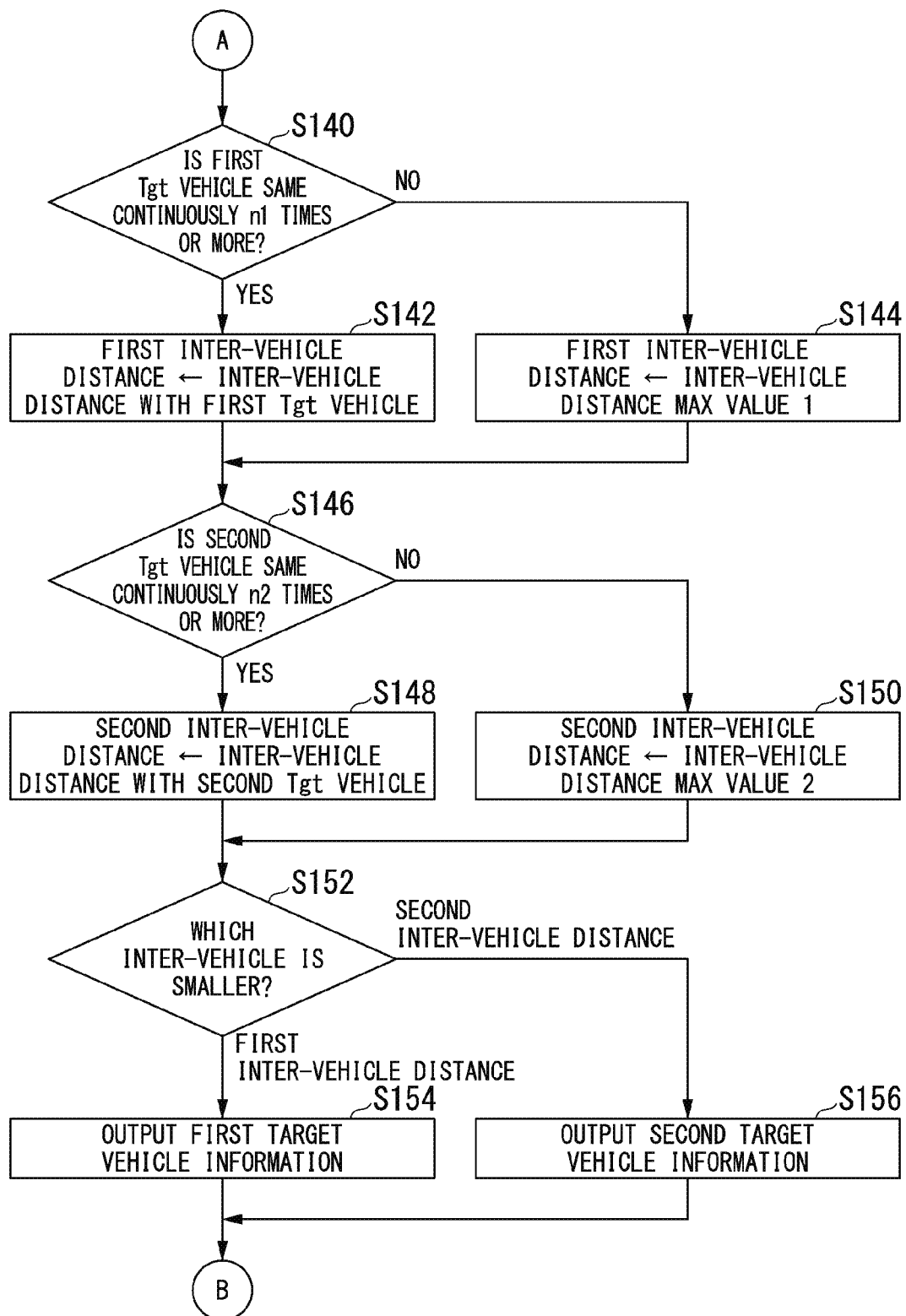
FIG. 19 is a flowchart illustrating an example of a third arbitration flow.

FIG. 17 is a flowchart illustrating an example of a first arbitration flow. Process of the flowcharts of FIGS. 17 and 19 or FIGS. 18 and 19 are repeatedly performed, for example, at a period synchronized with the first target vehicle specifier 142 and the second target vehicle specifier 144. In the case of "map presence," the processes of the flowcharts of FIGS. 17 and 19 are performed. In the case of "map absence," the processes of the flowcharts of FIGS. 18 and 19 are performed. In the drawings, a target vehicle is briefly referred to as a "Tgt vehicle" as necessary.

First, the arbitrator 146 determines whether the non-use flag is input from the standard range use determiner 136 (step S100). When the non-use flag is input, the arbitrator 146 determines the second target vehicle information as target vehicle information and outputs the target vehicle information to the action plan generator 180 (step S110).

When the non-use flag is not input, the arbitrator 146 determines whether the first target vehicle information is the same as the second target vehicle information (step S102). When the first target vehicle information is the same as the second target vehicle information, the arbitrator 146 determines the first target vehicle information as target vehicle information and outputs the target vehicle information to the action plan generator 180 (step S108).

When the first target vehicle information is not the same as the second target vehicle information, the arbitrator 146 determines whether the position of the first target vehicle is located to be more distant than the length of the third initial searching range or the third tracking range (step S104). When the position of the first target vehicle is located to be more distant from the length of the third initial searching range or the third tracking range, the arbitrator 146 determines the first target vehicle information as the target vehicle information and outputs the target vehicle information to the action plan generator 180 (step S108).

When the position of the first target vehicle is not located to be more distant than the length of the third initial searching range or the third tracking range, the arbitrator 146 determines whether the first target vehicle is a vehicle (a previous interruption target) selected as the first target vehicle for the first time at the previous process cycle (step S106). When the first target vehicle is the previous interruption target, the arbitrator 146 determines the first target vehicle information as the target vehicle information and outputs the target vehicle information to the action plan generator 180 (step S108). When the first target vehicle is not the previous interruption target, the process proceeds to the third arbitration flow.

FIG. 18 is a flowchart illustrating an example of a second arbitration flow. First, the arbitrator 146 determines whether the non-use flag is input from the standard range use determiner 136 (step S120). When the non-use flag is input, the arbitrator 146 determines the second target vehicle information as target vehicle information and outputs the target vehicle information to the action plan generator 180 (step S130).

When the non-use flag is not input, the arbitrator 146 determines whether the first target vehicle information is the same as the second target vehicle information (step S122). When the first target vehicle information is the same as the second target vehicle information, the arbitrator 146 determines the first target vehicle information as target vehicle information and outputs the target vehicle information to the action plan generator 180 (step S128).

When the first target vehicle information is not the same as the second target vehicle information, the arbitrator 146 determines whether there is only the first target vehicle (the first target vehicle is specified and information is output) (step S124). When there is only the first target vehicle, the arbitrator 146 determines the first target vehicle information as the target vehicle information and outputs the target vehicle information to the action plan generator 180 (step S128).

When there is only no first target vehicle, the arbitrator 146 determines whether there is only the second target vehicle (the second target vehicle is specified and information is output) (step S126). When there is only the second target vehicle, the arbitrator 146 determines the second target vehicle information as the target vehicle information and outputs the target vehicle information to the action plan generator 180 (step S130). When there is only no second target vehicle, the process proceeds to the third arbitration flow.

In comparison between the process of the flowchart of FIG. 17 and the process of the flowchart of FIG. 18, in the process of the flowchart of FIG. 17 in the case of "map presence," the first target vehicle is confirmed as the target vehicle without proceeding to the third arbitration flow under the predetermined condition, that is, in the case in which the position of the first target vehicle is located to be more distant than the length of the third initial searching range or the third tracking range (step S104) and the first target vehicle is the vehicle (the previous interruption target) selected as the first target vehicle for the first time at the previous process cycle (step S106) when the first target vehicle does not match the second target vehicle. In the process of the flowchart of FIG. 18 in the case of "map absence," the process proceeds to the third arbitration flow without providing such a sequence. Accordingly, when the first target vehicle does not match the second target vehicle, the sequence until selection of the first target vehicle is simplified in the case of "map presence" compared to the case of "map absence." Thus, it is easier for the arbitrator 146 to select the first target vehicle in the case of "map presence" compared to the case of "map absence." As described above, since the first standard range AR1ref based on the map information is high precise in relation to the more distant side than the predicted runway ETJ, it is possible to specify the target vehicle more quickly by determining the sequence in this way.

FIG. 19 is a flowchart illustrating an example of the third arbitration flow. First, the arbitrator 146 determines whether the first target vehicle is the same vehicle continuously n1 times (n1 cycle) or more (step S140). When the first target vehicle is the same vehicle continuously n1 times or more, the arbitrator 146 sets an inter-vehicle distance with the first target vehicle as a first inter-vehicle distance (step S142). When the first target vehicle is not the same vehicle continuously n1 times or more, the arbitrator 146 sets an inter-vehicle distance MAX value 1 as a first inter-vehicle distance (step S144).

Subsequently, the arbitrator 146 determines whether the second target vehicle is the same vehicle continuously n2 times (n2 cycle) or more (step S146). When the second target vehicle is the same vehicle continuously n2 times or more, the arbitrator 146 sets an inter-vehicle distance with the second target vehicle as a second inter-vehicle distance (step S148). When the second target vehicle is not the same vehicle continuously n2 times or more, the arbitrator 146 sets an inter-vehicle distance MAX value 2 as a second inter-vehicle distance (step S150).

The thresholds n1 and n2 may be the same values or may be different values. For example, about several values or tens of values may be set in advance in n1 and n2. Inter-vehicle MAX value 1 and the inter-vehicle MAX value 2 are values sufficiently larger than an inter-vehicle distance with a vehicle recognized within a reference range. Inter-vehicle MAX value 1 and the inter-vehicle MAX value 2 may be the same value or may be different values.

Subsequently, the arbitrator 146 determines which is smaller between the first inter-vehicle distance and the second inter-vehicle distance (step S152). When the first inter-vehicle distance is smaller, the arbitrator 146 determines the first target vehicle information as the target vehicle information and outputs the target vehicle information to the action plan generator 180 (step S154). When the second inter-vehicle distance is smaller, the arbitrator 146 determines the second target vehicle information as the target vehicle information and outputs the target vehicle information to the action plan generator 180 (step S156).

The arbitrator 146 may acquire reliability of the second standard range AR2ref output by the second standard range setter 134 and change content of the process so that it is easy to select the second target vehicle in the case of "map absence" when the reliability is lower than a standard. For example, by changing the threshold n2 to a smaller value, changing the threshold n1 to a larger value, changing inter-vehicle distance MAX value 2 to a smaller value, or changing inter-vehicle distance MAX value 1 to a larger value, it is possible to easily select the second target vehicle.

(Expansion at the Time of Straight Travel)

Figure 20:
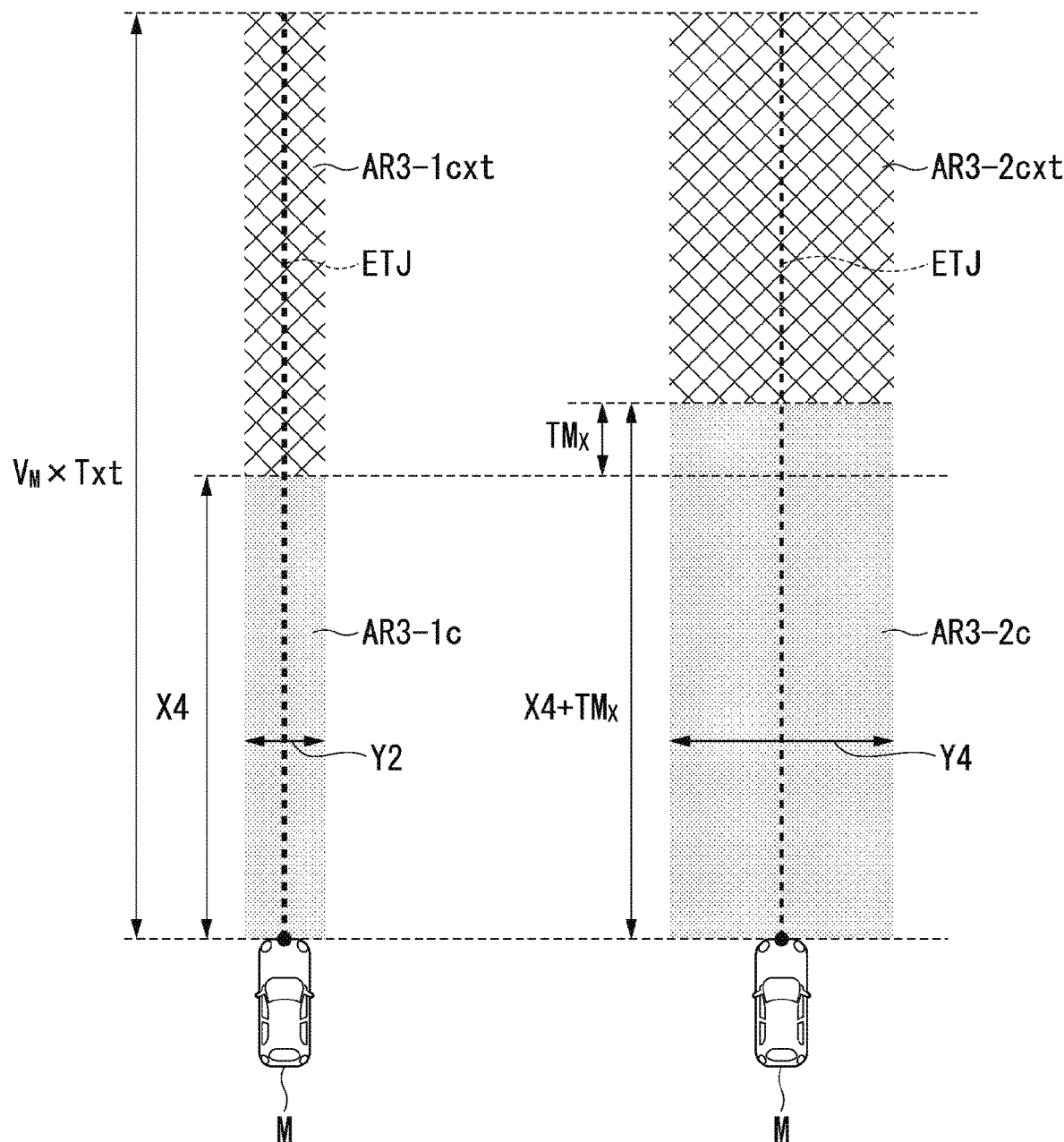
FIG. 20 is a diagram illustrating an example of an aspect of expansion at the time of straight travel.

The second target vehicle specifier 144 may exceptionally expand the length of the reference range and cause the length of the reference range to be longer than that of the first target vehicle specifier 142 in accordance with the speed $V_M$ when the own vehicle M continuously moves straight in a state in which a yaw rate is continuously equal to or less than a predetermined value near zero, that is, in a state in which a degree of turning is within a standard in the case of "map absence." Hereinafter, the operation is referred to as expansion at the time of straight travel. FIG. 20 is a diagram illustrating an example of an aspect of expansion at the time of straight travel. In this case, the length of the third initial searching range AR3-1c and the third tracking range AR3-2c which are reference ranges can be obtained, for example, by multiplying the speed $V_M$ of the own vehicle M by a predetermined time Txt. Here, the second target vehicle specifier 144 limits the second target vehicle specified in the expanded reference range (AR3-1cxt or AR3-2cxt in the drawing) to a vehicle of which a relative speed to the own vehicle M is greater than a standard. Thus, it is possible to quickly start monitoring a vehicle to be early noticed and loosen the degree of monitoring on a vehicle for which necessity of the monitoring is low since the vehicle is traveling at the same speed in a distant place, and thus it is possible to limit an occasion of erroneous detection.

According to the above-described first embodiment, it is possible to realize early discovery of a target vehicle and suppression of erroneous detection.

Second Embodiment

Figure 21:
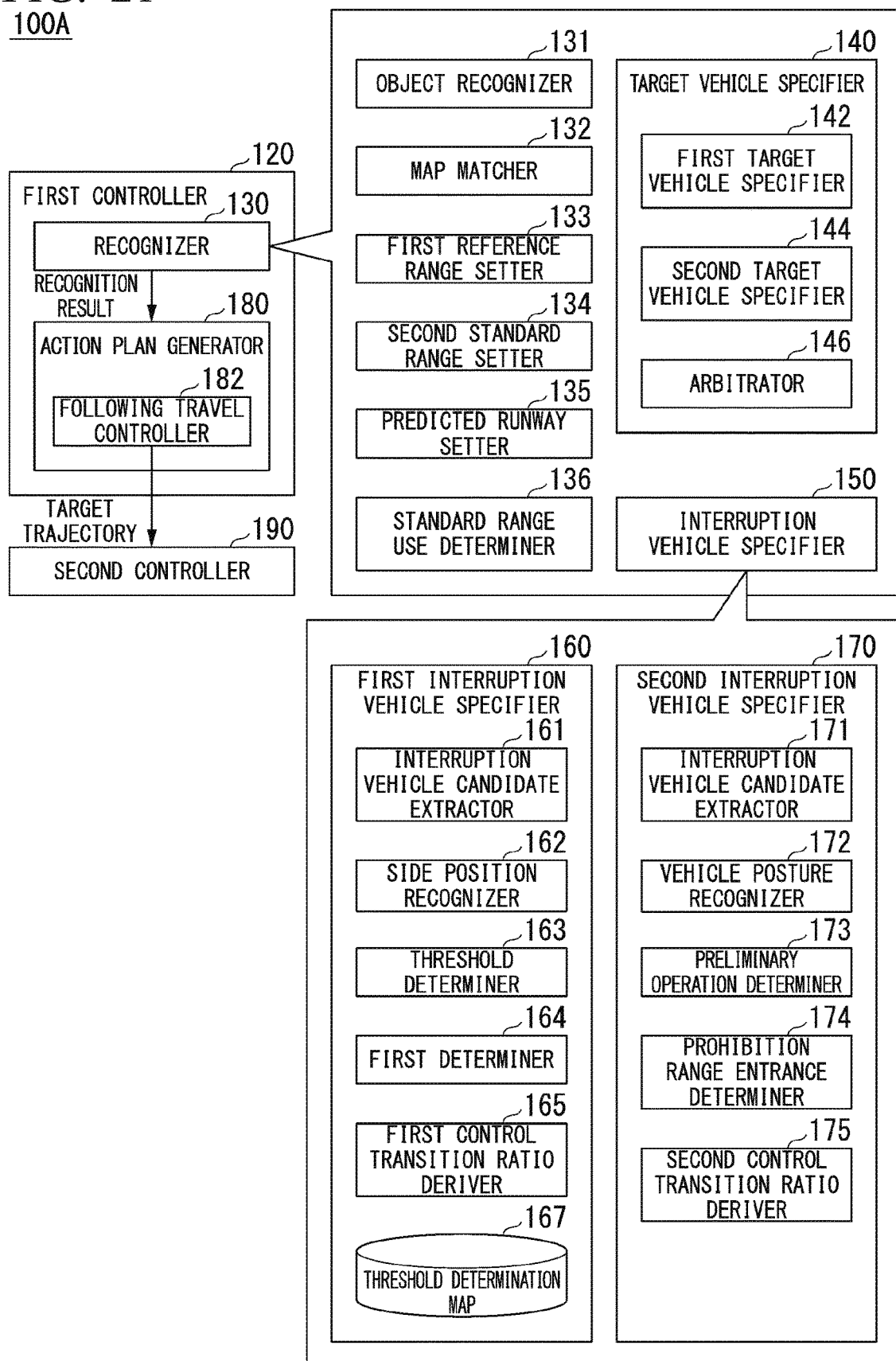
FIG. 21 is a diagram illustrating a functional configuration of a first controller and a second controller of an automated driving control device according to a second embodiment.

Hereinafter, a second embodiment will be described. FIG. 21 is a diagram illustrating a functional configuration of a first controller 120 and a second controller 190 of an automated driving control device 100A according to the second embodiment. The automated driving control device 100A according to the second embodiment differs from the automated driving control device according to the first embodiment in that the recognizer 130 further includes an interruption vehicle specifier 150 and the following travel controller 182 performs control in consideration of not only a target vehicle but also the position of an interruption vehicle. Hereinafter, the differences will be mainly described.

The interruption vehicle specifier 150 performs interruption to a travel lane from a lateral side (a road width direction) of the travel lane in which there is the own vehicle M and specifies another vehicle which is a future target vehicle as an interruption vehicle. The interruption vehicle specifier 150 includes a first interruption vehicle specifier 160 and a second interruption vehicle specifier 170. For example, the first interruption vehicle specifier 160 operates regardless of a speed of the own vehicle M and the second interruption vehicle specifier 170 operates when the speed of the own vehicle M is less than a predetermined speed Vth (for example, about 20 [km/h]), that is, at the time of low-speed travel such as the time of congestion. Accordingly, when the speed of the own vehicle M is less than the predetermined speed Vth, both the first interruption vehicle specifier 160 and the second interruption vehicle specifier 170 operate. When the speed of the own vehicle M is equal to or greater than the predetermined speed Vth, the first interruption vehicle specifier 160 operates and the second interruption vehicle specifier 170 stops operating.

[First Interruption Vehicle Specifier]

The first interruption vehicle specifier 160 includes, for example, an interruption vehicle candidate extractor 161, a side position recognizer 162, a threshold determiner 163, a first determiner 164, and a first control transition ratio deriver 165. The first interruption vehicle specifier 160 performs preliminary determination (determination of a first stage) and main determination (determination of a second stage). A vehicle determined as an interrupt vehicle in the preliminary determination is referred to as a preliminary interruption vehicle and a vehicle determined as an interruption vehicle in the main determination is referred to as an interruption vehicle.

Figure 22:
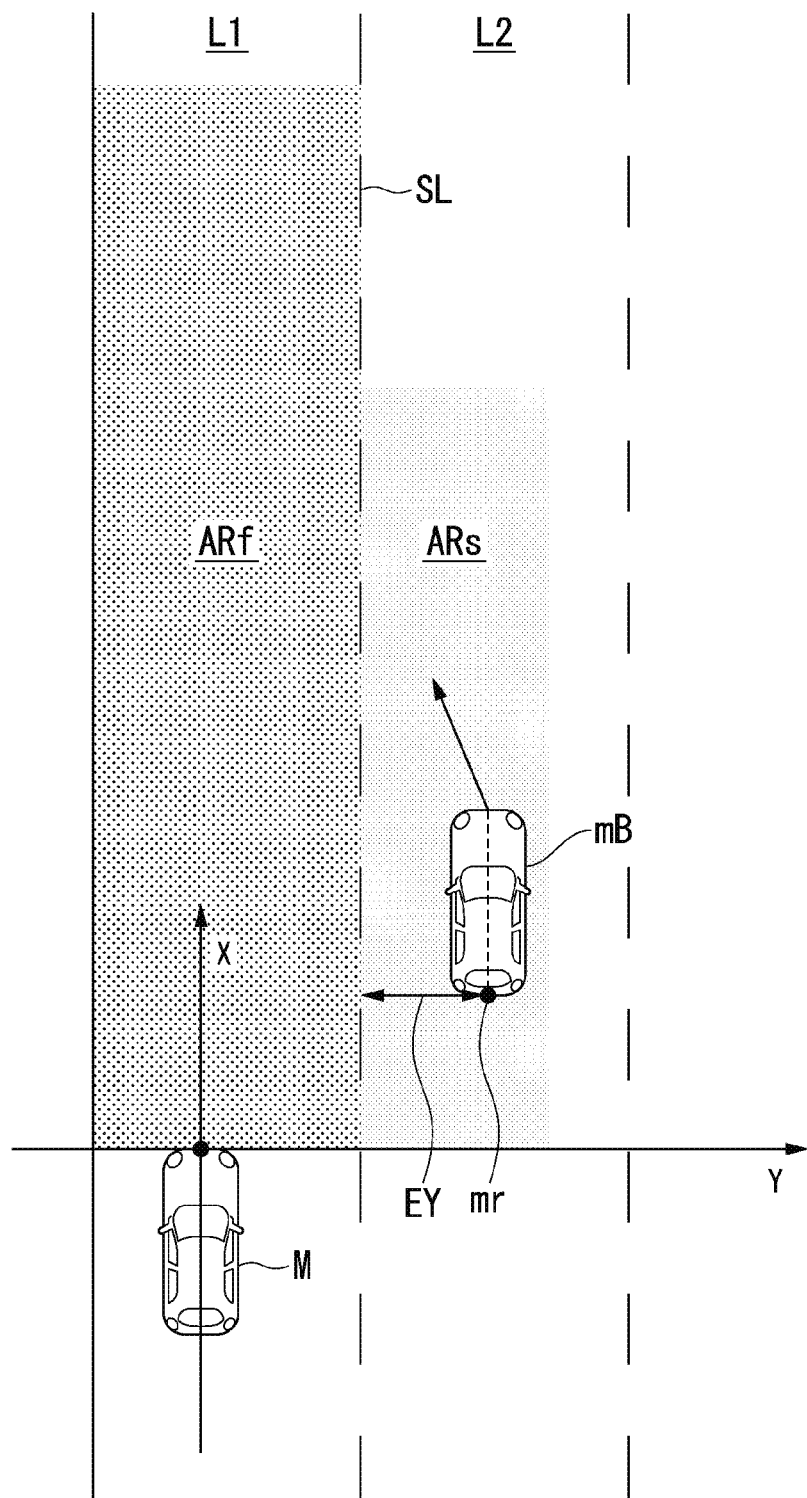
FIG. 22 is a diagram exemplifying a front reference range and a lateral side reference range.

The interruption vehicle candidate extractor 161 extracts another vehicle which is in a lateral side reference range extending to the lateral side of a travel lane as a preliminary interruption vehicle or a candidate vehicle of the interruption vehicle (an interruption vehicle candidate). FIG. 22 is a diagram exemplifying the reference range (a front reference range) ARf and the lateral side reference range ARs described in the first embodiment. As described in the first embodiment, there are various types of front reference ranges ARf, but these reference ranges are not distinguished from each other herein. The lateral side reference range ARs is set to a range adjacent to the lane L1 in which the own vehicle M is traveling. Hereinafter, a travel lane is referred to as the lane L1. The adjacent range may include only a lane (in the drawing, the lane L2) which is adjacent to the lane L1 and in which a travel direction is the same as that of the lane L1 or may include a road shoulder of a road. The interruption vehicle candidate extractor 161 sets the lateral side reference range ARs with a length shorter than the front reference range ARf from the front end of the own vehicle M to the front side. Here, the lateral side reference range ARs may be lengthened depending on a setting condition of the front reference range ARf in some cases.

FIG. 23 is a diagram illustrating a setting rule of the lateral side reference range and a rule at the time of extraction as an interruption vehicle candidate. In the case of "map presence," the interruption vehicle candidate extractor 161 sets both a length and width of the lateral side reference range ARs as a fixed length and width. For example, the length is set to about 100 [m] and the width is set to about 1 decimal point [m]. In the case of "map absence," the interruption vehicle candidate extractor 161 sets the length of the lateral side reference range ARs to a length of a road demarcation line recognized by the camera 10. The width of the lateral side reference range ARs is fixed.

The interruption vehicle candidate extractor 161 determines whether another vehicle is extracted as an interruption vehicle candidate based on presence or absence of a lane in a range of an interruption source (a range corresponding to the lane L2 in the example of FIG. 22) and object reliability output by the object recognizer 131. The fact that "there is no lane in the range of the interruption source" is that the range is a space such as a shoulder of a road. For example, in the case of "map presence," the interruption vehicle candidate extractor 161 extracts another vehicle which is in the range as an interruption vehicle candidate only when the lane is in the range of the interruption source, irrespective of the object reliability. In the case of "map absence," when the object reliability is high or intermediate despite the fact that the lane is in the range of the interruption source, the other vehicle which is in the range is extracted as an interruption vehicle candidate.

In the second embodiment, the non-use flag output by the standard range use determiner 136 may be input to the first interruption vehicle specifier 160. Thus, the interruption vehicle candidate extractor 161 may not extract the interruption vehicle candidate when the non-use flag is input in both the case of "map presence" and the case of "map absence."

The side position recognizer 162 recognizes a side position of the vehicle extracted as the interruption vehicle candidate. Referring back to FIG. 22, another vehicle mB is an interruption vehicle candidate and EY is a side position recognized by the side position recognizer 162. The side position EY is a distance between a representative point mr of the interruption vehicle candidate and a road demarcation line SL demarcating the lane L1 in which the own vehicle M is traveling and the lane L2 including the lateral side reference range ARs. The representative point mr is, for example, a middle portion, a center of gravity, or the like of the interruption vehicle candidate in the vehicle width direction of the rear end of the interruption vehicle candidate. The side position recognizer 162 repeatedly recognizes the side position EY periodically and stores the side position EY in a memory. Hereinafter, a side position recognized by the side position recognizer 162 at the time point of observation (a current process cycle) is referred to as EY0, a side position recognized one cycle before is referred to as EY1, . . . , and a side position recognized n cycles before is referred to as EYn (where n is 0 or a natural number). A standard position at which the side position EY is obtained may be any stopped object mark such as a center of the lane L2 other than the road demarcation line SL. The standard position at which the side position EY is obtained may be any portion of the own vehicle M.

The first interruption vehicle specifier 160 specifies the interruption vehicle candidate as a preliminary interruption vehicle or an interruption vehicle when a side movement amount by which the interruption vehicle candidate in the lateral side reference range ARs heads for the lane L1 in the road width direction exceeds a threshold during a predetermined period. At this time, the first determiner 164 determines whether the side movement amount exceeds the threshold during each of a plurality of predetermined periods in which a traceback amount from the observation time point to the past is different. "How much the cycle goes back," as described above, is an example of "the traceback amount from the observation time point to the past." EY0, EY1, EYn are examples of "the side movement amount by which the interruption vehicle candidate in the lateral side reference range ARs heads for the lane L1 in the road width direction during the plurality of predetermined periods in which the traceback amount from the observation time point to the past is different."

Figure 24:
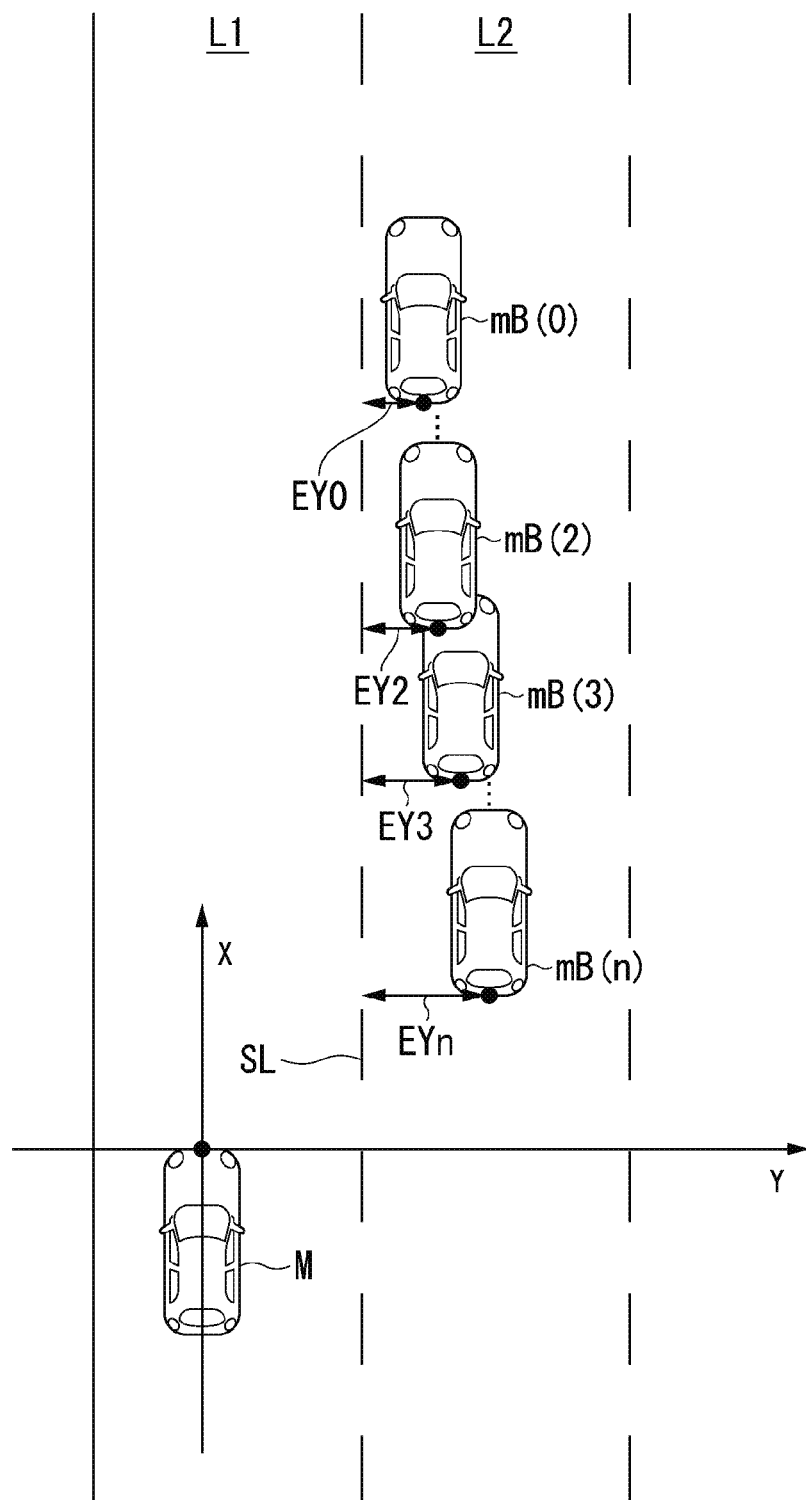
FIG. 24 is a diagram illustrating a change amount of a side position.

FIG. 24 is a diagram illustrating a change amount iEYn of a side position EY. In the drawing, mB(0) is an interruption vehicle candidate recognized at the observation time point, mB(2) is an interruption vehicle candidate recognized at a process cycle two cycles before from the observation time point, mB(3) is an interruption vehicle candidate recognized in a process cycle three cycles before from the observation time point, and mB(n) is an interruption vehicle candidate recognized at a process cycle n cycles before from the observation time point. EY0 is a side position of the interruption vehicle candidate mB(0) recognized at the observation time point, EY2 is a side position of the interruption vehicle candidate mB(2) recognized at the process cycle two cycles before from the observation time point, EY3 is a side position of the interruption vehicle candidate mB(3) recognized at the process cycle three cycles before from the observation time point, and EYn is a side position of the interruption vehicle candidate mB(n) recognized at the process cycle n cycles before from the observation time point. iEYn which is a change amount of the side position EY is defined in Expression (1).

$$iEYn = EYn - EY0 \qquad (1)$$

For example, the side position recognizer 162 calculates iEYn in each of n=2, 3, and 5. That is, iEY2, iEY3, and iEY5 are calculated. A method of selecting the numbers is merely exemplary. Any natural number equal to or greater than 2 may be selected from natural numbers. In the following description, 2, 3, and 5 are assumed to be selected.

The threshold determiner 163 determines a threshold for each of n=2, 3, and 5. Further, the threshold determiner 163 sets a threshold α (an example of a first threshold) for the preliminary determination (the determination of the first stage) and a threshold β (an example of a second threshold) for the main determination (the determination of the second stage). Six kinds of thresholds are set to set the thresholds α and β for n=2, 3, and 5 to correspond to the preliminary determination and the main determination. Hereinafter, a threshold corresponding to the preliminary determination and n=2, a threshold corresponding to the preliminary determination and n=3, and a threshold corresponding to the preliminary determination and n=5 are defined as α2, α3, and α5, respectively. A threshold corresponding to the main determination and n=2, a threshold corresponding to the main determination and n=3, and a threshold corresponding to the main determination and n=5 are defined as β2, β3, and β5, respectively.

The first determiner 164 determines whether iEY is equal to or greater than a threshold αn for each of n=2, 3, and 5 as a specifying process of the first stage. When a predetermined number k or more indicates that "a side movement amount iEYn is greater than the threshold αn" among a plurality of determination results, the first determiner 164 specifies the interruption vehicle candidate as a preliminary interruption vehicle. The first determiner 164 determines whether iEYn is equal to or greater than a threshold βn for each of n=2, 3, and 5 as a specifying process of the second stage. When a predetermined number k or more indicates that "a side movement amount iEYn is greater than the threshold βn" among a plurality of determination results, the first determiner 64 specifies the interruption vehicle candidate as an interruption vehicle. The predetermined number k is, for example, 1, but may be 2 or more.

For another vehicle specified as the preliminary interruption vehicle, the following travel controller 182 generates trajectory points so that, for example, weak braking is performed. For another vehicle specified as the interruption vehicle, the following travel controller 182 determines a target speed and outputs the target speed to the second controller 190 so that braking stronger than that of the preliminary interruption vehicle is performed. The details thereof will be described later.

Figure 25:
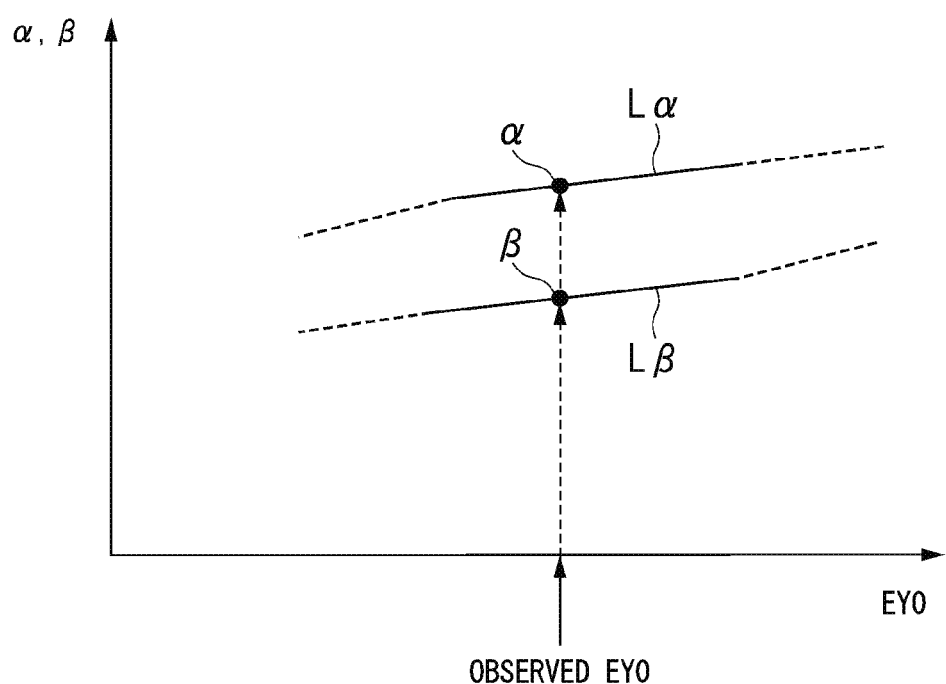
FIG. 25 is a diagram illustrating an example of content of a threshold determination map.

The threshold determiner 163 determines the thresholds α and β using a threshold determination map 167. FIG. 25 is a diagram illustrating an example of content of the threshold determination map 167. As illustrated, the threshold determination map 167 is information that regulates characteristic lines Lα and Lβ for determining the thresholds α and β corresponding to the side position EY0. The threshold determiner 163 acquires values corresponding to the side position EY0 observed at the current process cycle in the characteristic lines Lα and Lβ and sets the values as the thresholds α and β. The threshold determination map 167 is generated in advance for each of n=2, 3, and 5 and the threshold determiner 163 acquires the thresholds α and β for each of n=2, 3, and 5, as described above.

Figure 26:
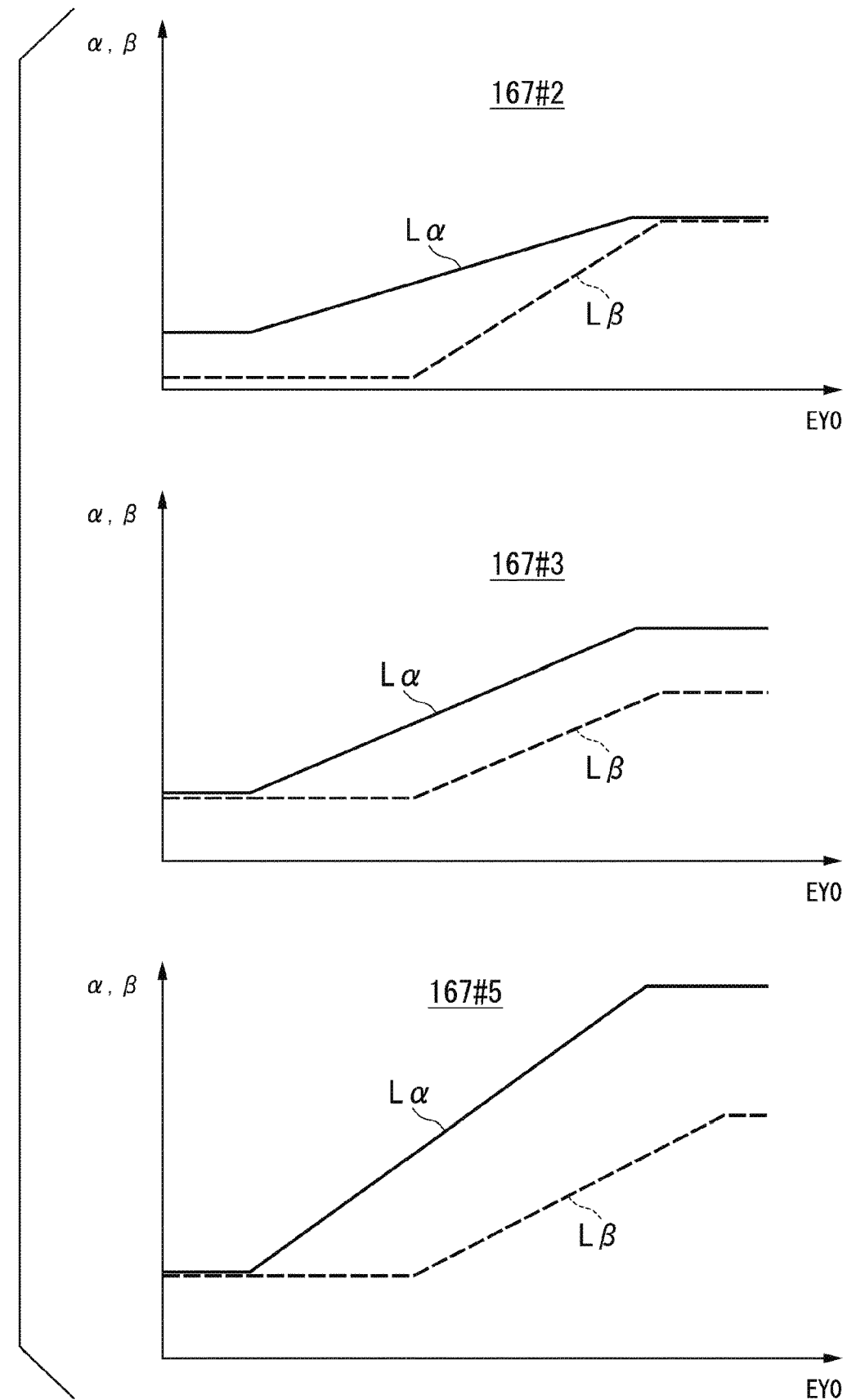
FIG. 26 is a diagram illustrating an example of content of the threshold determination map corresponding each of n=2, 3, and 5.

FIG. 26 is a diagram illustrating an example of content of the threshold determination map 167 corresponding each of n=2, 3, and 5. The drawing illustrates an example of content of threshold determination map 167#2 corresponding to n=2, threshold determination map 167#3 corresponding to n=3, and threshold determination map 167#5 corresponding to n=5. These maps may be substituted with a function embedded in a program or any electronic technique may be adopted when the same result is obtained.

The threshold determination map 167 shows the following tendency as a whole.

(1) The characteristic lines Lα and Lβ rise to the right. Accordingly, in a case in which the interruption vehicle candidate is traveling at a position close to the lane L1 in the road width direction, that is, EY0 is small, the threshold determiner 163 determines the thresholds as the smaller threshold than when EY0 is large. As a result, when the interruption vehicle candidate is traveling at the position close to the lane L1 in the road width direction, it is easier to specify the preliminary interruption vehicle or the interruption vehicle despite a small change amount of the side position more than when the interruption vehicle candidate is traveling at a position away from the lane L1. Thus, it is possible to take quick measures for a change in the side position with respect to another vehicle traveling close to the own lane. For the other vehicle traveling at the position away from the own lane, the preliminary interruption vehicle or the interruption vehicle is specified only when a change in the side position is large. Therefore, it is possible to reduce an occasion of occurrence of unnecessary control.

(2) The characteristic lines Lα and Lβ are both shifted upward as n increases. Accordingly, the threshold determiner 163 causes a threshold (a threshold when n is large) during a predetermined period in which a traceback amount to the past is large to be greater than a threshold (a threshold when n is small) during a predetermined period in which the traceback amount to the past is small. Thus, the preliminary interruption vehicle or the interruption vehicle can be specified quickly when a change in the side position occurs in the other vehicle (when iEYn in which n is small increases). In a gentle change in the side position, the preliminary interruption vehicle or the interruption vehicle is not specified when there is no continuity to some extent. Therefore, it is possible to reduce an occasion of occurrence of unnecessary control.

(3) The characteristic lines Lα and Lβ are separated to the side in which EY0 is small when n is small. As a result, in a case in which the interruption vehicle candidate is traveling at a position close to the lane L1 in the road width direction, the preliminary interruption vehicle is specified quickly. As a result, it is possible to take quick measures for a behavior of a vehicle close to the own vehicle M.

(4) The characteristic lines Lα and Lβ are separated to the side in which EY0 is large when n is large. As a result, in a case in which the interruption vehicle candidate is traveling at a position away from the lane L1 in the road width direction, the interruption vehicle is not specified when a change amount of the side position is not large. As a result, it is possible to suppress frequent occurrence of unnecessary control on the vehicle away from the own vehicle M.

Figure 27:
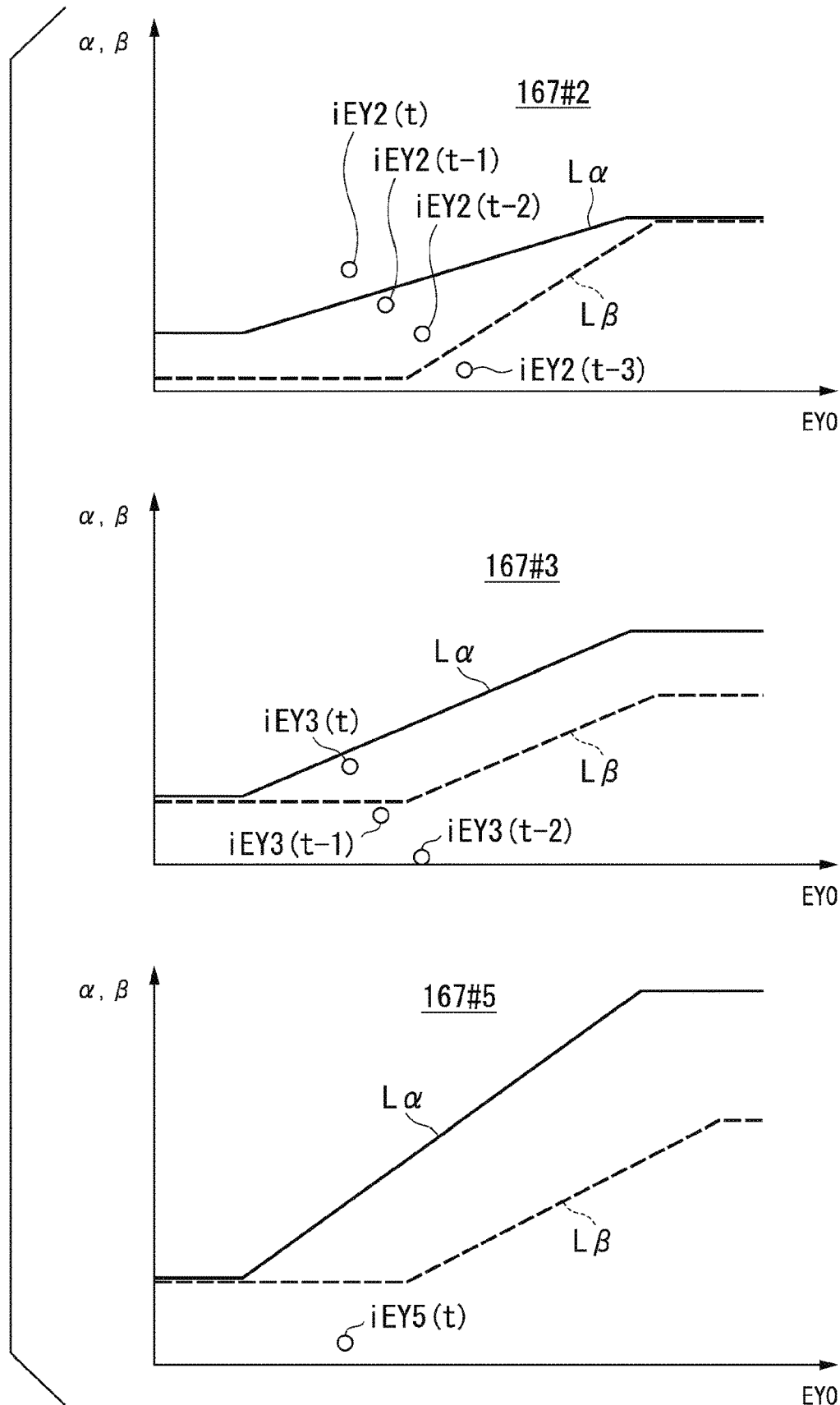
FIG. 27 is a diagram illustrating transition of iEYn of another vehicle which enters the lateral side reference range from the rear side of the own vehicle and is already traveling at a position close to a lane L1 at the time of entrance to the lateral side reference range, for example.

FIGS. 27 and 28 are diagrams illustrating transition of iEYn corresponding to an assumed interruption travel pattern. In the drawings, t indicates an observation time point, and t-1, t-2, and the like indicate process cycles one time before, two times before, and the like. FIG. 27 is a diagram illustrating transition of iEYn of, for example, another vehicle which enters the lateral side reference range ARs from the rear side of the own vehicle M and is already traveling at a position close to the lane L1 at the time of entrance to the lateral side reference range ARs, for example. In the case of the other vehicle, iEY2 responds most sensitively and is equal to or greater than the threshold α at the observation time point t. However, iEY3 is less than the threshold α and remains to be equal to or greater than the threshold β and iEY5 is still less than the threshold β.

FIG. 28 is a diagram illustrating transition of iEYn of another vehicle approaching the lane L1 continuously from a position distant from the lane L1 in a lane L2, for example. In the case of the other vehicle, iEY5 responds most sensitively and is equal to or greater than the threshold α at the observation time point t. However, iEY2 and iEY3 are less than the threshold α and remain to be equal to or greater than the threshold β.

In this way, by obtaining a change amount of each side position during a predetermined period in which the traceback amount to the post is different and comparing each change amount with a different threshold, it is possible to appropriately specify another vehicle in which a pattern of a motion is different as an interruption vehicle.

The first control transition ratio deriver 165 derives a control transition ratio to be given to the following travel controller 182. When there are a front vehicle and the preliminary interruption vehicle or the interruption vehicle, the following travel controller 182 determines a target speed so that braking power for the front vehicle and braking power for the preliminary interruption vehicle or the interruption vehicle are mixed and output at the control transition ratio ξ.

Figure 29:
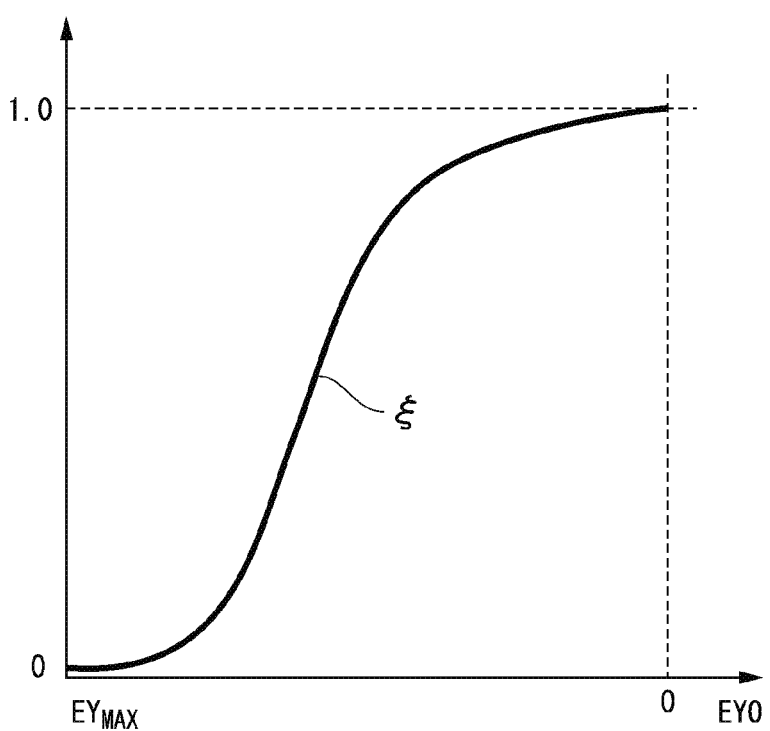
FIG. 29 is a diagram illustrating an example of a rule by which a first control transition ratio deriver derives a control transition ratio.

FIG. 29 is a diagram illustrating an example of a rule by which the first control transition ratio deriver 165 derives the control transition ratio ξ. In the drawing, $EY_{MAX}$ is a distance corresponding to the width of the lateral side reference range. As illustrated, the control transition ratio ξ is a value set between 0 and 1. The first control transition ratio deriver 165 increases the control transition ratio ξ as the preliminary interruption vehicle or the interruption vehicle approaches the lane L1 (as the EY0 approaches zero). The first control transition ratio deriver 165 derives the control transition ratio ξ for example, by inputting EY0 to a sigmoid function (see Expression (2)). In the expression, κ is a sigmoid gain, λ is a sigmoid function correction value, and μ, is a sigmoid function X coordinate offset.

$$R_\alpha = 1/\{1 + e^{\hat{}}\{-\kappa \times (\lambda \times EY_N - \mu)\}\}$$

$$EY_N = (EY_{MAX} - EY0)/EY_{MAX} \qquad (2)$$

The following travel controller 182 derives, for example, a target speed for keeping an inter-vehicle distance to a set distance with regard to each of the front vehicle, the interruption vehicle, and the preliminary interruption vehicle. Hereinafter, the front vehicle, the interruption vehicle, and the preliminary interruption vehicle are denoted by mA, mB, and mC, respectively.

For example, the following travel controller 182 derives target speed V #1 for the front vehicle mA in accordance with Expression (3), derives target speed V #2 for the interruption vehicle mB in accordance with Expression (4), and derives target speed V #3 for the preliminary interruption vehicle mC in accordance with Expression (5). In the expressions, Vset denotes an upper limit speed, xset denotes a set distance, and $V_{FB1}$ and $V_{FB2}$ denote functions representing feedback control. xmA is a distance between the front end of the own vehicle M and the rear end of the front vehicle mA (a so-called inter-vehicle distance), xmB in a road length direction is a distance between the front end of the own vehicle M and the rear end of the interruption vehicle mB in the road length direction, and xmC is a distance between the front end of the own vehicle M and the rear end of the preliminary interruption vehicle mC in the road length direction. A feedback gain (particular, a gain of a proportional term and an integration term) when $V_{FB1}$ is calculated is set to be larger than when $V_{FB2}$ is calculated. Therefore, when the inter-vehicle distance is a distance less than the set distance xset, declaration for the front vehicle mA and the interruption vehicle mB is larger than deceleration for the preliminary interruption vehicle mC.

$$V\#1=\text{MAX}\{V\text{set},V_{FB1}(xmA\rightarrow x\text{set})\} \quad (3)$$

$$V\#2=\text{MAX}\{V\text{set},V_{FB1}(xmB\rightarrow x\text{set})\} \quad (4)$$

$$V\#3=\text{MAX}\{V\text{set},V_{FB2}(xmC\rightarrow x\text{set})\} \quad (5)$$

Then, the following travel controller 182 derives a target speed V # of the own vehicle M by mixing each target speed at a control transition ratio. The following travel controller 182 obtains the target speed V # of the case in which there are the front vehicle and the interruption vehicle in accordance with Expression (6) and obtains the target speed V # of the case in which there are the front vehicle and the preliminary interruption vehicle in accordance with Expression (7). Thus, the speed of the own vehicle M is controlled at a ratio in accordance with the control transition ratio ξ. In preparation for the case in which the target speed V # is considerably less than the current speed $V_M$, an upper limit guard for deceleration may be provided.

$$V\#=(1-\xi)\times V\#1+\xi\times V\#2 \quad (6)$$

$$V\#=(1-\xi)\times V\#1+\xi\times V\#3 \quad (7)$$

To perform relatively weak braking on the preliminary interruption vehicle by causing the feedback gain to be different is merely exemplary. The following travel controller 182 may obtain target deceleration to keep the inter-vehicle distance to the set distance with respect to each of the front vehicle, the interruption vehicle, and the preliminary interruption vehicle and mix the target deceleration at the control transition ratio ξ.

Figure 30:
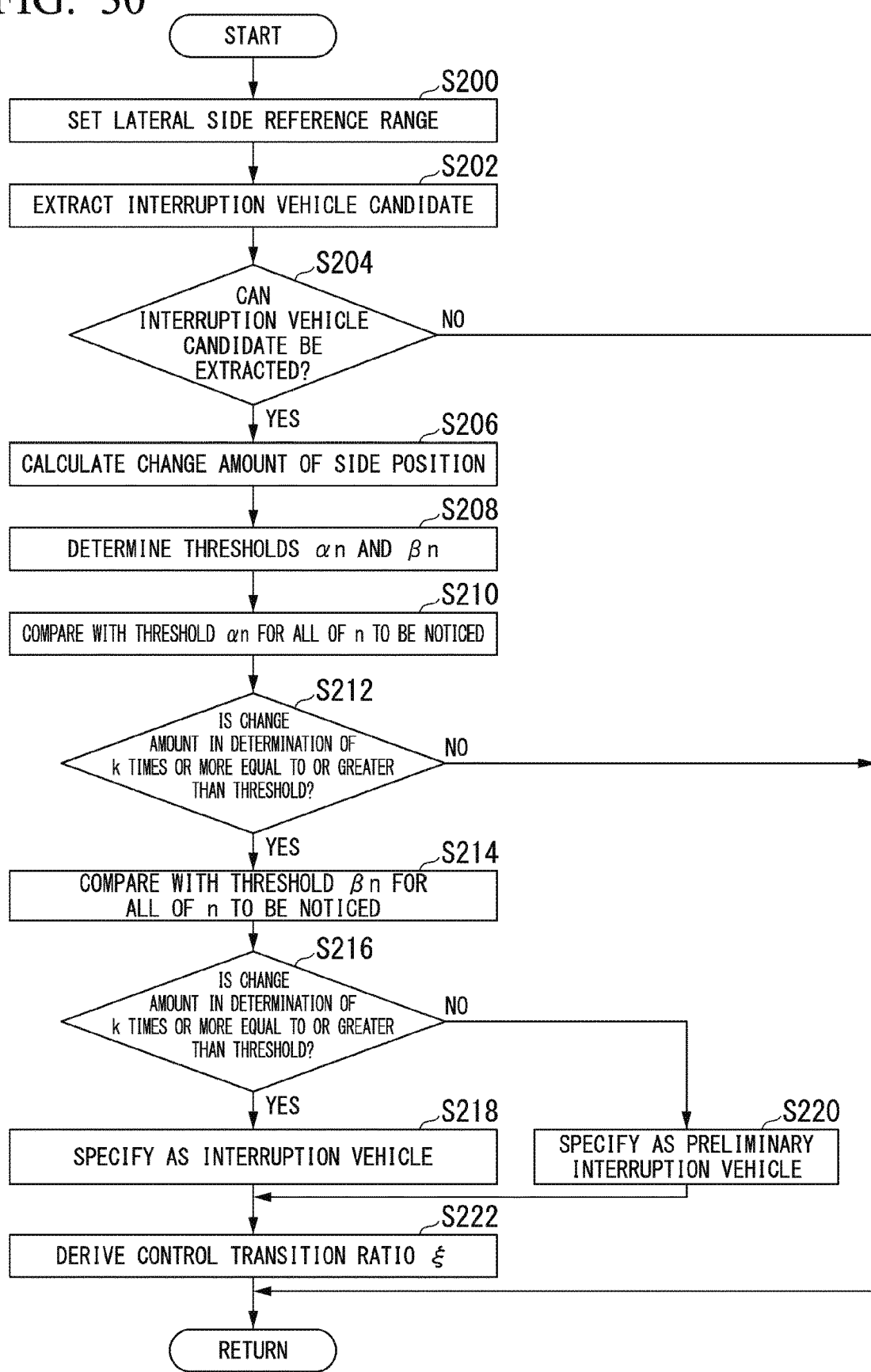
FIG. 30 is a flowchart illustrating an example of a flow of a process performed by a first interruption vehicle specifier.

FIG. 30 is a flowchart illustrating an example of a flow of a process performed by the first interruption vehicle specifier 160. The process of the flowchart is repeatedly performed periodically, for example.

First, the interruption vehicle candidate extractor 161 sets the lateral side reference range ARs (step S200) and extracts the interruption vehicle candidate within the lateral side reference range ARs (step S202). The interruption vehicle candidate extractor 161 determines whether to extract one or more interruption candidate vehicles (step S204). When no interruption candidate vehicle can be extracted, the process of one cycle of the flowchart ends.

When one or more interruption vehicle candidates can be extracted, the side position recognizer 162 calculates the side position EY0 of the interruption candidate vehicle and the change amount iEYn of the side position (step S206). Subsequently, the threshold determiner 163 determines the thresholds αn and βn based on the side position EY0 (step S208).

Subsequently, the first determiner 164 compares the change amount iEYn of the side position for all of n to be noticed (in the above-described example, n=2, 3, and 5) with the threshold αn (step S210). The first determiner 164 determines whether the change amount iEYn of the side position in the determination of k times or more is equal to or greater than the threshold αn (step S212). As described above, k may be 1 or may be 2 or more. When the change amount iEYn of the side position in the determination of k times is not equal to or greater than the threshold αn, the process of one cycle of the flowchart ends.

When the change amount iEYn of the side position in the determination of k times is equal to or greater than the threshold αn, the first determiner 164 compares the change amount iEYn of the side position for all of n to be noticed with the threshold βn (step S214). The first determiner 164 determines whether the change amount iEYn of the side position in the determination of k times or more is equal to or greater than the threshold βn (step S216).

When the change amount iEYn of the side position in the determination of k times is equal to or greater than the threshold βn, the first determiner 164 specifies the interruption vehicle candidate as the interruption vehicle (step S218). When the change amount iEYn of the side position in the determination of k times is not equal to or greater than the threshold βn, the first determiner 164 specifies the interruption vehicle candidate as the preliminary interruption vehicle (step S220). Then, the first control transition ratio deriver 165 derives the control transition ratio ξ (step S222).

The first interruption vehicle specifier 160 according to the above-described second embodiment can specify the interruption vehicle more appropriately.

[Modification Example of First Interruption Vehicle Specifier 160]

As described above, the thresholds α and β are set in accordance with only the side position of another vehicle, but at least one of the thresholds α and β may be determined based on a type or attribute of another vehicle. The type of vehicle is a two-wheeled vehicle, a four-wheeled vehicle, or a special vehicle and the attribute is a light duty vehicle, a passenger car, a heavy vehicle, a truck, or the like. In this case, the object recognizer 131 recognizes a type or an attribute of another vehicle based on content described in the size or a registration number of the other vehicle and delivers the type or the attribute of the other vehicle to the first interruption vehicle specifier 160. For example, the threshold determiner 163 causes the thresholds for a special vehicle or a heavy vehicle for which a sense or pressure felt by an occupant of the own vehicle M is large at the time of approach to be less than those for other vehicles. For example, the threshold determiner 163 causes the thresholds for a two-wheeled vehicle of which a behavior is more agile than a four-wheeled vehicle to be less than those of a four-wheeled vehicle.

At least one of the thresholds α and β may be determined based on a travel environment, a travel state, or a control state of the own vehicle M. The travel environment is a radius of curvature or a gradient of a road μ, or the like. The travel state includes, for example, a speed of the own vehicle M. The control state is, for example, a state indicating whether automated driving is performed or whether driving support is performed. For example, when the radius of curvature is small or the gradient or speed is large, the threshold determiner 163 causes the thresholds to be smaller than otherwise. When automated driving is performed, the threshold determiner 163 causes the thresholds to be smaller than otherwise. Further, a set range of the lateral side reference range may also be changed based on the travel environment, the travel state, or the control state of the own vehicle M.

[Second Interruption Vehicle Specifier]

As illustrated in FIG. 21, the second interruption vehicle specifier 170 includes, for example, an interruption vehicle candidate extractor 171, a vehicle posture recognizer 172, a preliminary operation determiner 173, a prohibition range entrance determiner 174, and a second control transition ratio deriver 175. The second interruption vehicle specifier 170 performs preliminary determination (determination of a first stage) and main determination (determination of a second stage) as in the first interruption vehicle specifier 160. A vehicle determined as an interrupt vehicle in the preliminary determination is referred to as a preliminary interruption vehicle and a vehicle determined as an interruption vehicle in the main determination is referred to as an interruption vehicle. The preliminary determination and the main determination may be performed in parallel and a vehicle specified as an interruption vehicle may be present without being specified as the preliminary interruption vehicle.

The interruption vehicle candidate extractor 171 extracts another vehicle which is in a lateral side reference range as a preliminary interruption vehicle or a candidate vehicle of the interruption vehicle (an interruption vehicle candidate) as in the interruption vehicle candidate extractor 161. A lateral side reference range set by the interruption vehicle candidate extractor 171 may be similar to or different from the lateral side reference range set by the interruption vehicle candidate extractor 161.

The vehicle posture recognizer 172 recognizes an angle formed between a direction of the body of an interruption vehicle candidate and a standard direction. The standard direction is, for example, an extension direction of the lane L1 in which there is the own vehicle M. The extension direction of the lane is, for example, a central line of a lane, but may be an extension direction of a road demarcation line of one of the right and left lines.

Figure 31:
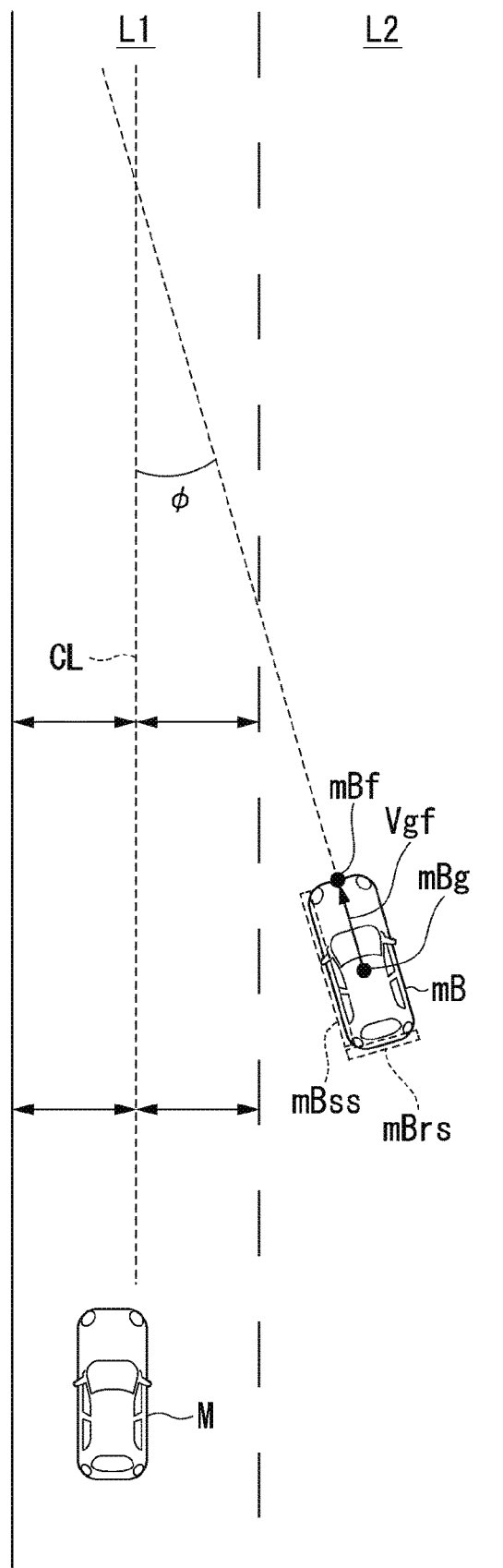
FIG. 31 is a diagram illustrating content of a process of a vehicle posture recognizer.

FIG. 31 is a diagram illustrating content of a process of the vehicle posture recognizer 172. In the drawing, CL is a central line of the lane L1 and the vehicle mB is an interruption vehicle candidate. The vehicle posture recognizer 172 recognizes a direction of the body of the vehicle mB based on outputs of on-board sensors such as the camera 10, the radar device 12, and the finder 14 and the object recognition device 16. For example, the vehicle posture recognizer 172 recognizes the position of a center of gravity mBg of the vehicle mB and the position of a middle mBf of the front end based on the outputs of on-board sensors such as the camera 10, the radar device 12, and the finder 14 and the object recognition device 16 and recognizes a direction of a vector Vgf oriented from the center of gravity mBg to the middle mBf of the front end as a direction of the body of the vehicle mB. The center of gravity mBg is an example of a "first point" and may be any position on the central axis other than the center of gravity. The middle mBf of the front end is an example of a "second point" in front of the "first point" and in the outer edge of the vehicle mB. A direction of the vector Vgf is an example of a direction binding the "first point" to the "second point."

Instead of the above, the vehicle posture recognizer 172 may recognize an extension direction of a side surface mBss of the vehicle mB as the direction of the body of the vehicle mB or may recognize a direction going straight in an extension direction of a rear surface mBrs of the vehicle mB within the horizontal plane as the direction of the body of the vehicle mB. When the vehicle posture recognizer 172 recognizes the extension direction of the side surface mBss or the extension direction of the rear surface mBrs, the vehicle posture recognizer 172 may define an extension direction of a side surface in accordance with any conversion expression or recognize a straight line binding portions at symmetric positions in the case of the rear surface as the extension direction since the side surface or the rear surface of a general vehicle is roundish. The vehicle posture recognizer 172 may simply approximate a curved surface or a curved line to a planar surface or a straight line. The vehicle posture recognizer 172 outputs an angle between the recognized direction of the body and the central line CL of the lane to the preliminary operation determiner 173.

Figure 32:
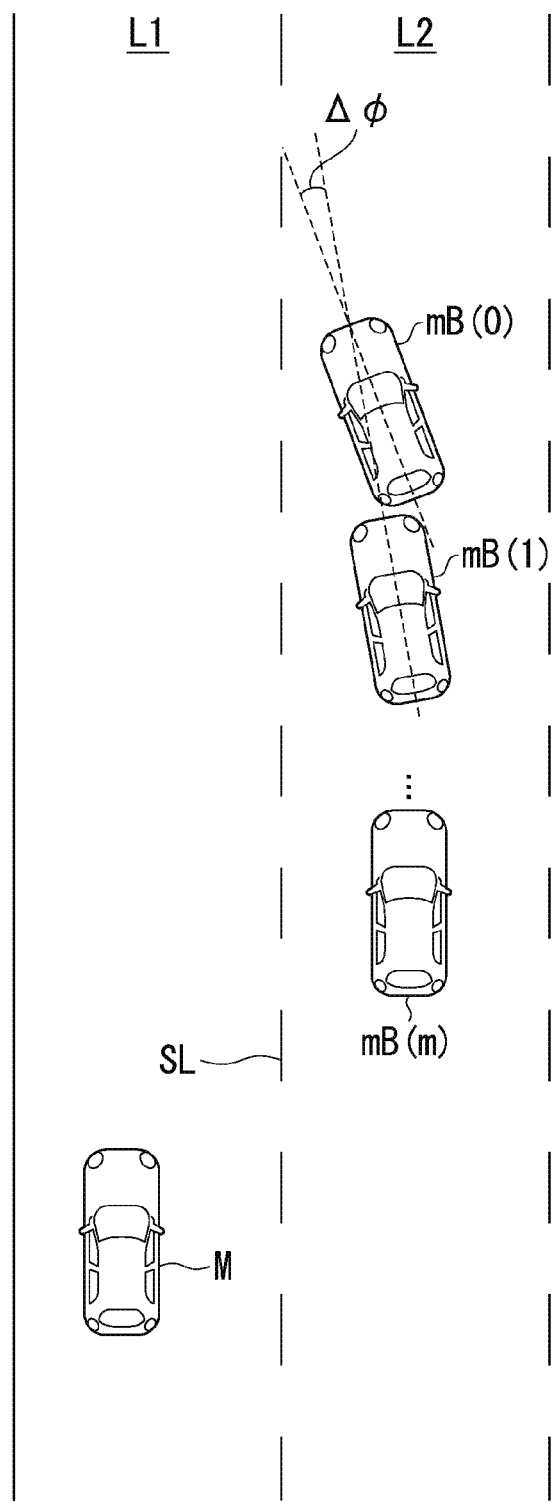
FIG. 32 is a diagram illustrating an example of a behavior of a vehicle specified by a preliminary interruption vehicle.

Based on the angle $\phi$ recognized by the vehicle posture recognizer 172, the preliminary operation determiner 173 determines whether the interruption vehicle candidate is a preliminary interruption vehicle. For example, when a state in which a change amount $\Delta\phi$ of the angle between process cycles is equal to or greater than a threshold Th$\phi$ continues at m cycles or more (an example of a "predetermined period or more"), the preliminary operation determiner 173 specifies the interruption vehicle candidate as a nominal interruption vehicle. FIG. 32 is a diagram illustrating an example of a behavior of a vehicle specified by a preliminary interruption vehicle. In the drawings, mB(0) is an interruption vehicle candidate recognized at an observation time point, mB(1) is an interruption vehicle candidate recognized at a process cycle one cycle before from the observation time point, and mB(m) is an interruption vehicle candidate recognized at a process cycle m cycles before from the observation time point. Since a change amount of a side position of the interruption vehicle candidate showing such a behavior at the time of low-speed travel is not large, there is a high possibility of being not specified as a preliminary interruption vehicle or an interruption vehicle by the first interruption vehicle specifier 160. However, since a vehicle slowly turning round to the side of the lane L1 at the time of low-speed travel is highly likely to appeal for entering the lane L1, the preliminary operation determiner 173 specifies the interruption vehicle candidate showing such a behavior as a nominal interruption vehicle. The preliminary operation determiner 173 treats the interruption vehicle candidate specified once as the preliminary interruption vehicle as a preliminary interruption vehicle until the change amount 40 of the angle starts to decrease. This is because when the interruption vehicle candidate stops turning round to the lane L1, $\Delta\phi$ becomes zero, and thus it is considered that it is inappropriate to stop treating the interruption vehicle candidate as the preliminary interruption vehicle in this state.

Figure 33:
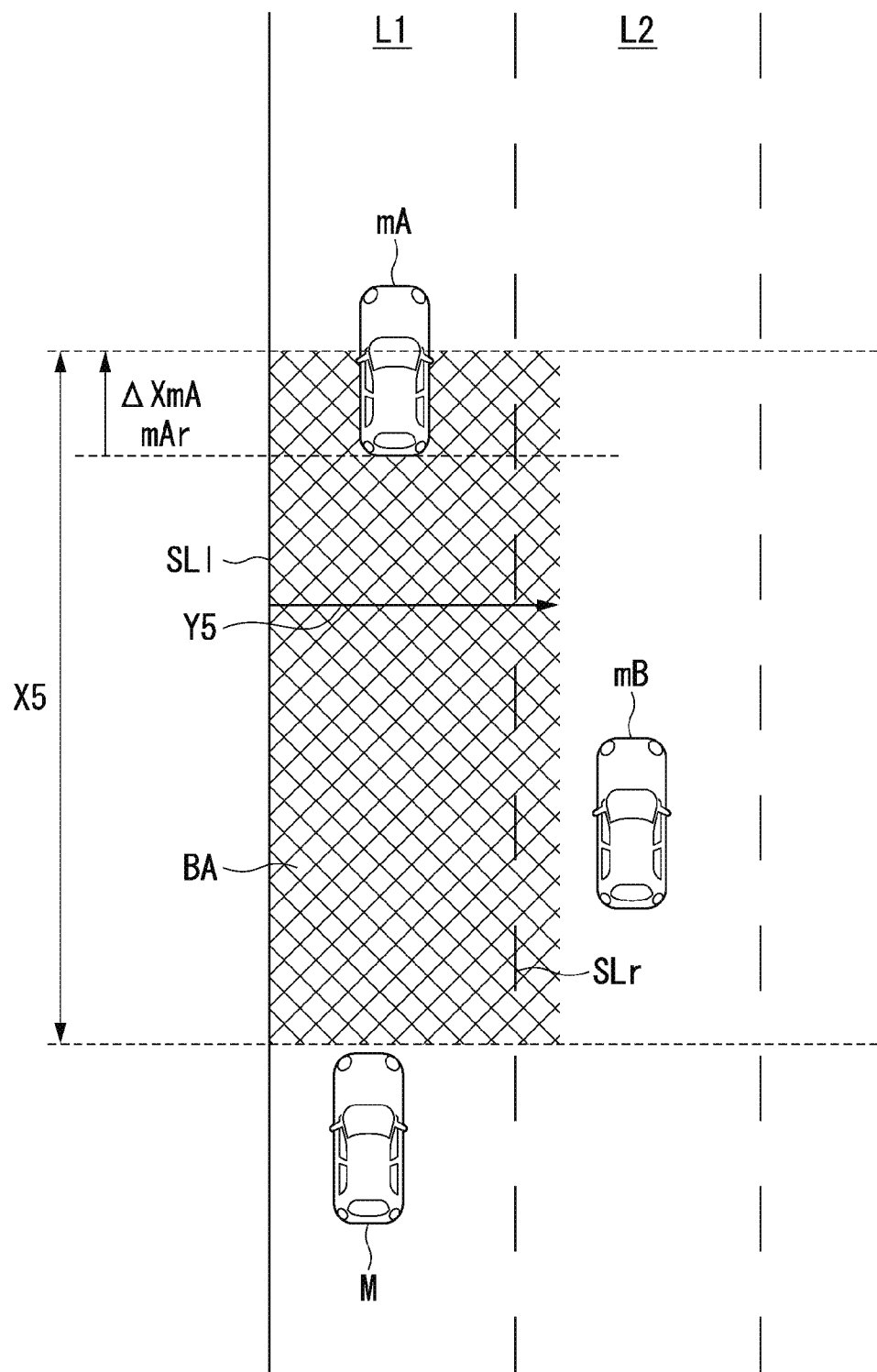
FIG. 33 is a diagram illustrating a setting rule of a prohibition range BA.

The prohibition range entrance determiner 174 sets a prohibition range in front of the own vehicle M. When the interruption vehicle candidate enters the prohibition range, the interruption vehicle candidate is specified as an interruption vehicle. FIG. 33 is a diagram illustrating a setting rule of a prohibition range BA.

The prohibition range entrance determiner 174 sets the prohibition range BA, for example, using a range occupied by the lane L1 in which there is the own vehicle M as a standard. For example, the prohibition range BA is set to reach up to the lane L2 beyond a road demarcation line SLr by using a road demarcation line SL1 opposite to the lane L2 in which a lateral side reference range is set between the road demarcation lines SL1 and SLr demarcating the lane L1 as one end. Accordingly, a width Y5 of the prohibition range BA is greater than a general lane width and is set in advance to a value less than a double of the general vehicle width. When the lateral side reference range is on the right side of the lane L1 and the lane L2 is not present (when a range corresponding to the lane L2 is a shoulder of a road), the prohibition range entrance determiner 174 may reduce the width of the prohibition range BA to a width corresponding to the width of the lane L1.

In principle, the prohibition range entrance determiner 174 sets the length X5 of the prohibition range BA to a short length between a fixed length of about several [m] and a length from a rear end mAr of a front vehicle mA immediately before the own vehicle M in the lane L1 to a position shifted to the front side by a travel amount ΔXmA of the front vehicle mA. In FIG. 32, the length of the latter is set to X5. The prohibition range entrance determiner 174 may set the length of the prohibition range BA based on a travel environment of the own vehicle M. The travel environment includes the speed $V_M$ of the own vehicle M. The prohibition range entrance determiner 174 may set the length X5 of the prohibition range BA to be longer as the vehicle length of an interruption vehicle candidate is longer. This is because when a vehicle long in front or back, such as a trailer interrupts, a position at which the rear end of the vehicle moves into the lane L1 is considerably on the rear side of the front end.

The prohibition range entrance determiner 174 specifies the interruption vehicle candidate of which a part of the body enters to the prohibition range BA as an interruption vehicle.

The second control transition ratio deriver 175 derives a control transition ratio to be given to the following travel controller 182. When there are the front vehicle and the preliminary interruption vehicle or the interruption vehicle, the following travel controller 182 determines a target speed so that braking power for the front vehicle or braking power for the preliminary interruption vehicle or the interruption vehicle are mixed at the control transition ratio η to be output.

Figure 34:
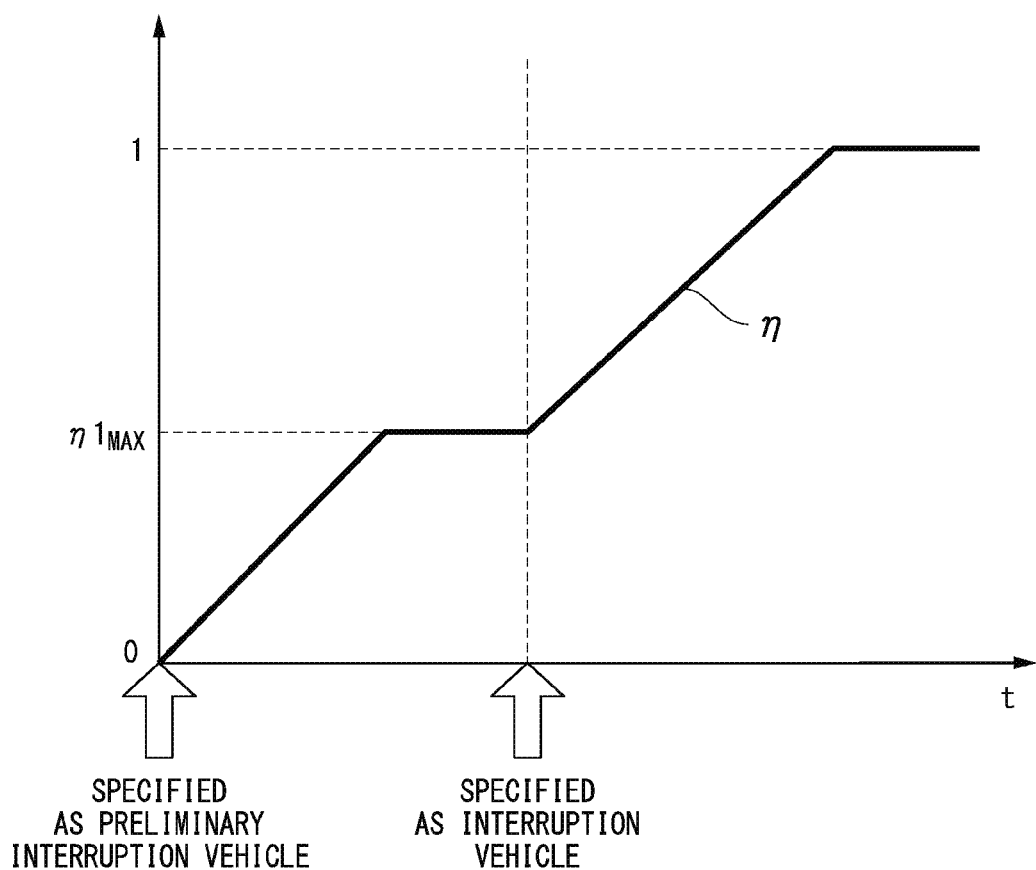
FIG. 34 is a diagram illustrating an example of a rule by which a second control transition ratio deriver derives a control transition ratio η.

FIG. 34 is a diagram illustrating an example of a rule by which the second control transition ratio deriver 175 derives the control transition ratio η. In the drawing, t represents a time. As illustrated, the control transition ratio η is a value set between 0 and 1. The second control transition ratio deriver 175 derives the control transition ratio η in accordance with a time elapsed from a time point at which the vehicle is specified as the preliminary interruption vehicle or a time elapsed from a time point at which the vehicle is specified as the interruption vehicle. In the illustrated example, the second control transition ratio deriver 175 gradually increases the control transition ratio from 0 from the time point at which the vehicle is specified as the preliminary interruption vehicle. When the control transition ratio reaches a maximum value $\eta 1_{MAX}$ for the preliminary interruption vehicle, the control transition ratio η is fixed to the maximum value $\eta 1_{MAX}$. Subsequently, the second control transition ratio deriver 175 again gradually increases the control transition ratio from the maximum value $\eta 1_{MAX}$ from the time point at which the vehicle is specified as the interruption vehicle. When the control transition ratio η reaches 1, the control transition ratio η is fixed to 1. When the vehicle is not the preliminary interruption vehicle or the interruption vehicle during such a process, the second control transition ratio deriver 175 may wait for elapsing a given spare time and reset the elapsed time. In FIG. 34, the control transition ratio η increases in a straight shape with respect to the elapsed time, but the present invention is not limited thereto. The control transition ratio η may increase in a stepped shape or a curved shape.

The following travel controller 182 derives, for example, a target speed for keeping an inter-vehicle distance to a set distance with regard to each of the front vehicle, the interruption vehicle, and the preliminary interruption vehicle. On the other hand, the content described for the first interruption vehicle specifier 160 is cited by replacing the control transition ratio ξ with the control transition ratio η.

Further, when there is a vehicle specified as the interruption vehicle by the second interruption vehicle specifier 170 and the own vehicle M is stopping, the following travel controller 182 may maintain the stop state of the own vehicle M (does not launch the own vehicle M) irrespective of the derived target speed. Thus, it is possible to realize automated driving gentle for nearby vehicles.

A case in which both the first interruption vehicle specifier 160 and the second interruption vehicle specifier 170 specify the same other vehicle as the preliminary interruption vehicle or the interruption vehicle can be considered. In this case, for example, the following travel controller 182 may adopt a lower speed between the target speeds derived based on results of both the first interruption vehicle specifier 160 and the second interruption vehicle specifier 170 or may adopt larger braking power between braking powers derived based on results of both the first interruption vehicle specifier 160 and the second interruption vehicle specifier 170.

Figure 35:
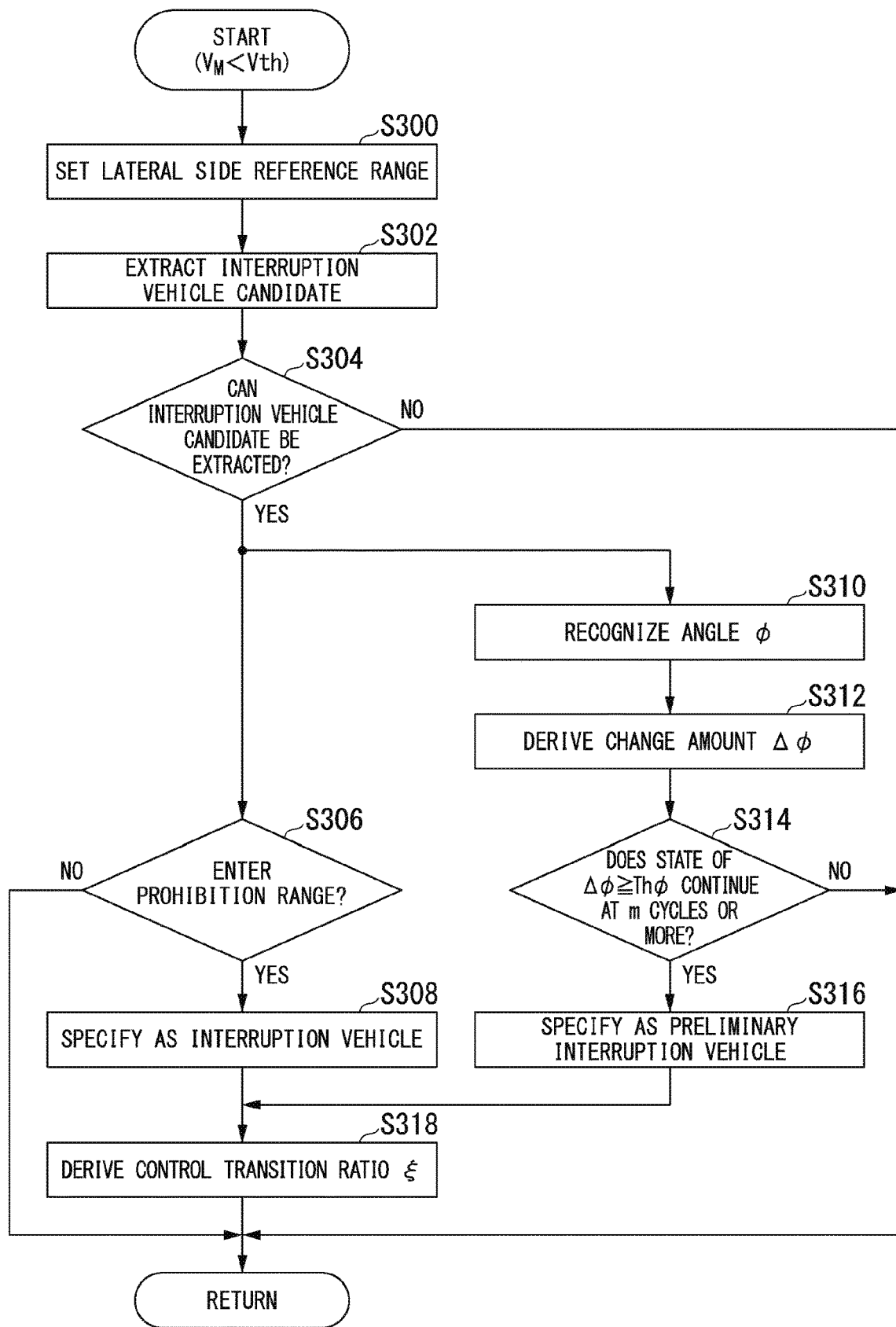
FIG. 35 is a flowchart illustrating an example of a flow of a process performed by a second interruption vehicle specifier.

FIG. 35 is a flowchart illustrating an example of a flow of a process performed by the second interruption vehicle specifier 170. The process of the flowchart is repeatedly performed periodically, for example, while the speed $V_M$ of the own vehicle M is less than the predetermined speed Vth.

First, the interruption vehicle candidate extractor 171 sets a lateral side reference range (step S300) and extracts an interruption vehicle candidate within the lateral side reference range (step S302). The interruption vehicle candidate extractor 171 determines whether one or more interruption candidate vehicles can be extracted (step S304). When no interruption candidate vehicles can be extracted, the process of one cycle in the flowchart ends.

When one or more interruption vehicle candidates can be extracted, the prohibition range entrance determiner 174 performs the processes of steps S306 and S308 and the preliminary operation determiner 173 performs the processes of steps S310 to S314 in parallel.

The prohibition range entrance determiner 174 determines whether the interruption vehicle candidate enters the prohibition range BA (step S306). When the interruption vehicle candidate enters the prohibition range BA, the prohibition range entrance determiner 174 specifies the interruption vehicle candidate as the interruption vehicle (step S308).

On the other hand, the preliminary operation determiner 173 recognizes the angle φ described above for the interruption vehicle candidate (step S310), derives the change amount Δφ of the angle φ (step S312), and determines whether a state in which the change amount Δφ is equal to or greater than the threshold Thφ continues at m cycles or more (step S314). When the state in which the change amount Δφ is equal to or greater than the threshold Thφ continues at m cycles or more, the preliminary operation determiner 173 specifies the interruption vehicle candidate as the preliminary interruption vehicle (step S316).

Then, the second control transition ratio deriver 175 derives the control transition ratio η (step S318).

The second interruption vehicle specifier 170 according to the above-described second embodiment can specify the interruption vehicle more appropriately at the time of a low speed.

Modification Example of Second Embodiment

Figure 36:
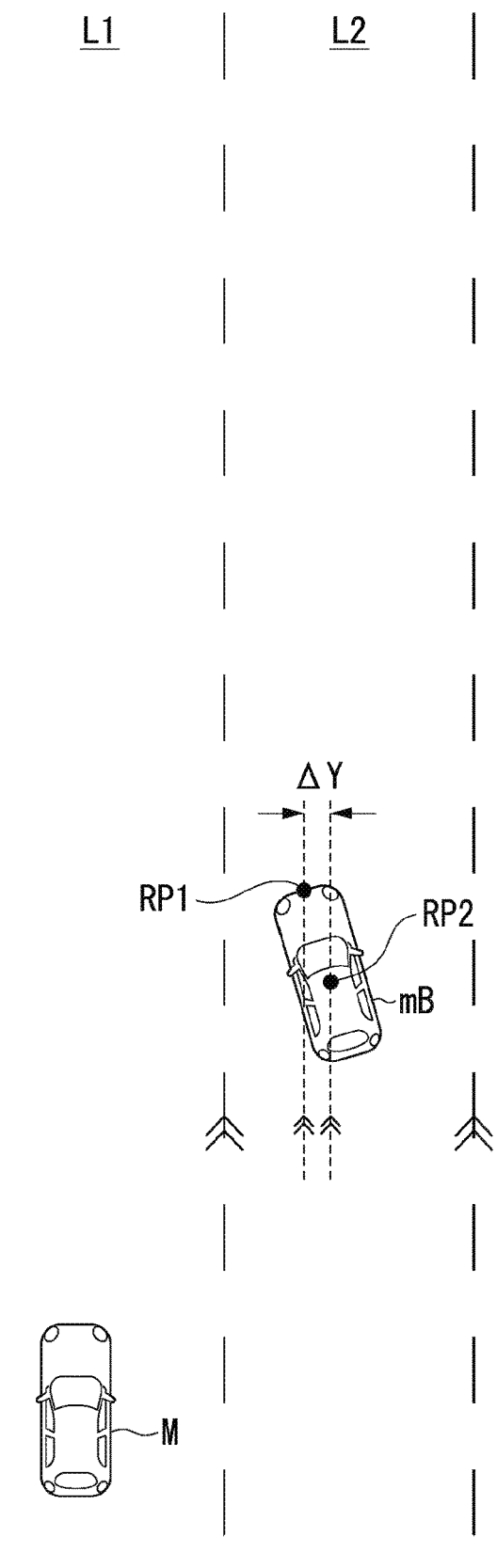
FIG. 36 is a diagram illustrating a process of a vehicle posture recognizer according to a modification example.

The vehicle posture recognizer 172 may recognize a difference between side positions of a first standard point and a second standard point of the interruption vehicle candidate instead of recognizing the above-described angle ϕ. For example, the first standard point is a middle of a front end and the second standard point is a center of gravity, a center of a rear wheel shaft, a middle of a rear end, or the like. The first standard point and the second standard point may be on a shaft line in the front and rear directions of the body. For example, the first standard point may be a front end of a left side surface and the second standard point may be a rear end of the left side surface in combination, or the first standard point may be a front end of a right side surface and the second standard point may be a rear end of the right side surface in combination. FIG. 36 is a diagram illustrating a process of the vehicle posture recognizer 172 according to the modification example. The drawing exemplifies a first standard point RP1 that is a middle of the front end of the other vehicle mB which is an interruption vehicle candidate and a second standard point RP2 that is a center of gravity of the other vehicle mB. The vehicle posture recognizer 172 recognizes a distance between the first standard point RP1 and the second standard reference RP2 in the road width direction as a difference $\Delta Y$ pf the side position. When a distance in a road width direction is calculated, the vehicle posture recognizer 172 may set a direction perpendicular to the road demarcation line as the road width direction or may set a direction perpendicular to a middle line of the lane L1 or L2 as the road width direction. In this case, the preliminary operation determiner specifies the interruption vehicle candidate as the preliminary interruption vehicle, for example, when a state in which a change amount $\Delta\Delta Y$ of the difference $\Delta Y$ of the side position is equal to or greater tan a threshold $Th_{\Delta Y}$ continues at m cycles or more. In this way, it is possible to realize detailed control in which a vehicle length of the interruption vehicle candidate is reflected. This is because, in a technique for recognizing the angle ϕ, a vehicle is specified as a preliminary interruption vehicle at the same timing, although there is a difference between a large vehicle and a small vehicle, when a change in the angle is the same, but in a technique of the modification example, a timing at which a large vehicle is specified as a preliminary interruption vehicle is quickened.

In the foregoing description, a case in which there is no road demarcation line between a range of an interruption source and a runway in which the own vehicle M is traveling has not been mentioned. In this case, a virtual line may be set at a position corresponding to a road demarcation line and similar processes to the above-described processes may be performed.

In the foregoing description, it is assumed that the vehicle control device is applied to the automated driving control device. However, the vehicle control device may be applied to a driving support device or the like that mainly performs so-called adaptive cruise control (ACC), that is, inter-vehicle distance control or constant-speed travel control.

[Hardware Configuration]

Figure 37:
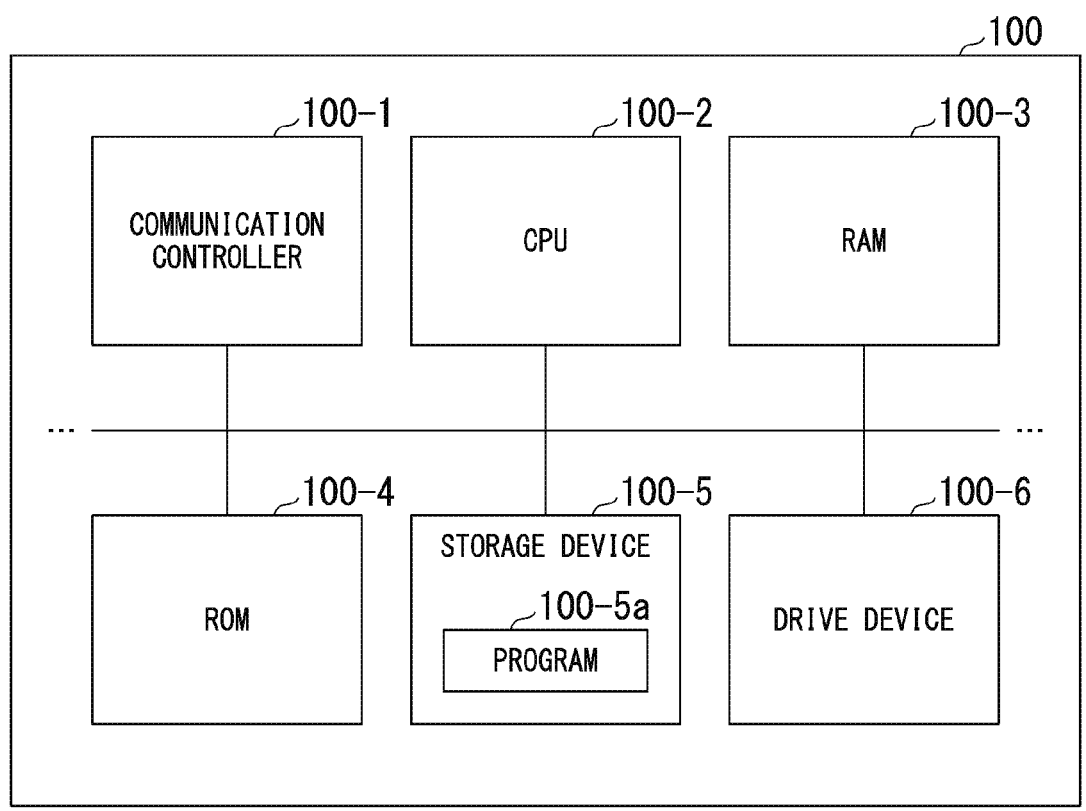
FIG. 37 is a diagram illustrating an example of a hardware configuration of the automated driving control device according to an embodiment.

FIG. 37 is a diagram illustrating an example of a hardware configuration of the automated driving control device 100 or 100A according to an embodiment. As illustrated, the automated driving control device 100 or 100A is configured such that a communication controller 100-1, a CPU 100-2, a random access memory (RAM) 100-3 that is used as a working memory, a read-only memory (ROM) 100-4 that stores a boot program or the like, a storage device 100-5 such as a flash memory or a hard disk drive (HDD), a drive device 100-6, and the like are connected to each other via an internal bus or a dedicated communication line. The communication controller 100-1 performs communication with constituent element other than the automated driving control device 100. The storage device 100-5 stores a program 100-5a that is executed by the CPU 100-2. The program is loaded on the RAM 100-3 by a direct memory access (DMA) controller (not illustrated) to be executed by the CPU 100-2. Thus, some or all of the recognizer 130, the action plan generator 180, and the second controller 190 are realized.

The above-described embodiment can be expressed as follows:

a vehicle control device including a storage device that stores a program and a hardware processor, the hardware processor reading the program from the storage device and executing the program, to recognize a surrounding situation of a vehicle based on an output of an on-board sensor;

to specify an interruption vehicle attempting to interrupt a travel lane from a lateral side of the travel lane in which there is the vehicle based on a recognition result;

to control at least one of an acceleration or deceleration speed or steering of the vehicle based on a position of the specified interruption vehicle;

to recognize an angle formed between a standard direction and a direction which is a direction of a vehicle body derived based on the output of the on-board sensor and is a direction of a vehicle body of another vehicle on a lateral side of the vehicle when the surrounding situation of the vehicle is recognized; and to specify the other vehicle as the interruption vehicle based on the recognized angle when the interruption vehicle is specified.

The embodiments for carrying out the present invention have been described above, but the present invention is not limited to the embodiments. Various modifications and substitutions can be made within the scope of the present invention without departing from the gist of the present invention.

What is claimed is:

1. A vehicle control device comprising:
a recognizer configured to recognize a surrounding situation of a vehicle;
an interruption vehicle specifier configured to specify an interruption vehicle attempting to interrupt a travel lane from a lateral side of the travel lane in which there is the vehicle based on a recognition result of the recognizer; and
a driving controller configured to control at least one of an acceleration or deceleration speed or steering of the vehicle based on a position of the specified interruption vehicle,
wherein the interruption vehicle specifier includes a first interruption vehicle specifier that specifies the interruption vehicle based on a side movement amount of another vehicle and a second interruption vehicle specifier that specifies the interruption vehicle based on a direction of a vehicle body of the other vehicle,
wherein the first interruption vehicle specifier operates when a speed of the vehicle is equal to or greater than a predetermined speed, and
wherein both the first interruption vehicle specifier and the second interruption vehicle specifier operate when the speed of the vehicle is less than the predetermined speed.

2. The vehicle control device according to claim 1, wherein the interruption vehicle specifier performs specifying the other vehicle as the interruption vehicle as a specifying process of a first stage based on the recognition result of the recognizer and performs specifying the other vehicle as the interruption vehicle as a specifying process of a second stage when the other vehicle enters a prohibition range in front of the vehicle, and wherein the driving controller causes a degree of control corresponding to the interruption vehicle to be larger with regard to the specified other vehicle when the other vehicle is specified as the interruption vehicle through the specifying process of the second stage than when the other vehicle is specified as the interruption vehicle through the specifying process of the first stage.

3. The vehicle control device according to claim 2, wherein the driving controller does not launch the vehicle when the other vehicle is specified as the interruption vehicle through the specifying process of the second stage and the vehicle is stopping.

4. The vehicle control device according to claim 2, wherein the interruption vehicle specifier sets the prohibition range based on a travel environment of the vehicle.

5. The vehicle control device according to claim 2, wherein the interruption vehicle specifier sets the prohibition range using an area occupied by a lane as a standard.

6. The vehicle control device according to claim 2, wherein the interruption vehicle specifier lengthens a length of the prohibition range as a vehicle length of the interruption vehicle is longer.

7. A vehicle control method causing a computer to:
recognize a surrounding situation of a vehicle;
specify an interruption vehicle attempting to interrupt a travel lane from a lateral side of the travel lane in which there is the vehicle based on a recognition result of the recognizer; and
control at least one of an acceleration or deceleration speed or steering of the vehicle based on a position of the specified interruption vehicle, wherein the specifying the interruption vehicle includes:
specifying the interruption vehicle based on a side movement amount of another vehicle when a speed of the vehicle is equal to or greater than a predetermined speed; and
specifying the interruption vehicle based on a direction of a vehicle body of the other vehicle when the speed of the vehicle is less than the predetermined speed.

8. A computer-readable non-transitory storage medium that stores a program causing a computer to:
recognize a surrounding situation of a vehicle;
specify an interruption vehicle attempting to interrupt a travel lane from a lateral side of the travel lane in which there is the vehicle based on a recognition result of the recognizer; and
control at least one of an acceleration or deceleration speed or steering of the vehicle based on a position of the specified interruption vehicle, wherein the specifying the interruption vehicle includes:
specifying the interruption vehicle based on a side movement amount of another vehicle when a speed of the vehicle is equal to or greater than a predetermined speed; and
specifying the interruption vehicle based on a direction of a vehicle body of the other vehicle when the speed of the vehicle is less than the predetermined speed.

\* \* \* \* \*